United States Patent
Uldry et al.

(10) Patent No.: US 9,884,334 B2
(45) Date of Patent: Feb. 6, 2018

(54) VARIABLE-VOLUME DISPENSER FOR ACCURATELY DISPENSING OF AN ADJUSTED AMOUNT OF LIQUID

(71) Applicant: SOCOREX ISBA S.A., Ecublens (CH)

(72) Inventors: Jean-Pierre Uldry, La Conversion (CH); Jean-Marc Ammann, Vufflens-la-Ville (CH); Nicole Henry, Gland (CH)

(73) Assignee: SOCOREX ISBA S.A., Ecublens (CH)

( * ) Notice: Subject to any disclaimer, the term of this patent is extended or adjusted under 35 U.S.C. 154(b) by 0 days.

(21) Appl. No.: 14/390,891

(22) PCT Filed: Apr. 22, 2013

(86) PCT No.: PCT/EP2013/058254
§ 371 (c)(1),
(2) Date: Oct. 6, 2014

(87) PCT Pub. No.: WO2013/160225
PCT Pub. Date: Oct. 31, 2013

(65) Prior Publication Data
US 2015/0114997 A1    Apr. 30, 2015

(30) Foreign Application Priority Data

Apr. 24, 2012 (EP) .................................... 12165380

(51) Int. Cl.
*B05B 11/00* (2006.01)
*G01F 25/00* (2006.01)
(Continued)

(52) U.S. Cl.
CPC ........ *B05B 11/3007* (2013.01); *B01L 3/0293* (2013.01); *B05B 11/0032* (2013.01);
(Continued)

(58) Field of Classification Search
CPC ................ B01L 3/0224; B01L 3/0293; B01L 2200/026; B01L 2200/141;
(Continued)

(56) References Cited

U.S. PATENT DOCUMENTS

| | | | | | |
|---|---|---|---|---|---|
| 4,003,499 | A | * | 1/1977 | Shapiro | B01L 3/0206 222/309 |
| 4,074,831 | A | * | 2/1978 | Roach | B05B 11/3007 222/309 |
| 4,273,257 | A | * | 6/1981 | Smith | B01L 3/0206 222/309 |
| 4,444,335 | A | * | 4/1984 | Wood | A61M 3/00 222/309 |
| 5,570,511 | A | * | 11/1996 | Reich | B27B 9/02 30/376 |
| 5,655,650 | A | * | 8/1997 | Naitou | H01H 13/705 200/339 |
| 5,862,958 | A | * | 1/1999 | Edwards | B01L 3/0206 222/309 |
| 6,164,497 | A | * | 12/2000 | Chia | B01F 15/0237 222/309 |
| 6,860,409 | B2 | * | 3/2005 | Lutz | B05B 11/3007 222/158 |
| 6,914,203 | B2 | * | 7/2005 | Suzuki | H01H 25/041 200/5 A |

(Continued)

FOREIGN PATENT DOCUMENTS

| | | | | |
|---|---|---|---|---|
| DE | 3143600 A1 | * | 5/1983 | ......... B05B 11/3007 |
| DE | 3516596 A1 | * | 10/1986 | ............ G01F 11/025 |
| DE | 4137353 A1 | * | 5/1993 | ............ G01F 11/028 |

*Primary Examiner* — Nicholas J Weiss
(74) *Attorney, Agent, or Firm* — Robert C. Netter, Jr.; Dann, Dorfman, Herrell & Skillman

(57) ABSTRACT

The present invention relates to a bottle top dispenser. According to an embodiment, the dispenser comprises a swayable selector for convenient and rapid volume adjustment by a user. The dispenser further comprises a second selector for analogous volume adjustment, wherein a user may use one of the two selectors according to preferences. The dispenser further preferably comprises two different graduations for assisting a user in the rapid identification of a specific volume when adjusting the volume. The dispenser relates to further advantageous embodiments.

25 Claims, 22 Drawing Sheets

(51) Int. Cl.
   *G01F 11/02* (2006.01)
   *B01L 3/02* (2006.01)
   *B05B 1/30* (2006.01)

(52) U.S. Cl.
   CPC .......... *G01F 11/023* (2013.01); *G01F 11/028* (2013.01); *G01F 25/0092* (2013.01); *B01L 2200/026* (2013.01); *B01L 2200/141* (2013.01); *B01L 2200/148* (2013.01); *B01L 2300/028* (2013.01); *B01L 2300/042* (2013.01); *B01L 2300/0854* (2013.01); *B01L 2400/0478* (2013.01); *B01L 2400/0616* (2013.01); *B05B 1/3026* (2013.01)

(58) Field of Classification Search
   CPC ......... B01L 2200/148; B01L 2300/028; B01L 2300/042; B01L 2300/0854; B01L 2400/0478; B01L 2400/0616; B05B 11/3007; G01F 11/023; G01F 11/025; G01F 11/028; G01F 25/0092
   USPC ............................... 222/309, 41–50; 30/162
   See application file for complete search history.

(56) References Cited

U.S. PATENT DOCUMENTS

| | | | |
|---|---|---|---|
| 7,198,176 B2* | 4/2007 | Fessel | B05B 11/0029 222/318 |
| 7,261,704 B2* | 8/2007 | Tachikawa | A61M 5/31555 604/187 |
| 7,987,602 B2* | 8/2011 | Kanemoto | B26B 5/001 30/152 |
| 8,905,975 B2* | 12/2014 | Perot | A61M 5/31591 604/187 |
| 2011/0127298 A1* | 6/2011 | Shah | G01F 11/028 222/309 |

* cited by examiner

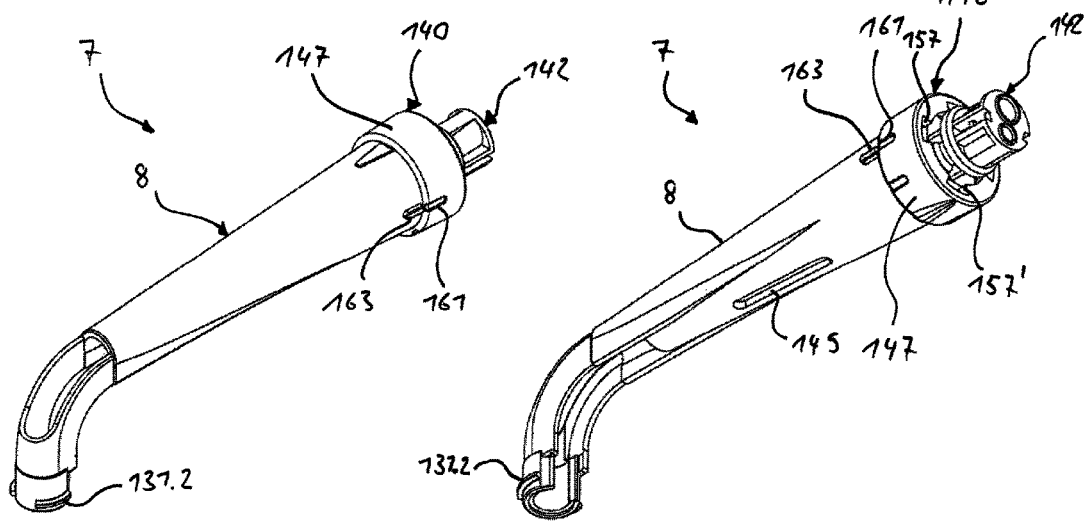
Figure 23
Figure 24
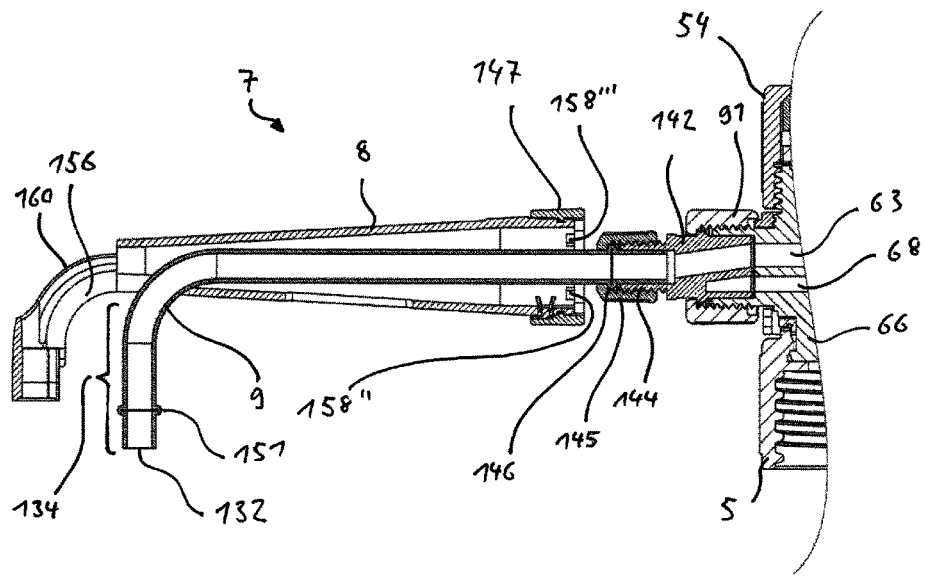
Figure 25 A

VARIABLE-VOLUME DISPENSER FOR ACCURATELY DISPENSING OF AN ADJUSTED AMOUNT OF LIQUID

This application is a § 371 application of PCT/EP2013/058254, filed Apr. 22, 2013, which claims priority to EP 12165380.2, filed Apr. 24, 2012. The entire disclosure of each of the foregoing applications is incorporated by reference herein.

TECHNICAL FIELD

The present invention relates to a dispenser for liquids, in particular to a bottle top dispenser. The invention further relates to spare part of the dispenser, such as a spout assembly and a swayable volume selector that can be used with the dispenser. The invention further relates to a dispenser kit, comprising one or more dispensers and one or more accessory parts that can be used on the dispenser at the option of a user.

PRIOR ART AND THE PROBLEM UNDERLYING THE INVENTION

The present invention is concerned with liquid handling and in particular with dispensing a predetermined and accurate quantity of liquid. In particular, the invention is concerned with providing a dispenser for dispensing the predetermined amount of liquid from a recipient, in particular a bottle.

Bottle top dispensers are used for various applications in laboratories, manufacturing industries, and hospitals. Bottle top dispensers are in particular used in biological, chemical and pharmaceutical research facilities, medical practices for dosing liquids that are frequently present in stock solutions. These liquids may be harmful to the environment, toxic, corrosive, volatile and/or simply expensive. Bottle top dispensers are used for the careful and precise handling of the liquids, in particular from stock solutions contained in recipients, such as bottles. The bottle top dispenser is generally fixed on the bottle in place of the original closure and left thereon for a certain time, until further use by a user. The bottle top dispenser allows a user to conveniently remove a specific amount of liquid generally without needing to handle the recipient containing the liquid, by simply actuating the dispenser. Some bottle top dispensers further have a recirculation mode, allowing for liquid that was pumped into the dosing chamber to be transferred back into the recipient. The possibility of recirculation is advantageous in many situations, for example when a user notes, following pumped the liquid into the dosing chamber, that the adjusted volume does not correspond to the desired volume, or if by visual inspection of the liquid in the dosing chamber of the dispenser it is noted that the liquid is has degraded or comprises air bubbles, or that the dosing chamber has not been completely purged, and the like.

Bottle top dispensers need thus be suitable to dispense a variable, user-adjustable amount of liquid in an accurate manner. A given bottle top dispenser generally covers a certain volume range for which it is adapted to dispense an amount of liquid as adjusted within the range by the user. Within the volume range, the dispensed volume has to accurately correspond to the amount a user adjusted.

As some liquids are corrosive or toxic, the dispenser must comprise materials that are resistant to corrosion or abrasion by these materials. Furthermore, the bottle top dispenser must be safe for a user. In particular, bottle top dispensers should comprise safety measures and features, which prevent exposure of a user to the liquid, for example in case the dispenser or some of its parts are broken. As bottle top dispenser are frequently used in medical practices and research laboratories, the dispenser should further be able to support repeated autoclaving.

Besides problems associated with bottle top dispensers in general, the present invention has several particular objectives and addresses specific problems.

The invention has the objective of providing a bottle top dispenser that is convenient in its use and/or maintenance. The invention has in particular the objective of providing a bottle top dispenser that allows for convenient, rapid and accurate volume adjustment by a user. It is an objective to render the process of volume adjustment by a user more rapid, more precise, safer, easier, and less complex, in particular in terms of the operating sequence and/or the movements necessary for volume adjustment.

It is also an objective to provide a dispenser that is ergonomically advantageous and convenient for the user. This applies to volume adjustment, the usual dosing procedure, calibration, and dismantling the dispenser for maintenance, cleaning or replacing spare parts, amongst other.

The invention has furthermore the objective of providing a bottle top dispenser that allows for continuous and analogous as well as discrete, digital volume adjustment, at the choice of the user.

The invention has the objective of providing a dispenser that can easily, rapidly and conveniently be calibrated by a user. It is in particular an objective to provide a dispenser that a user can calibrate by hand, without the need of a specifically adapted tool or of a general tool that needs to be used for calibration, such as a screwdriver or Allen key, for example.

More generally, it is an objective to provide a dispenser that can be dismantled by hand, without the need of a specifically adapted or general tool as exemplified above. Tools for calibration or dismantling the dispenser are generally provided together in the packaging of a dispenser. Such tools may be lost and it is thus advantageous not to provide separate, isolated tools. In case a specific tool is required, for example for calibration, it is an objective to provide a dispenser in which all necessary tools are integrated into the construction plan of the dispenser, and thus form integral part of the dispenser.

It is an objective to provide a dispenser in which defective parts can be conveniently removed for maintenance or replacement, in particular by spare parts. In prior art dispensers, certain units or parts of the dispenser are made in one piece or undetachably fixed in a subassembly, so that replacement of an individual broken subpart of the piece is not possible and a whole, complex and more expensive unit needs to be replaced. In some prior art are dispensers, the middle part comprises the individual valves or part of the valves as an integral part. It is preferable if, in case of a broken valve, neither the entire valve block nor the entire middle part containing several valves and liquid ducts needs to be replaced.

A further problem addressed by the present invention is concerned with the variability in recipient size. A given commercially obtained dispenser is to be placed on recipients, in particular bottles of varying volume and thus the body of the bottle may have different sizes, horizontal extension, bottleneck length, and so forth. For dosing a liquid, a receptacle into which the liquid is to be dosed needs to be held below the spout of the dispenser. This may be hampered if the body of the bottle is large and/or the neck is short. It is thus an objective to provide a dispenser that can be conveniently used to dose liquids from bottles with different dimensions.

It is an objective of the invention to provide a dispenser on which different spouts or spout assemblies of different sizes and/or lengths can be mounted. It is in particular an objective to provide a dispenser of a given volume range (of a given nominal volume) onto which different spout types can be mounted.

More generally, it is an objective of the present invention to provide a modular dispenser, allowing a user to define one or a combination of several functionalities such as the presence or absence of a recirculation mode, spout length, volume adjustment mode (analogous, digital) at the user's preferences.

It is an objective of the invention to provide a dispenser having a transparent, uncoloured cylinder and/or a transparent protective sleeve on the cylinder, allowing a user to inspect or verify the liquid pumped into in the dosing chamber of the dispenser, in particular the colour of the liquid, the homogeneity of the liquid, the presence or absence of air bubbles, precipitates, and the like.

Dispensers for comparatively small volumes generally have small and delicate pistons as part of the piston-cylinder assembly. In case of blocking of the piston in the cylinder, for example due to crystal deposits in the dosing chamber, a movement of the piston actuator by the user may exert a pressure on the piston. Due to the delicacy of the piston, it can easily be damaged in such a situation. It is thus an objective to provide a dispenser the piston of which cannot be easily damaged or broken, in particular by inadvertent manipulation by a user. It is an objective to provide security mechanism for preventing inadvertent damage to the piston, for example due to inadequate, abrupt, and/or forceful handling of the dispenser by a user.

It is also an objective a dispenser that can be fixed in a substantially leakproof, sealed manner on an opening of a recipient. It is a further objective, to provide a dispenser that can be fixed in a turnable or rotatable manner on the recipient. It is an objective to provide a dispenser in which the functionality of leakproof, completely sealed fixing and the function of turnable connection can be selected according to the user's preferences.

The present invention addresses the problems depicted above.

SUMMARY OF INVENTION AND PREFERRED EMBODIMENTS

Remarkably, the inventors provide a dispenser that addresses the problems and objectives discussed above.

In an aspect, the present invention provides a dispenser comprising a pump, a liquid channelling part and a connector part, for connecting the dispenser to a recipient.

In an aspect, the present invention provides a dispenser comprising an upper part comprising a pump, a liquid channelling and/or middle part and a lower and/or connector part, for connecting the dispenser to a recipient.

In an aspect, the present invention provides bottle dispenser (1, 300) for taking in and discharging liquid from a recipient, comprising: an upper part (4) comprising a piston-cylinder assembly (40); a middle part (3) comprising lines (61, 63, 68) and valves (64, 62) for liquid channeling; and, a lower and/or connector part (2), for connecting the dispenser to the recipient.

In an aspect, the present invention provides a dispenser comprising a piston-cylinder assembly, a piston actuator, and a volume adjustment assembly, a liquid channelling or support part on which a cylinder of said cylinder-piston assembly is mounted, said support part comprising a suction line a suction valve, a delivery line and, said support part further comprising a spout assembly, and said dispenser further comprising a connector and/or adaptor for connecting the dispenser to the opening of a recipient. Preferably, said support part further comprises a delivery valve.

In an aspect, the present invention provides a dispenser comprising an upper part comprising a piston-cylinder assembly, a piston actuator, and a volume adjustment assembly, a middle part on which a cylinder of said cylinder-piston assembly is mounted, said middle part comprising a suction line a suction valve, a delivery line, said middle part further comprising a spout assembly, and said dispenser further comprising a lower part comprising a connector and/or adaptor for connecting the dispenser to the opening of a recipient. Preferably, said middle part further comprises a delivery valve.

In an embodiment, said upper or pump part further comprises a volume adjustment assembly (20, 15, 17) comprising a swayable volume selector (20), wherein said swayable selector comprises a swayable button (36) that is susceptible of being depressed on (or towards) its top end and its bottom end so as to skip or sway down at the respective, top or bottom end, wherein depressing the button at any end results in deblocking the selector so as to allow for adjustment of a desired volume. Preferably, said button can also be pressed in the middle for deblocking said selector. According to an embodiment, the selector can be deblocked by pushing the button on any one of three different positions, preferably a first, a second and a third position. Preferably, pushing on any one of these positions results in a button movement and/or displacement that is different from the movement obtained by pushing on any one of the two other positions.

According to an embodiment, deblocking or unblocking of said volume selector allows displacement of the selector along a substantially vertical axis and/or along a graduation with a linear volume scale. Preferably, said graduation indicates the volume to be adjusted and/or dispensed. Preferably, said graduation is provided on a outer sleeve and/or manipulation casing of said upper part and/or pump.

In an embodiment, the dispenser comprises a swayable selector comprising a swayable button, wherein said selector can be deblocked from a position by depressing the swayable button on the top or the bottom of the button, resulting in the button being swayed and/or skewed on its top or bottom side, respectively.

In an embodiment, the dispenser comprises a swayable selector comprising a swayable button, a transducer piece or pusher, a support piece and a resilient and/or elastic piece, wherein said button is pivotably and/or swayably connected to said support piece, and wherein pressuring said button may result in a swaying movement of said button.

In an embodiment, the swayable selector comprises a resilient piece forcing an arresting structure into an arresting position, and wherein depressing the button by a user results in deblocking and/or unlocking said arresting position so as to allow the selector being moved for volume adjustment.

According to an embodiment, the dispenser comprise a selector, the selector comprising a swayable button, a support piece, an engagement structure and a transducer or pusher, wherein said swayable button is in contact with said transducer, wherein said transducer acts on said engagement structure when said button is depressed so as to disengage a blocked and/or arrested position of said selector on the outer sleeve of the dispenser.

According to an embodiment, the dispenser comprises one or two teethed rails, wherein the teeth of said teethed rail are provided on the inside and/or inner surface of an outer sleeve of said dispenser, and/or wherein the teeth of said teethed rail are oriented or point towards the inside, in particular in a substantial radially inward and/or proximal direction.

According to an embodiment, the dispenser comprises a cap or lid (26), said cap being provided on the top or in a top assembly (27) of the dispenser of the invention.

According to an embodiment, the dispenser comprises a cap or lid (26), said cap being fixed by a U-clip that is actionable by a user for removing the cap. Preferably, removal of the cap gives access to a calibration assembly. Preferably, said U-clip is comprised in said cap and/or is integrally formed with said cap.

According to an embodiment, the dispenser comprises a calibration assembly (92, 93, 25, 26, 27) and a cap or lid (26) for closing, covering and/or blocking said calibration assembly, wherein said cap (26) is fixed by a clip, in particular a U-clip that is actionable by a user for removing the cap, wherein removal of the cap gives access to said calibration assembly (92, 93, 25, 26, 27).

According to an embodiment, the dispenser comprises a calibration assembly comprising a calibration tool or driver, wherein said calibration tool is kept in its position by way of a cap or lid (26). According to an embodiment, inadvertent displacement and/or erroneous manipulation of the calibration assembly, in particular of said calibration tool or driver, is prevented by way of said cap.

According to an embodiment, the dispenser comprises a hand-actionable calibration driver locked in, in particular inside and/or within a top assembly of said dispenser.

According to an embodiment, the dispenser comprises a calibration assembly comprising a hand-actionable calibration driver locked in place by a cap (26) and/or locked in a top assembly of said dispenser. Preferably, said driver can be accessed by a user by removing a cap, for calibration. Preferably, said calibration driver is locked by said cap and/or in said top assembly during normal use of said dispenser. Preferably, said calibration driver is capable of driving a calibration screw.

According to an embodiment, the dispenser can be calibrated without the need of any particular tool, preferably by removing a lid or cap, unblocking a calibration driver and calibrating the dispenser by actuating said calibration driver.

According to an embodiment, the dispenser can be calibrated without breaking or rupturing any piece of the dispenser.

According to an embodiment, the calibration driver can be unlocked, for example by lifting, thereby disconnecting the driver from a locking seat, before actuating the driver for calibration. According to an embodiment, actuation of the calibration driver for calibration results in changing the length of the travel of the piston when dosing.

According to an embodiment, calibration results in changing the longitudinal position of an external sleeve with respect to the piston, wherein a graduation and/or the volume display is provided on said sleeve. Preferably, calibration does not affect the longitudinal position of the upper and/or lower fixed limit stops of the piston travel.

According to an embodiment, the dispenser comprises a piston-cylinder assembly comprising a glass cylinder, said cylinder comprising a bottom flange, wherein said flange is made in one continuous piece with said cylinder.

According to an embodiment, the dispenser comprises a piston-cylinder assembly comprising a glass cylinder, said cylinder comprising a flange, which is a separate piece from the cylinder and which is rigidly fixed on said cylinder. Preferably, said flange does not contain any structural part of a valve, such as the aspiration or pressure valve. According to an embodiment, said flange does not contain and/or form part or all of the lumen of a valve. The flange may, according to an embodiment, form a removable top closure or lid of the valve. In particular, the lower surface of the flange does not form part of the housing of any valve.

Preferably, the flange does not extend below the hollow cylindrical opening of the cylinder at the bottom of the cylinder and/or does not partially cover the circular opening formed by the cylinder at its bottom.

Preferably, said flange extends in a radial-outward and/or distal direction from the lower end of said cylinder. Preferably, said flange extends in a right angle from the surface of the cylinder.

According to an embodiment, said flange extends radially outward at the bottom end of said cylinder, forming a rim comprising an upper surface, suitable for pressuring said cylinder on and/or onto one or several selected from the group (consisting) of: a middle part (3), a support assembly (6), a base block (66), a valve block (117) and/or a base surface or plate (55). Preferably, said upper surface is substantially annular. Preferably, said upper surface is substantially horizontal.

According to an embodiment, said flange forms a rim comprising a substantially horizontal, annular lower or bottom surface, suitable for putting and/or fastening the cylinder on and/or onto a support assembly and/or valve block assembly of said dispenser. Preferably, said rim is placed on a flat surface or plate (55) of the valve block assembly.

According to an embodiment, the dispenser comprises a support assembly and/or valve block assembly comprising a flat surface and/or base plate (55) and wherein said cylinder is pressured onto said surface and/or base plate, preferably by way of a connector assembly, said connector assembly preferably comprising a cap nut and/or a pressuring ring.

According to an embodiment, said flange (49) and said flat surface or plate (55) are formed in one flange piece (351), which may or may not be separate from the cylinder, said piece being rigidly fixed to the cylinder. For example, the cylinder is press-fit into said piece (351). The piece preferably forms a flange and a flat surface or plate. In this case, the entire flange piece is pressured onto one or several selected from the support block (66), the valve block (117) and/or the support assembly (6).

According to an embodiment, the dispenser comprises a detachable spout assembly. Preferably, said spout assembly comprises a spout cover and a delivery pipe. Preferably, the delivery pipe is provided and/or guided in said cover.

Preferably, said spout assembly comprises a user-detachable, hand-actionable connection assembly (140, 145, 146), for connecting said spout assembly to one or several selected from an outlet connector (142), a support block (66), a support assembly (6) and a valve assembly (10) comprising a knob (12) of said dispenser.

Preferably, said spout assembly is detachable without need of detaching and/or removing any other element of the dispenser.

According to an embodiment, said delivery pipe and said spout cover are connected to an outlet connector that is fixed on said support part and/or base block. Preferably, said delivery pipe and said spout cover are connected to the same outlet connector.

According to an embodiment, the dispenser comprises a detachable spout assembly, which spout assembly comprises a spout cover and a spout cover connection assembly our spout cover connector, a spout delivery pipe and a delivery pipe connector (assembly). Preferably, said spout cover connection assembly and said delivery pipe connector assembly are separate. Preferably, they are separately and/or sequentially disconnectable from an outlet connector and/or from a support part of the dispenser.

According to an embodiment, the dispenser comprises a detachable spout assembly comprising a spout cover connection assembly (140) and/or a spout cover connector (140), wherein an outlet connector (142) is provided at the outlet of one or more selected from: a support block, a support assembly, and a valve assembly comprising a knob, wherein said spout cover connection assembly or connection comprises a user-actionable, turnable spout cover connector (147), for connecting the spout cover (8) to said outlet connector (142, 150). Preferably, said spout cover connector and/or connection assembly (140) comprises a hand-actionable, turnable lock. Preferably, said support block, support assembly, and valve assembly comprising a knob are comprised in the middle and/or support part of the dispenser.

According to an embodiment, the spout assembly of the dispenser comprises a spout cover connection assembly (140) comprising a spout cover lock (147), for locking the spout cover (8) to a connector (142, 150) provided at the outlet (141) and/or of a valve assembly (10) on the support block (66) or support assembly (6) of a dispenser.

Preferably, said spout cover is connected by of a turnable connection to said outlet connector (142). Preferably, said spout cover is connected by one or more selected from a turnable clip connection, a turnable lock connection, a bayonet-type connection and any screwed, screwable and/or threaded connection to said outlet connector and/or support part.

According to another embodiment, said spout cover is connected by one or more selected from a clip connection, a lock connection, a bayonet-like connection and any other non-screwed and/or non-threaded connection to said connector and/or support part.

According to an embodiment, said lock and bayonet-like connections are selected from turnable connections, twistable connections and the like.

According to an embodiment, the dispenser comprises a detachable spout assembly (7, 7') comprising a spout cover (8), a delivery pipe (9), and a connector (142, 150) by which said spout cover and delivery pipe are connected to a support block (66) of the dispenser, wherein said delivery pipe (9) is connected separately from said spout cover, by way of a threaded and/or screwed connection to said connector and/or said support part. Preferably, said delivery pipe is connected by way of a cap nut (145) to said connector and/or support part.

According to an embodiment, the dispenser comprises a detachable spout assembly (7, 7') comprising a spout cover (8), a delivery pipe (9), and an outlet connector (142, 150) by which said spout cover and delivery pipe are connected to a support block (66) and/or valve block assembly (6) of the dispenser, wherein said outlet connector is detachably attached to the support block (66) and/or valve block assembly.

According to an embodiment, said connector (142) is connected by way of a cap nut (91) to the outlet (141) of a support block (66).

According to an embodiment, the dispenser comprises a detachable spout assembly (7, 7') comprising a spout cover connection assembly (140) and a connector (142, 150) provided at the outlet (141) of a support block (66) and/or of a support assembly (6), wherein said connector is free of any valve.

Preferably, said spout assembly is detachable without need of removing a valve assembly knob (12) and/or without need of removing or loosening the cylinder and/or the cylinder connector assembly (14). Preferably, said hand-actionable connection assembly (140, 145, 146) is thus separately and/or independently actionable from said valve assembly knob (12) and/or from said cylinder connector assembly (14), respectively.

According to an embodiment, the dispenser comprises a detachable, hand-actionable valve assembly (10) for closing and opening a discharge line (63), wherein said valve assembly (10) comprises a connector (150) formed in said valve assembly (10) as an integral piece of said valve assembly for connecting a spout cover (8) to the valve assembly (10).

According to an embodiment, the dispenser comprises a detachable spout assembly (7, 7') comprising a spout cover (8) and a delivery line (9) provided in said cover (8), said spout cover comprising at least one tubular and/or truncated conical section.

According to an embodiment, the dispenser comprises a detachable spout assembly (7, 7') comprising a spout cover (8) and a delivery line (9) provided in said cover (8), said spout cover comprising at least one section, in which a section of said delivery pipe is completely encased by said spout cover.

According to an embodiment, the delivery pipe is connected by a hand-actionable and/or hand-releasable connection to said spout cover. Preferably, disconnection of said connection is required for detaching said spout assembly from the dispenser. Preferably, said connection is a hand-actionable holder, preferably a clip holder. Preferably, said holder and/or connection is provided at the downstream end of the spout assembly. Preferably, said holder is provided by the downstream end of said spout cover. Preferably, said holder is provided by a tubular section of said cover and a gap and/or cut-out in said cover, wherein a section of said delivery pipe can be removed from said cover by pressing it through and/or out of said gap.

According to an embodiment, the dispenser comprises a spout assembly comprising a clip holder for releasably holding a section of the delivery pipe, said spout assembly further comprising a spout cover lock for locking the spout cover to the connector and/or support assembly of the dispenser, wherein releasing said delivery pipe from said holder and unlocking said spout cover lock allows displacement, preferably partial displacement, of said spout cover with respect to the delivery pipe and/or with respect to the support block and/or support assembly, and wherein such displacement gives access to an actionable spout delivery pipe connection assembly.

According to an embodiment, the dispenser comprises a spout assembly comprising a spout cover and a delivery pipe guided in and/or at least partially covered by said cover, wherein said cover is separately displaceable following one or more, preferably at least two, three or more separate operations by a user.

According to an embodiment, said operation(s) involve (a) disconnection of the cover from one or more selected from the support part (3), the support block (66) and/or from a connector (142) provided on a support block (66) of the support part (3).

According to an embodiment, said operation(s) involve (b) disconnecting and/or unclipping a section of said pipe from a section of said cover by a user. Preferably, said cover is displaceable after (a) and/or (b) above.

Preferably, displacement of said cover gives access to a pipe connection assembly, which preferably needs to be operated by a user, separately from said cover connection assembly.

According to an embodiment, the spout assembly is detachable from said dispenser in at least the following working steps comprising: releasing at least a part of the spout pipe from a connection with said spout cover; releasing a spout cover connection assembly; and, releasing a spout pipe from a spout pipe connection assembly. Preferably, said steps are conducted in the indicated order. According to an embodiment, the detachment of the spout assembly from the dispenser results in said spout pipe and spout cover being completely detached from each other or remaining connected in a lose manner.

According to a preferred embodiment, the cap (11, 11') of the spout assembly (7, 7') needs to be removed so as to allow release at least a part of the spout pipe (9) from a connection with said spout cover. For detaching said spout assembly (7, 7'), said cap needs first be removed and/or unscrewed.

According to an embodiment, the dispenser comprises a detachable spout assembly, which spout assembly comprises a spout cover and a spout cover connection assembly or spout cover connector, and a spout delivery pipe, wherein at least partial displacement and/or removal of said spout cover with respect to said spout delivery pipe is enabled by:
- disconnection of said spout cover connection assembly (or connector) from one or more selected of a support assembly (3, 6), support block (66) and/or an outlet connector (142) of the dispenser; and/or
- detachment of a downstream end section of said pipe from a holder.

Preferably, said holder is formed by a downstream end section of said cover. Preferably, said holder is formed by a (in the cross-section) U-shaped, longitudinal part or profile formed by a part or section (170) of said spout cover. Preferably, said delivery pipe is held by the lateral walls of said U-shaped part.

According to an embodiment, any one, two or all three of said spout cover connection assembly, said delivery pipe connector assembly and said pipe-cover connection are actionable by hand.

According to an embodiment, the dispenser comprises a spout assembly comprising a cap closure for closing an orifice (132) of a delivery pipe (9) of said spout assembly, said cap comprising an inner thread, and wherein said spout assembly comprises a spout cover comprising at or close to its downstream end an outer thread and/or outer thread segments. Preferably, said thread and/or thread segments are not provided on said delivery pipe.

According to an embodiment, said spout assembly comprises a delivery pipe, wherein an orifice (132) of the delivery pipe (9) can be closed and opened by screwing and unscrewing, respectively, a cap on an outer thread or thread segments provided on the spout cover.

According to an embodiment, the dispenser comprises a first spout assembly and a second spout assembly, wherein said second spout assembly is longer compared to said first spout assembly, and wherein said first or said second spout assembly can be connected to said dispenser at the option of a user.

According to an embodiment, dispenser of any one of the preceding claims can be connected to any one of at least two different spout assemblies, either a first spout assembly (7) or a second spout assembly (7'), at the option of a user. Preferably, the dispenser can be connected to any one of n spout assemblies, wherein n is an integer of 2 to 5. Preferably, the dispenser can be connected to any one of said first, second, or $n^{th}$ spout assembly at the option of a user. Preferably, said first spout assembly is different from the second and/or from the $n^{th}$ spout assembly. Preferably, all n spout assemblies are different.

According to an embodiment, said first, second or n spout assemblies differ in length.

According to an embodiment, the dispenser comprises a connector (142), wherein said connector is suitable to connect any one of said first or said second spout assembly, preferably at the choice of a user.

According to an embodiment, the dispenser comprises a first and a second graduation provided on the left and right side, respectively, of a longitudinal slot, in which a volume selector is provided for volume adjustment, wherein said first and second graduations are different.

According to an embodiment, said first and second graduations contain volume amount numbers written out as given multiples, wherein said first and second graduations contain shifted and/or off-set volume amount numbers the first with respect to the second graduation, or that they contain volume amount numbers occurring as different multiples.

According to an embodiment, the dispenser is adapted to be used with any one selected from a first volume selector or a second volume selector. Preferably, a user can select one of the selectors for use on the dispenser.

According to an embodiment, the dispenser can be used with any one of either a first selector, a second selector, or any one of m selectors, wherein m is an integer of 2 to 10, preferably 2 to 5. Preferably, the dispenser can be used with any one of said first, second, or $m^{th}$ selector at the option of a user. Preferably, said first selector is different from the second and/or from the $m^{th}$ selector. Preferably, all m volume selectors are different.

According to an embodiment, the dispenser and/or the packaging of the dispenser comprises a first selector and a second selector.

According to an embodiment, the dispenser is adapted to be used with at least any one selected from a first volume selector (20) or a second volume selector (30), wherein said first selector (20) allows for digital volume adjustment, meaning that volume can be adjusted in predetermined volume intervals, and wherein said second selector (30) allows for continuous, analogous volume adjustment.

Preferably, said first selector allows for digital volume adjustment, meaning that volume can be adjusted in predetermined volume intervals or amounts, and wherein said second selector allows for continuous, analogous volume adjustment.

According to an embodiment, said digital volume adjustment is achieved by providing a teethed rail provided on an outer sleeve or manipulation casing, wherein said first selector comprises an engagement structure for locking in and/or with said teethed rail. Preferably, the longitudinal and/or axial size or extension of the teeth of said teethed rail determines said predetermined volume intervals or amounts. Preferably, all the teeth of said teethed rail are of the same size, resulting in equal volume intervals.

According to an embodiment, said dispenser comprises a valve assembly (65) comprising a valve (62), said valve assembly (65) comprising a valve ball (118) contained in a valve housing (80), wherein said valve housing comprises an opening (120) for liquid passage, and wherein said valve assembly (65) further comprises one or more extensions, arms and/or bars (119), wherein liquid can pass through said opening (120) and wherein said valve ball (118) is retained by said one or more extensions or arms (119). Preferably, said extensions, arms and/or bars (119) are part of a carrier structure (55), for example a plate (55) provided at the top of the valve housing (80). Preferably, said extensions, arms and/or bars (119) are part of a cover plate (55) provided on top of a top opening (120) of said valve (62). Preferably, said valve (62) is an aspiration valve (62).

According to an embodiment, said extensions, arms and/or bars (119) are continuous or free-standing. Preferably, said extensions, arms and/or bars (119) extending from the carrier structure (55) in a free-standing manner. In other words, the extensions, arms and/or bars are connected with one extremity to said carrier structure (55), and the other extremity is free-standing. In this way, the effectively opening for liquid passage is still increased.

According to an embodiment, the valve (62) comprises a bottom opening with a diameter smaller than the diameter of the valve ball (118), said bottom opening forming a ball seat.

In an aspect, the invention provides a dispenser or dispenser kit comprising a dispenser and a plurality of different spout assemblies (7, 7') for connecting alternatively to a support block and/or support assembly of said dispenser at the preference of a user.

In an aspect, the invention provides a dispenser or dispenser kit comprising a dispenser and a plurality of different selectors for volume adjustment, for example a first and a second selector, wherein one of said selectors can be connected alternatively to said dispenser at the preference of a user.

According to an embodiment, said dispenser comprises a cylinder comprising a transparent tubular part and a protective sleeve comprising a transparent tubular part, wherein a tubular part of said protective sleeve is provided outside and coaxially with respect to a transparent tubular part of said cylinder. Preferably, at least part of said tubular parts of said cylinder and protective sleeve, respectively, are visible during dosing with the dispenser.

Said tubular parts extend at least over those parts of the protective sleeve and the cylinder, respectively, that are visible to a user during liquid aspiration into a dosing chamber of the dispenser, for example when aspirating any volume, for example a maximum (nominal) volume into the dosing chamber.

According to an embodiment, said protective sleeve is any one or a combination of more selected from (i) substantially transparent to visible light; (ii) comprising a heat-shrunk polymer; (iii) resistant to temperature of at least 121° C. for at least 15 minutes.

According to an embodiment, wherein said protective sleeve is substantially free of visible irregularities, in particular surface irregularities or material irregularities which affect transparency and/or visibility across said protective sleeve and/or which result in light scattering or substantially reduced transparency, for example if compared to a dispenser lacking the protective sleeve.

According to an embodiment, said protective sleeve comprises or substantially consists of a transparent material that is resistant to autoclaving and/or the transparency or surface regularity of which is not impeded by repeated autoclaving.

According to an embodiment, said protective sleeve comprises or substantially consists of heat-shrinkable polymers selected from fluoropolymers, polyolefins, mixtures comprising one or more of the aforementioned, and mixtures of any one or more of the aforementioned with other polymers and possibly one or more additives.

According to an embodiment, the dispenser comprises a cylinder (45, 345) comprising a transparent tubular part and a protective sleeve (30, 330) comprising a tubular part, wherein a tubular part of said cylinder is housed inside and coaxially with respect to a tubular part of said protective sleeve, wherein said protective sleeve comprises, consists essentially of or consists of a shrinkable and/or heat-shrunk polymer.

According to an embodiment, said protective sleeve is not prepared by coating of a thermoplastic and/or thermoset polymer followed by heat treatment. Preferably, said protective sleeve is not prepared by any one or more selected from powder coating, spray coating, liquid coating and/or fluidised bed coating.

According to an embodiment, said protective sleeve is obtained by heat shrinking a shrinkable polymer. Preferably, the protective sleeve is obtained by heat sealing or shrinking of the polymer applied to the cylinder.

According to an embodiment, said protective sleeve comprises a transparent hollow cylindrical part and has a lean and/or smooth surface, preferably substantially free of irregularities, in particular as specified elsewhere in this specification.

According to another embodiment, said protective sleeve comprising at least a transparent tubular part is manufactured separately from the cylinder and assembled with other parts of the dispenser. In this embodiment, the protective sleeve is preferably not made from heat-shrunk polymer and/or there is no intimate contact of the protective sleeve with the cylinder covering a wide area of the visible parts of the cylinder and of the protective sleeve, respectively.

According to an embodiment, said protective sleeve comprises, at its upper end, a connecting structure for connecting the protective sleeve with the cylinder and/or for receiving a connector (347), wherein said connector is connected to the cylinder.

According to an embodiment, said dispenser comprises a protective sleeve (330) that is arranged coaxially with the cylinder (345) of the piston cylinder assembly, and wherein said protective sleeve is connected to the cylinder, and wherein said protective sleeve is connected, at its lower end, to the middle part (303) and/or support assembly (306) of the dispenser. Preferably, the attachment and/or fixation of the protective sleeve to the cylinder is such that said protective sleeve acts against and/or blocks an axial up-wards movement of said cylinder. Preferably, said the upper end or extremity of said protective sleeve is fixed towards or at the upper end or extremity of the cylinder. Preferably, the protective sleeve acts on the horizontal, annular surface at the upper end of the cylinder.

According to an embodiment, the protective sleeve comprises and/or is connected to, at its upper end, to a structure (48, 347) acting on the upper end of the cylinder (345) and pressuring and/or clamping said cylinder downwards in the direction of a support block (366) or support assembly (306) and/or into a cylinder base (351) fastened to the support block (66) and/or to the support assembly (306) of the dispenser.

According to an embodiment, said protective sleeve is connected, at its upper end, to or with a top limit stop.

According to an embodiment, said protective sleeve forms, at its upper end, a top limit stop.

According to an embodiment, said protective sleeve is connected, at its upper end, to a piece comprising a lumen for receiving liquid leaked through the piston-cylinder contact.

According to an embodiment, said protective sleeve comprises, at its lower end a flange for fixing the sleeve on a support part and/or base.

According to an embodiment, the outer sleeve and/or manipulation casing (313) is rotatably connected with respect to the piston (346). Preferably, the upper part (4) of the dispenser comprises an outer sleeve and/or manipulation casing (313), which is rotatably connected with the piston (346) of said piston-cylinder assembly. Preferably, however, there is substantially no longitudinal, vertical gap and/or play between said outer sleeve (313) and said piston. Preferably, any play having a relevant and/or measurable impact of the dispensed volume is avoided and/or prevented.

According to an embodiment, the dispenser comprises a piston uncoupling mechanism, allowing a rotation of the outer sleeve with respect to the piston. According to an embodiment, said rotation is braked and/or impeded by friction.

According to an embodiment, the piston (346) is connected to or comprises a rotatable first structure or piece (310). Said first structure or piece may be a separate piece or may be integrally formed with the piston and/or with the piston rod. Said first piece or structure is preferably provided at the upper end of the piston or of the piston rod.

According to an embodiment, said first piece or structure (310) is rotatably arranged with respect to a second piece or structure (393). Preferably, said second piece or structure (393) is rigidly, but possibly detachably, connected to the outer sleeve (313).

Preferably, said second piece/structure (393) comprises and/or forms a bearing for rotatable connection with said first piece/structure.

According to an embodiment, said first piece/structure comprises a piston-connecting part (321), for connecting said first piece which the piston. Said first piece/structure may be connected rigidly, but possibly in elastic and/or in flexible manner to said piston. According to an embodiment, said piston-connecting part is hollow cylindrical and/or tubular.

According to an embodiment, said first piece/structure comprises a rotatable structure (322), for rotatable connection with said second piece/structure (393). Preferably, said rotatable structure is rotatably housed in a bearing of or formed by said second piece or structure.

According to an embodiment, said rotatable structure (322) has a disk- or wheel-like configuration.

According to an embodiment, said piston-connecting part (321) is connected to the piston and wherein said disk-like part (322) is rotatably housed in a bearing of said second part.

According to an embodiment, at least one structural element applies a friction on said rotatable first piece.

According to an embodiment, the rotation between said first and second pieces/structures is braked and/or impeded by friction. Said friction preferably occurs between said first piece or structure and said second piece or structure.

According to an embodiment, said uncoupling mechanism (310, 393) comprises a first piece connected to the piston, a second piece (393) connected to the outer sleeve (13, 313), wherein said first piece is rotatable with respect to said second piece.

Preferably, a friction enhancing structure (336, 373, 373', 373") is arranged so as to reduce or brake down a free rotation between said first and second pieces.

According to an embodiment, said friction enhancing structure is in contact with said first and/or said second piece/structure.

According to an embodiment, said friction enhancing structure is a strap (336, 373) exerting a friction on said first and/or second piece or structure.

According to an embodiment, said dispenser (1) can be airtightly fixed to the opening or orifice of a recipient, for example a bottle.

According to an embodiment, said dispenser comprises a connector part (2) comprising a cap nut (5), wherein said dispenser (1) can be airtightly fixed and/or connected to the opening or orifice (524) of a recipient. Preferably, said dispenser is fixed and/or connected by screwing the cap nut onto the opening of the recipient or onto an adaptor (500), which adaptor being connected by screwing onto the opening of the recipient.

According to an embodiment, the dispenser comprises a connector part (2) comprising a cap nut (5), wherein said cap-nut comprises a radially-inwardly projecting rim (125), wherein said rim is adapted to be brought in contact with an opening of said recipient by screwing the cap nut (5) onto said opening. Preferably, said rim (125) is adapted to form a sealed and/or airtight contact with a support block (66) and/or support assembly (6) of the dispenser. Preferably, said rim (125) is circumferential. Preferably, said rim (125) is annular and/or coaxial with the cap nut and/or piston-cylinder assembly 40. Preferably, the rim (125) is formed in one continuous piece with said cap nut 5. Preferably, the rim (125) comprises a horizontal lower annular surface and/or a horizontal upper annular surface. Preferably, the lower and/or upper surfaces of said rim (125) comprises contact surfaces for the bottle opening and/or base block (66), respectively.

Preferably or generally, the opening of the recipient is formed by a substantially tubular and/or hollow-cylindrical section of the bottle, wherein an annular structure and/or surface of said opening can be brought in contact with said rim (125) by screwing of the cap nut (5). Said tubular and/or cylindrical section of the bottle comprises an outer thread (not shown), wherein the inner thread (10) of the cap nut (5) matches said outer thread.

According to an embodiment of the dispenser comprises, said cap nut (5) comprises a radially-inwardly projecting, circumferential rim (125), and wherein a circumferential projection and/or embossment (138), is provided on said rim (125) or on a support block (66) and/or support assembly (6), respectively. Preferably, said projection and/or embossment (138) is in a substantially vertical upwards or downwards orientation.

When provided on said rim, said circumferential projection (138) is preferably oriented in a substantially upward direction. Preferably, said circumferential projection (138) is in contact with the support block (66) and/or support assembly (6) of said dispenser. When provided on said support block (66) and/or support assembly (6), said circumferential projection (138) is preferably oriented in a substantially downward direction. In this case, said embossment (138) is in contact with said rim (125).

The invention also encompasses the inverse of the above, in particular a circumferential projection and/or embossment (138) provided on the support block (66) and/or support assembly (6) of said dispenser. Preferably, said projection is oriented in a substantially downward direction. Preferably, said circumferential projection (138) is in contact with the rim (125) of cap nut (5).

Preferably, said embossment or projection (138) has a maximum thickness of less than 5 mm, preferably a thickness ≤4, ≤3, ≤2, ≤1 mm. The maximum thickness is the maximum thickness of the embossment along its entire or a major part of its circumferential length or extension. The thickness is not the diameter of the circle formed by the embossment.

According to an embodiment, an o-ring is provided so as to form a seal between said cap nut (5) and said support block (66) and/or said support assembly (6).

According to an embodiment, the middle part (3) and/or support assembly (6, 306) of the dispenser comprises a support block (66) and a valve block (117), said valve block forming at least part of the housing of one, preferably two or more different valves, wherein said valve block (117) comprises, consists essentially of or consists of one or more selected from the group consisting of injected ceramics, injected plastics, machined and/or finished plastics, and fluoropolymers (e.g. PTFE). Preferably, said valve block (117) comprises, consists essentially of or consists of one or more selected from the group consisting of injected ceramics and injected plastics. Preferably, said support block (66) is separate from said valve block (117). In particular, said valve block (117) is a separate piece that can be conveniently separated from the support block (66), for example for the purpose of cleaning the valves.

Further aspects and preferred embodiments of the invention are defined herein below and in the appended claims.

Further features and advantages of the invention will become apparent to the skilled person from the description of the preferred embodiments given below, which illustrate the invention without limiting its scope.

BRIEF DESCRIPTION OF THE DRAWINGS

FIG. 16 B is a longitudinal axial section showing an enlarged extract of the connecting part according to another embodiment of the invention.

FIG. 23 is a front and top-down perspective view of the outlet cover and a connector of an outlet assembly of the dispenser shown in FIGS. 1 to 3, wherein the downstream end of the connector is locked in or with the upstream end of outlet cover.

FIG. 24 is a rear and bottom-up perspective view of the outlet cover and a connector of an outlet assembly of the dispenser shown in FIGS. 1 to 3, wherein the downstream end of the connector is locked in or with the upstream end of outlet cover.

DETAILED DESCRIPTION OF THE PREFERRED EMBODIMENTS

Represented is a liquid handling device, in particular a dispenser for a liquid—that is to say, a liquid handling device for dispensing defined volumes of a liquid. Such dispensers are also frequently called liquid metering devices. The dispensers of this invention are preferably bottle dispensers, designed to remove a measured volume of liquid from a bottle or generally a stock recipient and dispense it into a receptacle of choice, for example a more easily mandible or transportable receptacle for further use of the measured liquid. Preferably, the dispenser can be fixed onto the opening of a recipient, for example to an opening generally provided on the top of a placed recipient.

According to a preferred embodiment, the dispenser of the invention is a bottle top dispenser, and can thus preferably be fixed on the top opening of a placed bottle. More specifically, the dispenser of the invention can preferably be fixed by screwing onto the opening of the bottle, thereby replacing an original closure of the bottle. The opening of liquid recipient preferably has an external thread, matching the internal thread of a connector or adaptor of the dispenser of the invention.

Figure 1:
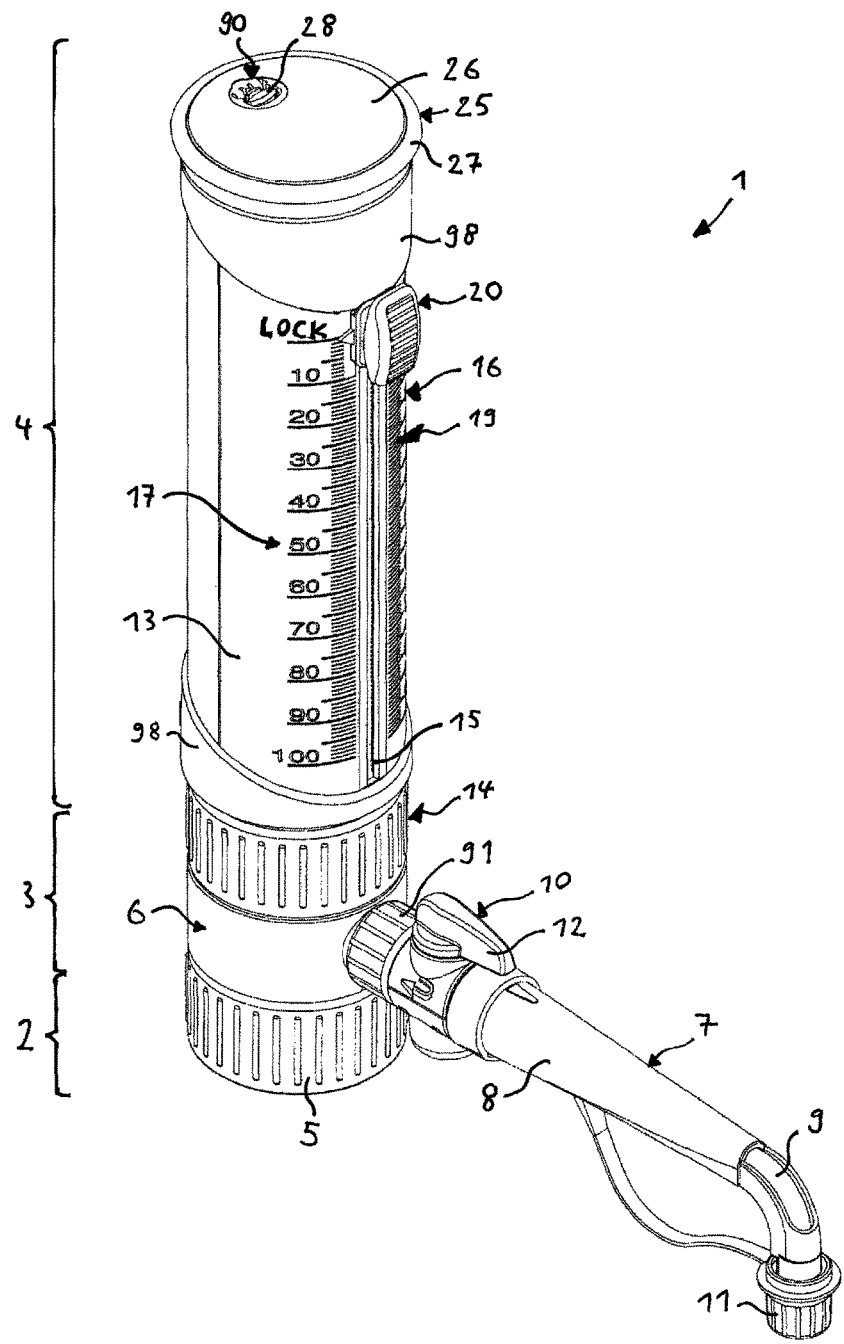
FIG. 1 is a perspective view of a bottle dispenser according to a first embodiment of the present invention.

For the purpose of the present specification, situations, orientations and directions of structures, pieces and elements of the dispenser of the present invention are determined by the situation of the elements, etc., with the dispenser being in operating position, thus when fixed on a bottle and ready for dosing liquid, for example, and by the perspective of a user that intends to dose liquid. Accordingly, in FIG. 1, a perspective front and top-down view of an embodiment of a dispenser of the invention is seen. The spout assembly 7 in FIG. 1 is thus considered, for the purpose of the present specification, to be on the front side of the dispenser, on which also the graduation 17 is provided. Situations or directions "up" or "top" and "down" or "bottom", "rear" or "back" and "front", "behind" and "in front", "distal" and "proximal", "lateral" and "central" follow the same principle.

Figure 2:
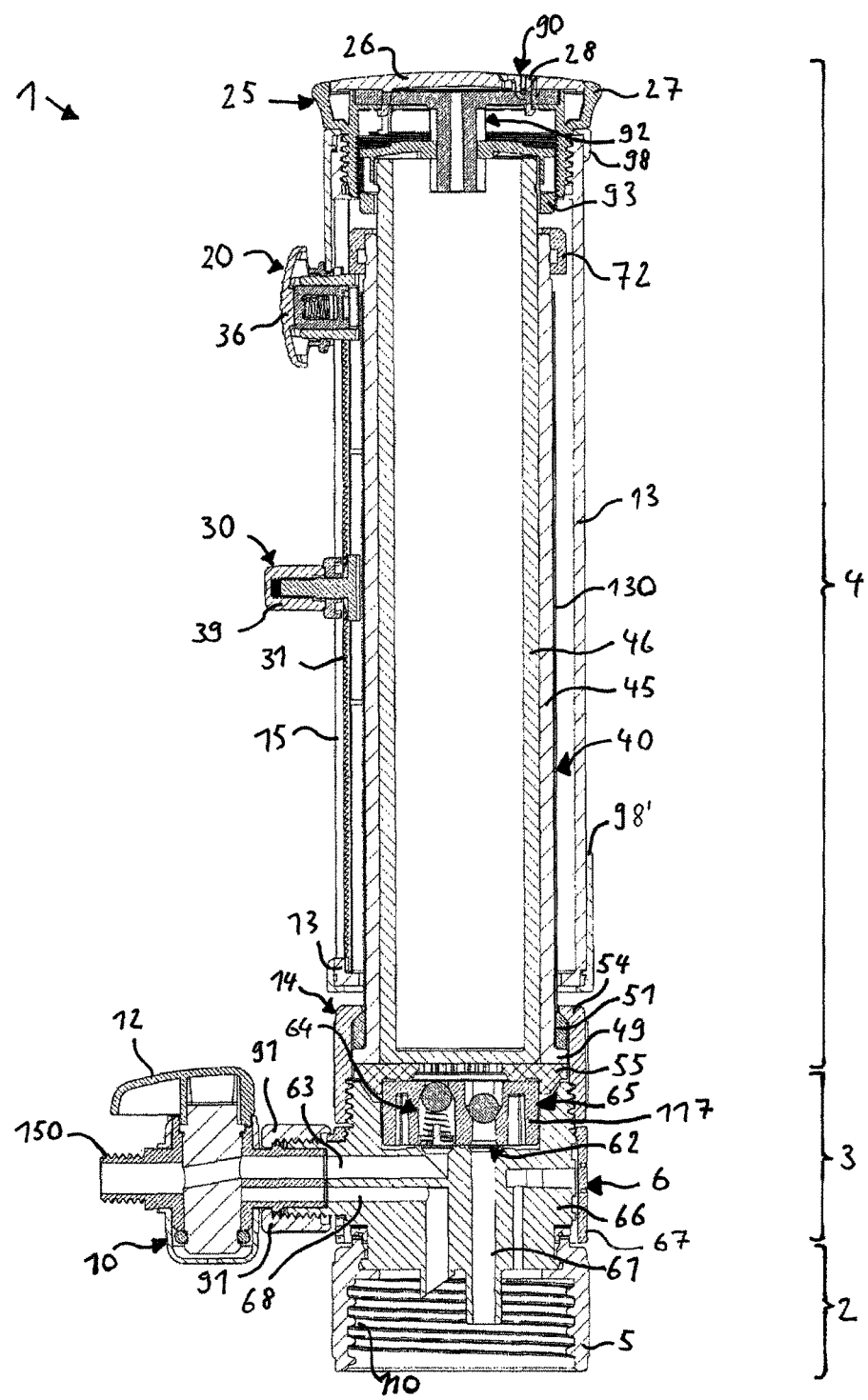
FIG. 2 shows a longitudinal, axial section through the bottle top dispenser shown in FIG. 1.
Figure 3:
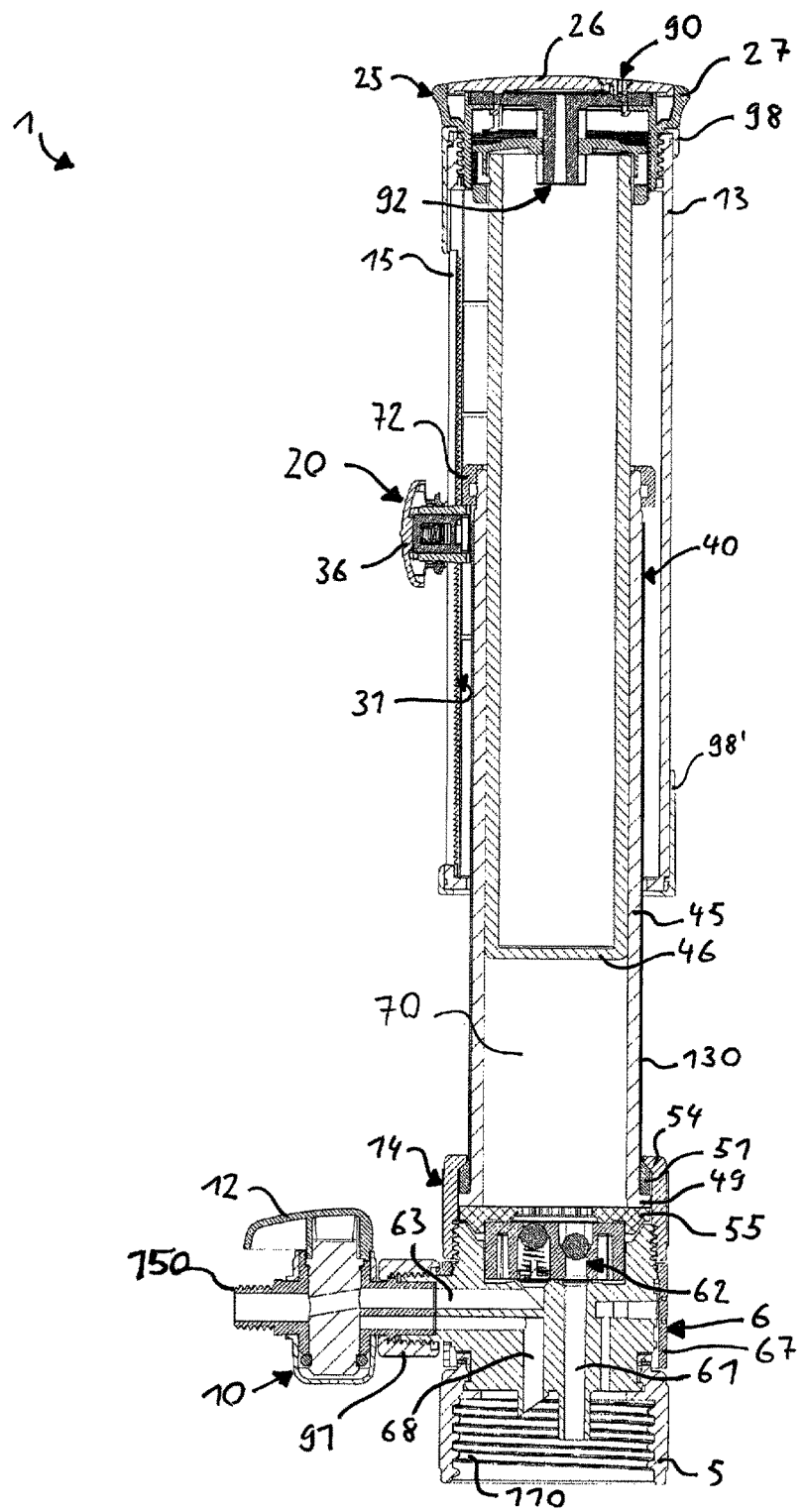
FIG. 3 shows a longitudinal, axial section through a bottle top dispenser as shown in FIG. 2, in a position in which the piston is in an axially upwardly moved position compared to the position shown in FIG. 2, illustrating a position where a specifically determined volume of liquid has been displaced from a bottle (not shown) to the suction chamber and can subsequently be dosed through the dispensing channel.

While FIGS. 1 to 3 show an embodiment of the dispenser of the invention in its orientation of use (the bottle to which it can be fixed is not shown), the aforesaid does not exclude the possibility that the dispenser of the invention is oriented differently in specific applications or situations. Accordingly, while the liquid pumping and measuring portion 4 is generally oriented on top and in an overall vertical orientation as shown in FIGS. 1 to 3, the invention does not exclude a substantially horizontal or skewed orientation, in dependence of the situation and/or orientation of the opening of the recipient on which the dispenser is fixed.

For the purpose of the present specification, the expressions "comprise" and "comprising" and various grammatical forms thereof are intended to mean "include, amongst other". They are not intended to mean "consist only of".

For the purpose of the present specification, an "assembly" comprise and/or consist of one or several pieces. If there are several pieces, these pieces preferably interact and/or are in contact with each other. An "assembly" may thus consist of only one individual piece. If the "assembly" consists of only one piece, it preferably comprises different structural parts assuming different functions, for example two structures allowing for connection and/or attachment with different pieces.

As can be seen in FIG. 1, the dispenser 1 of the invention preferably and generally comprises three parts, which may be differentiated with respect to their situation and/or with respect to the function they fulfil. The dispenser thus preferably comprises or consists of a lower part 2, a middle part 3 and an upper part 4. Alternatively, or in addition, the dispenser may be said to comprise or consist of a recipient adaptor or fixing part 2, a liquid channelling and/or support part 3 and a liquid pumping and/or metering part 4.

The lower or fixing part 2 thus comprises an adaptor or connector 5 for fixing the dispenser on the opening of a recipient. The middle or liquid channelling part 3 comprises lines and valves for guiding the liquid from the bottle to within the device and out of the device when dosing the liquid. The middle part 3 may also be referred to and considered as support part or base of the dispenser. The upper or pumping part 4 comprises the structural elements for producing the forces that allow the aspiration of a measured quantity of the liquid out of the bottle and ejecting the same either back into the bottle (recirculation mode) or through the spout assembly 7 outside of the dispenser (normal dosing mode). According to an embodiment, the structural elements necessary for adjusting—that is defining—the volume to be dosed, are also comprised in the pumping or upper part 4. According to an embodiment, the calibration assembly, if present, is also contained in the pumping part 4.

FIG. 1 being an exterior view of an assembled dispenser 1 in the rest position, this figure shows the elements that can be seen by a contemplating user. FIG. 1 thus shows a fastening arrangement 5, which in the embodiment shown is realised in the form of a cap nut 5. There above a support structure or assembly 6 can be seen, which generally houses lines or ducts for distributing the liquid. Valves that are necessary for controlling the liquid flow are generally also provided in the support structure, which may thus also be designated as "valve block assembly" 6 and/or 3. However, as can be seen more clearly in FIGS. 2, 3 and 16, from the exterior an external sleeve or cover 67 of the support assembly 6 is seen, which sleeve encases the support structure 6 in the embodiment shown.

A spout assembly 7 projects out from the support assembly 6. The spout assembly 7 comprises an outlet cover 8 in which an outlet, discharge and/or delivery pipe or line 9 is provided and/or guided. At its distal end, the spout assembly comprises a closing cap 11, capable of closing the outlet opening of the delivery line 9. A valve assembly 10 with a knob 12 is provided between the support assembly 6 and the spout assembly 7. By actuating the knob, a user can switch between a normal dispensing mode, a stop mode, in which the outlet pipe in the spout assembly 7 is closed, and a recirculation mode. In the latter mode, liquid sucked into a dosing chamber can be delivered back through recirculation line 68 (FIG. 2) into the bottle. The valve assembly 10 is thus a user-actionable and/or controllable valve assembly, as opposed to valve assemblies that cannot be controlled by a user, as for example valve assemblies 62 and 64 described further below.

In the embodiment shown in FIG. 1, a connector assembly 14 is seen, attaching in a releasable manner the pumping part 4 to the middle part 3. The pumping and/or upper part 4 is releasably connected to the support and/or channelling part 3, so that a user can separate said parts 3 and 4, preferably without any specifically adapted or general tool. This may be necessary or useful, for example, for cleaning the device and/or for replacing parts with reduced function or completely broken parts.

In FIG. 1 the actuating and/or volume adjustment mechanism 16 can be seen. The assembly 16 comprises an outer sleeve 13, which can be lifted and lowered by a user for aspirating and delivering liquid, respectively. The expression "outer sleeve" does not necessarily mean that there is also an inner sleeve, but expresses that the sleeve 13 is visible from the outside. The outer sleeve can also be referred to as actuating assembly 13, manipulation casing 13, or piston actuator 13, because the outer sleeve is held by a user and moved axially during dosing liquid with the dispenser 1, thereby acting on the piston 46 (FIGS. 2 and 3).

The volume to be dispensed can be adjusted by displacing a volume selector 20 along a longitudinal slot 15 provided vertically in the outer sleeve 13. On the left and/or right side of the slot 15 there is are graduations 17, 19, indicating the volume corresponding to a particular position of the selector 20. In FIG. 1, the volume is adjusted on "STOP" or "LOCK", meaning that the outer sleeve 13 cannot be lifted as no volume can be removed from the recipient (not shown). Because of the residual offset of calibration, very small volumes close to the 0 value cannot or should not be adjusted and/or dispensed. The position of volume 0 is referred to as "stop" position or "lock" position, where the manipulation casing 13 cannot be moved and the piston is thus locked.

As will be described in more detail elsewhere in this specification, the volume selector 20 shown in FIG. 1 comprises a swayable button 36 in accordance with a preferred embodiment of the invention. This button can be conveniently actuated from above as well as from below for the purpose of adjusting the volume. The swayable button 36 can in particular be displaced even if it is only depressed on either side, in particular either the top or the lower side of the button. The volume selector may also be referred to as "rider" or "volume setting device".

According to an embodiment, said volume selector 20 comprises a swayable button 36 that, when in a rest position, can be way on two ends or sides, preferably at the upper end and at the lower end.

A "graduation", for the purpose of the present specification, refers to markings for measuring the volume of the liquid measuring device of the invention. The marks preferably comprise lines in calibrated or well-defined and regular distances, so that the distance between two lines corresponds to a specific volume. At last some of the marks preferably are associated with numbers, so that a user can attribute a specific line to a volume in accordance with the number. The graduation preferably indicates the unit of volume (FIG. 26, reference numerals 18 and 218) which corresponds to the numbers. An alternative way of adjusting or indicating volume is by way of a digital volume display, showing only one specific number at a time. Volume indication by way of a digital display is also encompassed by the present invention. A bottle top dispenser using a digital display is disclosed, for example, in US 2010/0021349.

A top assembly 25 is provided on the top of the dispenser 1. As will be described in more detail below, the top assembly connects in a rigid but preferably adjustable, detachable and/or rotatable manner the piston assembly of the piston-cylinder assembly to the outer sleeve 13. The top assembly can thus alternatively also be designated as "connecting assembly 25". In the embodiment shown, the top assembly also comprises a calibration mechanism. Accordingly, the top assembly could alternatively also be named "calibration assembly 25".

The top assembly 25 comprises a top cover or lid 26, which is provided on the top of the dispenser in FIG. 1. The lid 26 is fixed in a releasable way, preferably by way of a clip mechanism, on the top assembly 25. More specifically, the lid 26 is fitted on or into a connector, support and/or collar 27, to which the outer sleeve 13 is attached. The sleeve 13 and support 27, could, in accordance with an embodiment, be provided as one single piece instead of two separate but releasably or detachably connected pieces. The lid 26 comprises an elastic part or lever 28 of an opening assembly 90 of a clip closure, which elastic part can be actuated by a user from outside, for example using a fingernail or, alternatively, a tool, but preferably without any tool. The actuation of the elastic part disengages at least one engaging part of the clip connection and thus allows the user to remove the lid 26, which may be done for the purpose of calibration, as will be described elsewhere in this specification.

In the longitudinal, axial section of FIG. 2, the overall construction of the dispenser can be seen. In this figure, the detachable spout assembly 7 that was shown in FIG. 1 has been removed as it will be described separately elsewhere in this specification. Furthermore, for the purpose of illustration, two volume selectors 20, 30 are shown, the selector on top comprising a swayable button 36 shown in FIG. 1 (the first volume selector), and the volume selector 30 being a further, different (a second) selector.

According to an embodiment, the dispenser of the invention is furnished with two or more different volume selectors 20, 30. The first and second selectors 20, 30 are preferably both contained in the packaging of the dispenser, so that a user can choose one of the two selectors according to the user's preferences. According to another embodiment, the dispenser is provided with only one volume selector 20 or 30, for example in a basic setting. The user can chose one or, as an option, both (or more) of the selectors when buying the dispenser. The dispenser is adapted to receive any one of said two selectors 20 and 30.

Figure 4:
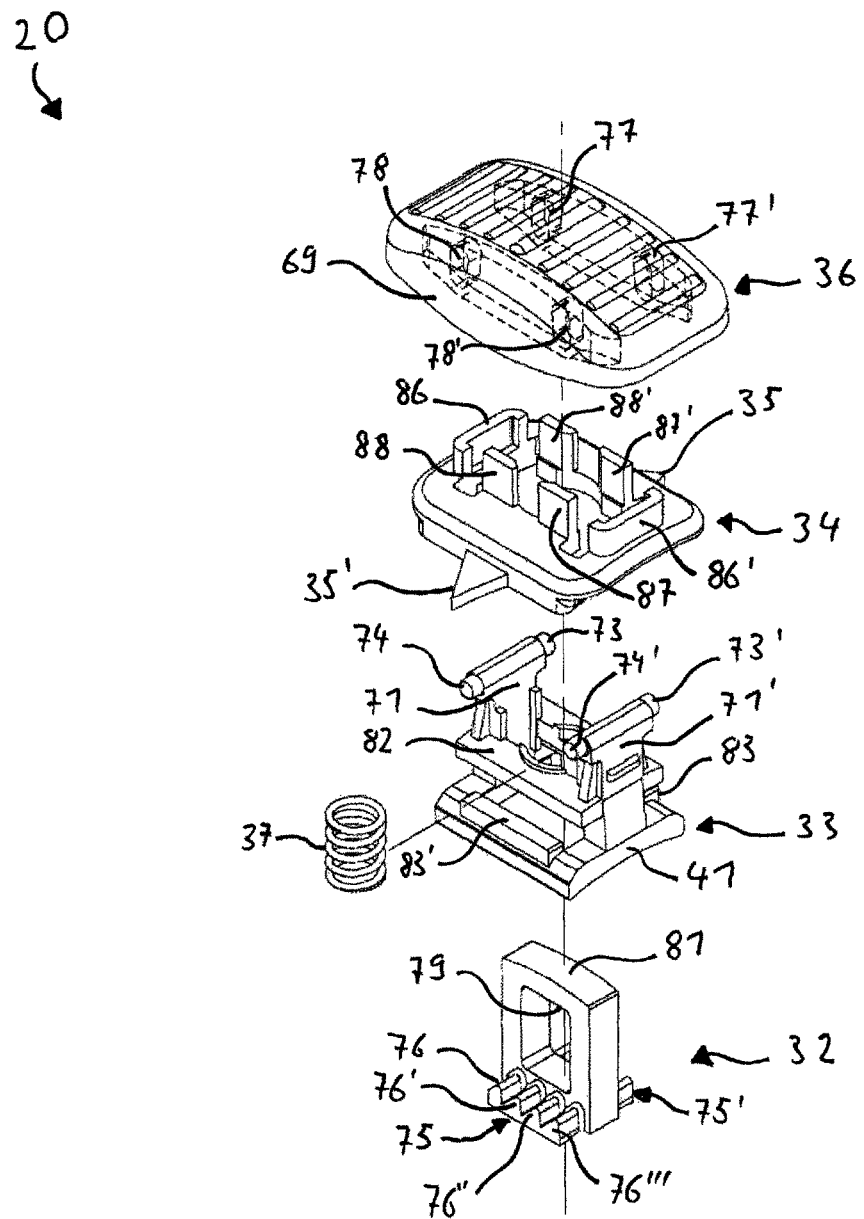
FIG. 4 is an exploded view of a swayable volume selector for volume adjustment of the dispenser shown in the preceding figures.

The first and second selectors 20 and 30 may differ with respect to one or several aspects. For example, the first selector 20 may be a selector that can be positioned in discrete steps of a specific length, preferably corresponding to a specific volume. For example, the first selector may be positioned so as to indicate a volume corresponding to a marking line on the graduation provided on the casing or outer sleeve 13 of the dispenser, for example at intervals corresponding exactly to one selected from 5 ml, 1 ml, 0.5 ml, 0.1 ml, 0.05 ml, or 0.01 ml. A discontinuous positioning of the selector at discrete positions may in particular be realised by way of an anchoring rail, teethed rail, or rack 31, provided on the outer sleeve 13, which can engage with a matching teethed counter-structure 75 provided on the selector 20 (FIG. 4). In this way, the position of the first selector 20 is determined by the available positions of engagement of the two matching teethed structures, which can only occur at discrete distances. For the purpose of the present specification, the positioning of the selector at discrete steps, corresponding to a specific volume as indicated by a marking line is considered to be a "digital volume adjustment".

The second selector 30 is preferably a selector that can be positioned in a continuous manner along the slot 15 and/or along the volume graduation(s) provided on the outer sleeve 13. The second selector 30 is thus preferably a selector that lacks a teethed counter-structure capable of engaging with the teethed rail 31. Due to the possibility of continuous positioning, the second selector 30 can be used to theoretically adjust any volume, also volumes that are as such are not specifically marked on the graduation 17, for example by way of a horizontal marking line. For the purpose of the present specification, the possibility of positioning of the selector in a continuous manner on the graduation (volume display) on the sleeve 13 is referred to herein as analogical and/or analogous volume adjustment.

According to an embodiment, the dispenser of the invention allows for digital as well as analogous volume adjustment, at the choice of the user. According to an embodiment, a user can select between digital and analogous volume adjustment by selecting the corresponding selector, 20 or 30, respectively, which may also be referred to herein as "digital selector" 20 and "analogous selector" 30.

For volume adjustment, the first selector 20 is preferably released and positioned at a volume of choice by actuating a depressible button 36. In particular, the first selector 20 is preferably loosened from a given volume-position by pushing the button, and, following displacement, locked at the volume of choice by simply releasing the pressure on the button. Preferably, the depressible button is a swaying button 20, preferably as described elsewhere in this specification.

According to an embodiment, for volume adjustment, said second selector 20 is released from a fixed position corresponding to a given volume by a turning a knob 39 provided on said volume selector. After adjustment of a desired volume by sliding the selector 30 to the position corresponding to the desired volume, the second selector is fixed by turning of the knob 39, preferably in the counter-direction. The second selector 30 comprises in particular a screw-clamp-type configuration, whereby it is fixed at a given position by screw-clamping on or of the outer sleeve 13.

According to an embodiment, the dispenser of the invention only comprises one volume selector or one type of volume selectors. The one type of raiders may be selected from clamp-type volume selectors, such as said second selector 30, and from button-based volume selectors, such as said swayable button-based first selector 20. According to an embodiment, the dispenser comprises, for example in the packaging, two selectors or two types of different volume selectors, in particular said first and second selectors 20, 30.

In the embodiment shown in the figures, the dispenser comprises a piston-cylinder assembly 40. The piston-cylinder assembly 40 fulfils said liquid pumping and/or measuring function of part 4 of the dispenser. Accordingly, said piston-cylinder assembly 40 is a pump. The piston-cylinder assembly 40 comprises a piston 46 that is translationally and/or substantially telescopically guided within the inner lumen of a hollow cylinder 45. Since the piston 46 is guided in a sealed, airproof manner within the cylinder, relative movement of the piston within the cylinder produces vacuum or pressure, in dependence of the direction of the movement. In the dispenser of the invention, the axis of the piston and/or cylinder of the piston cylinder assembly preferably determines the overall axis of the dispenser as a whole, as the piston 46 and/or cylinder 45 are substantially cylindrical and have thus clearly defined longitudinal axis. In the embodiment shown in FIG. 2, the piston-cylinder assembly, possibly in combination with the outer sleeve 13, form the most voluminous part of the dispenser.

According to an embodiment, at least a part of the cylinder 45 of the piston-cylinder assembly 40 comprises or consists essentially of transparent glass. Preferably, the cylinder 45 comprises or consists essentially of precise glass, in particular glass having precise internal dimensions.

Preferably, the cylinder comprises at least a part that comprises or consists essentially of non-rectified or non-finished glass, so as to keep the original transparency of this part. Some glass tubes have large tolerances or variations in thickness and outside diameter. In some prior art dispensers, rectified (for example polished) glass is used for providing a precise cylinder. Such finishing generally renders the cylinder any one or more selected from diffuse, light-scattering, translucent, semi-opaque, and opaque. This is to be avoided in accordance with the invention. In these cases, the cylinder is generally not substantially or completely transparent.

Preferably, at least a visible part of the cylinder is transparent. Preferably, the tubular part of the cylinder that is visible to a user when raising the outer sleeve 13 is transparent, and thus preferably not treated in a manner that impedes transparency. Through the transparent part of the cylinder, a user may check the liquid aspired into the dosing chamber.

Those parts of the cylinder that are not visible to a user generally are the bottom end of the cylinder, where it is fixed to the valve block assembly 6, and/or the top end of the cylinder, where the limit stop 72 is provided, preventing complete removal of the piston during normal use of the dispenser. In accordance with the invention, the lower and top ends of the cylinder, may but need not be transparent, in particular if these ends are not visible during normal use. Preferably, a central, tubular part of the cylinder is transparent. In the embodiment shown in FIGS. 1-3, 16A, the entire cylinder is transparent, consisting of transparent glass.

The cylinder may, however, be further processed in a manner that does not substantially affect transparency. For example, a protecting cover may be applied on the outer surface of the cylinder in order to prevent spillage upon breaking of the cylinder. This will be described in more detail elsewhere in this specification.

In the embodiment shown in the figures, the cylinder 45 substantially consists of glass and the piston 46 is a precise glass cylinder tube or rod (filled or hollow). A lubricating layer may be provided on the piston so as to avoid jamming of the piston within the cylinder, for example because of liquid entering between the piston-cylinder interface or because of formation of crystals at the interface.

The construction of the valve block assembly or middle part 3 can also be seen from FIG. 2. The line 61 is an inlet or suction line, as the liquid is aspired from the recipient (not shown) into the supplying and dosing chamber 70 (FIG. 3), formed by the extending piston in the cylinder when aspiring. The dosing chamber 70 can be seen in FIG. 3. The liquid inlet path through said suction line passes through an inlet or suction valve 62. Furthermore, the middle part 3 and/or the support assembly 6 further comprises an outlet, delivery or pressure line 63 with an outlet or pressure valve 64. It is noted that in the embodiment shown, the inlet and outlet valves 62, 64 are both partially formed by or contained in a valve assembly 65, which valve assembly also comprises a base plate or spacer sheet 55 placed on the valve block 117. As will be discussed in more detail with respect to FIGS. 15 and 16, this particular valve arrangement is advantageous in that it allows for dismantling the valves for the purpose of cleaning and/or replacing broken parts or the entire valves.

The middle part 3 and/or support assembly 6 further comprises a recirculation or return line 68, through which liquid from the dosing chamber is transferred back to the recipient instead of to the outside. The activation of the recirculation mode is initiated by turning the knob 12 of the valve assembly 10.

FIG. 2 further shows the fastening arrangement 5, comprising a cap nut 5. The cap nut comprises an inner thread 110, which matches an outside thread on the recipient (not shown) on which the dispenser 1 is connected. The cap nut 5 is turnably mounted on said support assembly 6, in particular on support block 66. In this way, the dispenser can be rotated around its longitudinal axis when being fixed on the recipient.

Figure 16:
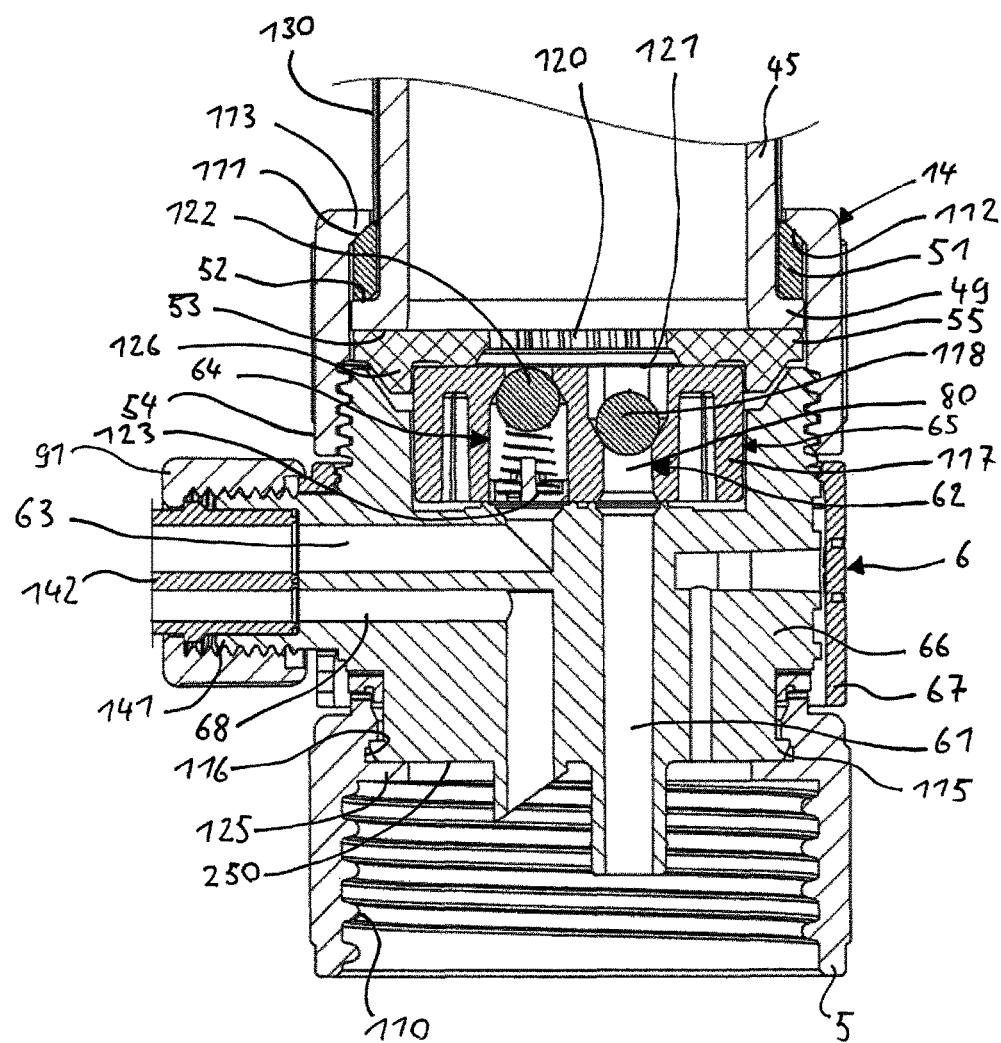
FIG. 16 A is an enlarged extract of FIG. 2, showing in more detail the middle and/or channelling part and the connecting part of the dispenser and in particular the valve arrangement of the dispenser.
Figure 16:
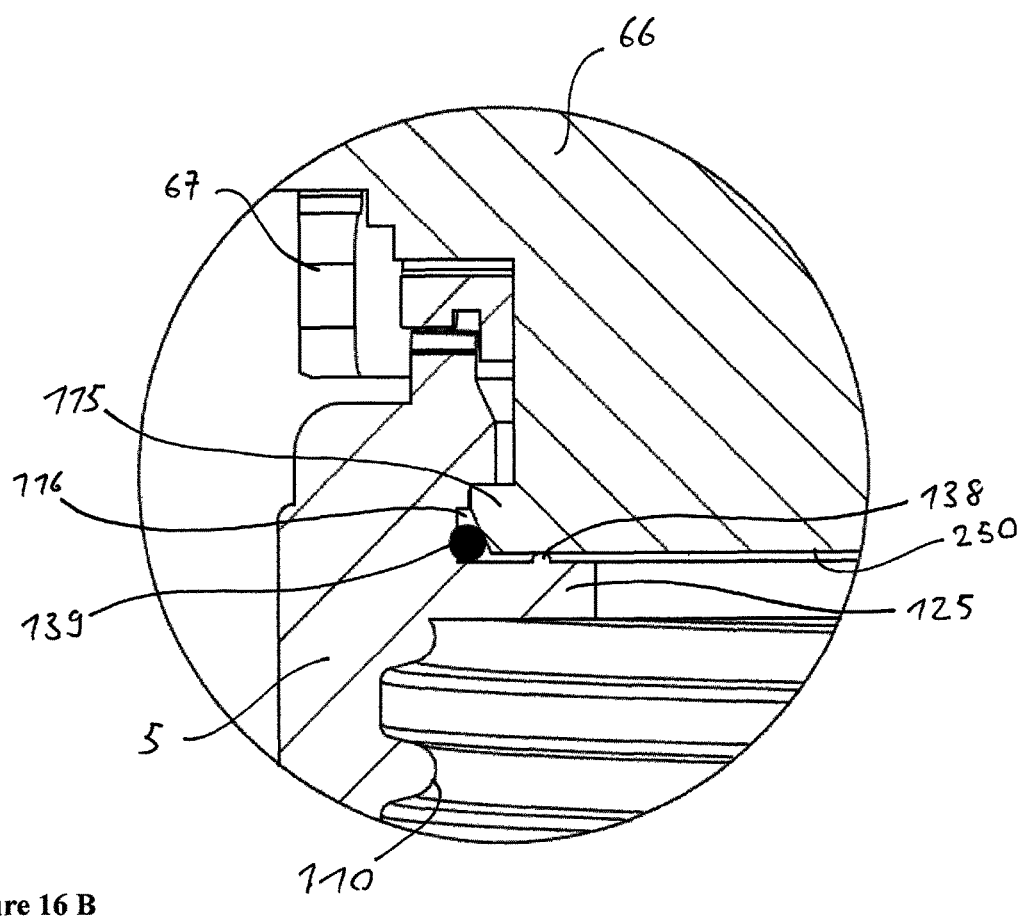

As is indicated on FIG. 2, but also visible on FIGS. 3 and 16, a protective sleeve, jacket, cover, shell or wrap 130 is provided on the outer surface of the cylinder 45 of the piston-cylinder assembly 40. The protective sleeve or jacket is comparatively thinner than the wall of cylinder 45. The protective jacket 130 protects the cylinder 45, the latter being generally and preferably made from glass. The protective jacket 130 thus protects the cylinder 45 from breaking when hit with hard objects or when falling down, for example. Furthermore, the protective jacket 130 protects a user in case the cylinder should still break. As the dispensers of the invention may be used to dose toxic and/or aggressive substances, the protective jacket 130 is provided in order to prevent spillage of liquid, maintaining the cylinder together and substantially tight even if broken. According to a preferred embodiment, the protective jacket 130 is partially and/or totally transparent, in particular with respect to visible light. In some prior art dispensers, non-transparent protective sleeves are used. However, it is advantageous to use a transparent jacket so that the user can observe the liquid present in the dosing chamber. In particular, it is useful if the user can check if the dosing chamber is completely purged or if there are air bubbles remaining on the piston, for example According to an embodiment, said protective jacket 130 has, when seen by the eye of a user, a smooth, even outer surface, which is preferably free of visible irregularities, in particular surface irregularities or material irregularities which affect transparency and/or visibility across said protective sleeve and/or which result in light scattering or reduced transparency. A jacket having uneven surface, even if substantially transparent, hampers the view to the liquid present in the cylinder and is thus disadvantageous. It is noted that certain prior art dispenser have a protective jacket obtained by applying a polymer powder onto the cylinder followed by inducing film forming fusion or sintering in an oven. In the prior art, the powders are generally applied by spraying or fluidized-bed coating. The protective jackets obtained in this way do generally form surface irregularities, such as those resulting from small air bubbles or irregularities originating from the original particulate structure. The irregularities may increase with time. According to an embodiment, the protective sleeve of the dispenser of the invention is not made from a powder, in particular not by fusion or sintering of a powder on the cylinder.

According to an embodiment, the protective jacket 130 does not exhibit any substantial change in transparency or of colour due to autoclaving, even repeated autoclaving. In particular, the transparency and/or colour of the protective jacket remains substantially identical following repeated autoclaving. "Substantially identical transparency", for the purpose of this specification, means that any possible change in transparency and/or surface regularity is not noticeable by eye, for example from a distance of 100 cm, 70 cm and most preferably from 50 cm, and thus not considered relevant. In this case, the protective jacket is considered "resistant" to autoclaving.

"Repeated autoclaving" refers two, three, four, five, six, seven, eight, nine, ten or more separate autoclaving events. Preferably, autoclaving refers to exposure to steam of at least 121° C., in particular high pressure saturated steam, for at least 15 minutes.

According to a preferred embodiment, the protective jacket 130 comprises, consists essentially of or consists of shrunk polymer. The shrunk polymer is preferably obtained from a shrinkable polymer, in particular thermo- or heat-shrinkable polymer. It is possible to distinguish heat-shrunk polymers from polymers obtained by heat fusion or sintering of powders. In the latter the particle-based origin of the polymer is recognisable by microscopy.

Examples of heat-shrinkable polymers are fluoropolymers, polyolefins, and mixtures comprising one or both of the aforementioned and/or comprising further polymers and/or additives. Preferably, said fluoropolymers and polyolefins are thermoplastic. The heat-shrinkable polymer is preferably provided in the form of an expanded tube or sleeve that can be placed on the cylinder before heat-shrinking.

Examples of suitable polyolefins are polypropylene (PP), preferably high-density PP, and polymer mixtures or alloys comprising PP.

Examples of suitable fluoropolymers are fluorinated ethylene propylene (FEP), PTFE (polytetrafluoroethylene), and PVDF (polyvinyliden fluoride), for example.

Thermo-shrinkable polymers that are substantially and/or totally transparent, exhibiting exceptional chemical resistance, resistance towards UV and that are heat stable at autoclaving temperatures, such as FEP, are particularly preferred.

Preferably, the protective sleeve is in direct contact with at least part of the outer surface of the cylinder. In particular when done by thermo-shrinking, the protective sleeve gets in an intimate contact with the cylinder. The intimate contact preferably extends over a wide area, in particular over a major part and more preferably over all the area of the visible parts of the cylinder and/or the protective sleeve, respectively. The protective sleeve can preferably not freely rotate with respect to the cylinder. This is preferably a result of said intimate contact. The protective sleeve is rigidly fixed on the cylinder and/or can be removed therefrom only by destroying the protective sleeve. In this embodiment, the protective sleeve is heat-shrunk on the cylinder.

FIG. 3 shows the dispenser of FIGS. 1 and 2 with the piston 46 being in a partially lifted position. This is achieved by a user seizing the outer sleeve 13 with the hand and raising the same vertically upwards. This movement results in the aspiration of a specific amount of liquid from the recipient (not shown) through the suction line 61 into the dosing chamber 70. The dosing of a measured amount of liquid to the outside through the delivery line 63 and the spout assembly 7 is completed by pushing the sleeve 13 again downwards to the initial position of rest (FIGS. 1 and 2). Due to the valves 62, 64, the liquid is guided through said lines as described.

In FIG. 3, the volume selector 20 is positioned about in the middle or halfway on the vertical slot 15 in the outer sleeve 13. The adjusted volume thus corresponds to about half of the maximum delivery volume of the dispenser 1. It can be seen that the selector 20 abuts at its upper end on the limit stop 72, meaning that the sleeve 13 and thereby piston 46 cannot be raised any further. In the dosing mode, in this position the desired liquid volume has been drawn into the dosing chamber 70 and can now be delivered by pushing the sleeve 13 (and thereby piston 46) carefully downwards, forcing the liquid through the delivery line 63 and through the spout assembly 7 (not shown).

FIGS. 4 to 9 disclose the construction and working principle of the swayable volume selector 20. Before detailing the construction of the swayable selector 20, the general functioning of volume adjustment and dosing is set out. The selector 20 (or selector 30) is part of the volume adjustment mechanism 16. The volume adjustment mechanism also encompasses the longitudinal, substantially vertical slot 15, along which the selector 20 can be displaced in order to adjust the volume, in accordance with the graduation provided on the outer surface of the sleeve 13. During dosing, the selector 20 limits the extension or travel that the piston 46 can do. This is because the selector 20 comprises an abutting surface 41, which abuts against a limit stop 72 rigidly fixed on the cylinder 45 (FIGS. 1-3, 5, 6, 8, 9). When the outer sleeve 13 is raised for aspiring liquid into the dosing chamber 70, selector 20 abuts against said limit stop 72, and thus also interrupts the course of the piston 46, which is connected to the outer sleeve 13 by the top assembly 25. The volume adjustment mechanism 16 thus comprises the outer sleeve 13 and/or said slot therein 15, the selector 20, and said limit stop 72 fixed at the upper end of the cylinder 45. Since the swayable button-based selector 20 shown in FIGS. 4-9 is fixed, blocked or arrested on any adjusted position by teeth engagement, the teethed rail 31 on the sleeve 13 can also be considered to be part of the volume adjustment mechanism 16. On the other hand, if a selector without teeth engagement is used, such as the selector 30, the teethed rail is not necessary and is not part of the adjustment mechanism.

The selector 20 is a swayable selector and/or comprises a swayable button 36. As can be seen on FIG. 4, the swayable selector 20 comprises further structural elements and/or separate pieces, in particular an indicator piece 34 comprising two pointers 35, 35'. In the assembled selector, the pointers 35, 35' are aligned with the marking lines of the graduation 17 and thus indicate the volume. In this way, the selector 20 and said graduation forms the volume display of the dispenser. Of course, the invention also encompasses swayable selectors 20 comprising only one pointer 35.

The indicator piece 34 comprises a plurality of extensions, which are preferably arranged in pairs 86, 86', 87, 87', 88, 88'.

The selector 20 further comprises a support or sliding piece 33. This comprises a surface 82 (FIG. 7) on which spring 37 rests as well as structural elements for connecting and guiding the movement of the swayable button 36. Therefore, support piece 33 may also be referred to as spring holding and/or swaying pin piece 33. Furthermore, piece 33 serves as a guide or frame for the transducer piece, pusher or latch 32. The piece 33 comprises a support surface for the spring 37 and columns 71, 71' on the top of which two pairs of swaying pins or button guiders 73, 74; 73', 74' are provided. When mounted, the button 36 is capable of pivoting, whereby said the pivoting movement is guided or controlled by said swaying pins 73, 74; 73', 74'. Of course, the invention also encompasses that the selector 20 and in particular the swaying pin piece 33 comprises only one column 71 and only one pair of swaying pins 73, 74', which pins may be provided, for example, as a swaying axle. If there is a swaying axle, it may be arranged centrally (not shown) or at the longitudinal (top or bottom) ends (towards the upside or downside) on the selector, for example. The two swaying pins of one pair of swaying pins 73, 74 and 73', 74', respectively, are preferably coaxially arranged, and thus have an aspect and/or function of an axle. The two "axles" formed by the two pairs of swaying pins 73, 74 and 73', 74', respectively, in the embodiment shown are preferably parallel, have preferably the substantially the same length and/or are preferably placed at equal height with respect to the base portion or sliding surface portion 83 of said support piece 33. Since the piece 33 also forms or contains an abutting surface 41, which abuts against limit stop 72 when the adjusted volume is sucked into the dosing chamber, the piece 33 can also be called travel abutment piece 33.

Each pair of swaying pins 73, 74; 73', 74', preferably has a longitudinal, axle like configuration. Preferably these axles extend, when the selector 20 is mounted on the dispenser 1, on a substantially horizontal axis, preferably perpendicular to the main longitudinal (generally vertical) axis of the piston-cylinder assembly.

According to an embodiment (not shown), said support piece 33 and the indicator piece 34 are formed as one piece or are rigidly connected, for example glued.

The pieces 33 and 34 could also be formed of one continuous piece of a single, continuous material, as opposed two connected but individually fabricated pieces.

In the embodiment shown, pieces 33 and 34 are clipped together.

The swaying selector 20 further preferably comprises a transducer piece, transducer or pusher 32, comprising an engagement, arresting or blocking structure 75. In the embodiment shown, the arresting structure comprises a plurality, for example 1 to 50, preferably 2 to 10 counterteeth 76, 76', 76'', 76''', 76''''. These counterteeth are preferably provided in the form of pairs on both lateral sides of the transducer 32 and are designed to engage or disengage with teeth on the teethed rail 31 on the outer sleeve 13 when positioning or displacing, respectively, the selector 20, as will be set out in more detail below.

As can be seen as dotted lines on the button 36 in FIG. 4, the button comprises, preferably on its inside, two pairs of cavities 77, 78 and 77', 78', in which said pairs of pins 73, 74; 73', 74' can move, so that the button 36 is swayably and/or pivotably connected to said support piece 33 or on the selector 20 in general. The pairs of cavities 77, 78; 77', 78' are short, oblong and preferably slightly curved grooves. Once the button 36 being assembled by inserting the pins 73, 74; 73', 74' in the respective grooves (pins 73 and 74 are guided in grooves 77, 78 and pins 73', 74' are guided in grooves 77' and 78', respectively), the button is connected to said sliding piece 33. This is not a rigid connection, because said grooves are longitudinal and allow the pins to be guided and thus move inside the grooves. It is noted that said grooves have a width, which is only slightly larger than the diameter of the pins, but the length of the grooves in longer than said diameter, so that the pins can move in and are guided in the longitudinal extension of said grooves.

In the exploded view of FIG. 4, the individual pieces of the swayable selector 20 are shown in the order in which they are found when the selector is assembled and functionally mounted on the dispenser.

Figure 5:
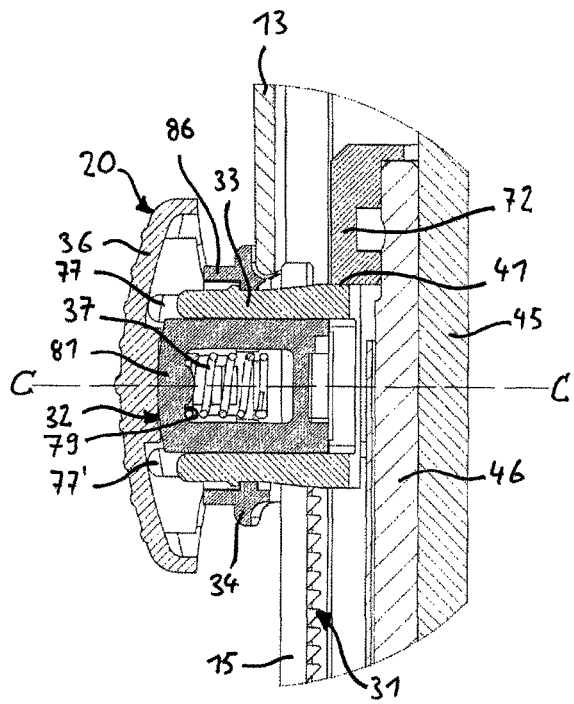
FIG. 5 is an enlarged view of a longitudinal and axial section through the swayable volume selector shown in FIG. 3, whereby the axial transversal section passes along line A-A indicated in FIG. 7.
Figure 7:
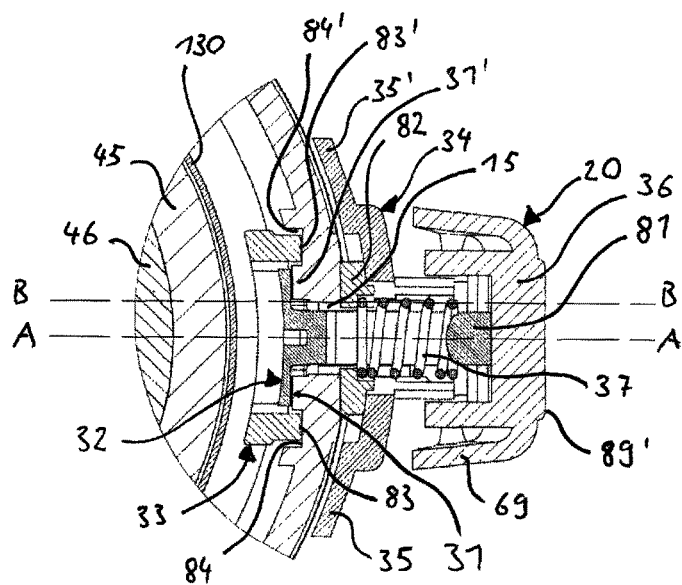
FIG. 7 is an enlarged view of a transversal section through the swaying volume selector shown in FIGS. 3 to 6, said cross-section extending along line C-C indicated in FIG. 5.

The longitudinal cross-section shown in FIG. 5 is drawn longitudinally and centrally through the swayable selector 20, along the axis A-A shown in the cross-section of FIG. 7.

In the position shown in FIG. 5, the support piece 33 abuts against limit stop limit 72 (in this regard, the name "selector abutment piece" 33 is appropriate). This means that the dispenser is in a "STOP" position (the volume 0 is adjusted), as shown in FIGS. 1 and 2. The abutment is also achieved in FIG. 3, which represents the position when liquid has been aspired into the dosing chamber 70, and is ready to be dispensed by pushing the piston downwards again.

In FIG. 5, it can be seen that spring 37 abuts, with its distal end, on the transducer or latch 32, more particularly on the inner surface 79 of a distal, vertical connection 81 of the latch. As can better be seen in FIGS. 6 and 7, the proximal end of spring 37 rests on a bearing surface 82 of the support piece 33. The swayable button 36 directly abuts against the latch 32, namely on the outer surface of said distal connection 81. The contact surfaces between the latch 32 and the swayable button 36 form a "clearing profile", whereby a swaying or rotational movement of the button 32 translates into a linear sliding movement of latch 32, as will be described in more detail elsewhere in this specification.

As the skilled person will understand, the spring 37 of the swayable selector 20 is arranged so that it pushes the latch 32 (which is linked to the arresting structure 75) and the swayable button in a distal direction, more specifically in a radial direction with respect to the piston-cylinder assembly. The entire selector 20 is held together, because it is blocked from moving in a radial, distal direction because of support piece 33, which is in contact with and presses against the inner surface of the outer sleeve 13. More specifically, the support piece 33 comprises a pair of sliding surfaces 83, 83', which are guided on a pair of longitudinal rails or grooves 84, 84' provided on the inner surface of and/or inside the outer sleeve 13 (FIG. 7).

Figure 6:
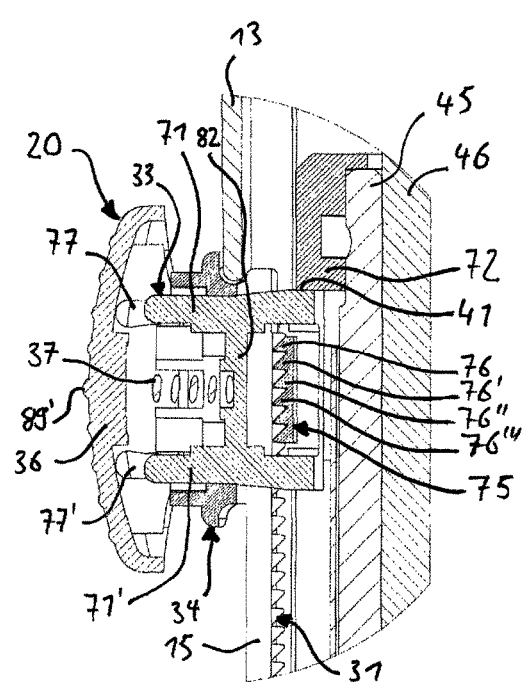
FIG. 6 is an enlarged view of a longitudinal section through the swayable volume selector shown in FIG. 3, whereby the section passes along line B-B in FIG. 7 and is thus parallel to the longitudinal axis of the dispenser.

As FIG. 5, the section of FIG. 6 is drawn longitudinally through the swayable selector 20, but in contrast to FIG. 5 the section is displaced in parallel with respect the centre, in particular along the axis B-B shown in the cross-section of FIG. 7. In this section, the spring 37 is visible as a plurality of substantially vertical, parallel ellipses. In FIG. 6, the bearing surface 82 can be seen, as well as columns 71, 71', which carry the pins 73, 74; 73', 74'. FIG. 6 gives already an impression of how the pins (which are them-selves not visible) are guided in the grooves 77, 77' (the pins extend perpendicularly to the drawing).

Importantly, the engagement of the teeth 76, 76', etc., of the arresting structure 75 with the teeth of the teethed rail 31 can be seen in FIG. 6. In the situation shown in FIGS. 5-7, the spring pushes the button in a radially distal direction, that is away from the piston-cylinder assembly, so that the teeth of the arresting structure 75 and of the teethed rail of the sleeve 13 engage in each other and the entire volume selector is thus blocked and/or arrested on a given longitudinal position in the vertical, longitudinal slot 15 of the outer sleeve 13.

The cross-section shown in FIG. 7 assists the understanding of FIGS. 4-6 and 8-9 and indicates with A-A and B-B the axis or planes defining the sections shown in FIGS. 5, 8 and 6, 9, respectively. In the central cross section of FIG. 7, the pointers 35, 35' of the indicator piece 34 can be seen. It can also be seen how the indicator piece is placed distally (outside the outer sleeve 13) on the bearing surface 82, that is on the selector abutment piece 33.

As can be understood from the above description, when a user presses on button 36, the transducer 32 is pushed in a radial proximal direction, towards the piston-cylinder assembly. Support piece 33 guides the movement of the transducer 32, by forming a frame by columns 71, 71' and an opening in said surface 82. The arresting structure 75, which is linked to the transducer 75, disengages from the teethed rail 31. The teeth being disengaged, the selector is no longer arrested and can now be slided upwards or downwards for changing the volume. This will be described in more detail with respect to FIGS. 8 and 9 below, which illustrate in particular the swaying function of the selector 20 and/or the button 36.

In the embodiment shown, the transducer 32, which translates and/or transduces the pressuring of the button 36 to the arresting structure 75, so that the latter disengages from the arresting connection with the sleeve 13, is formed as one single piece with the arresting structure 75. In this embodiment, one could thus call the transducer piece with the arresting structure as arresting piece 32. However, the invention also encompasses that the functions of transducing the pressure of the button and the arresting function are accomplished by two separate pieces. The transducer 32 would in this case be connected with and act on the arresting structure 75 in such a way that the arresting structure disengages from and engages with, respectively, the arresting position of the selector when pressing and releasing, respectively, the button. The transducer 32 and the arresting structure could be connected via an articulation, hinge, joint, or link, for example.

Figures 8, 9:
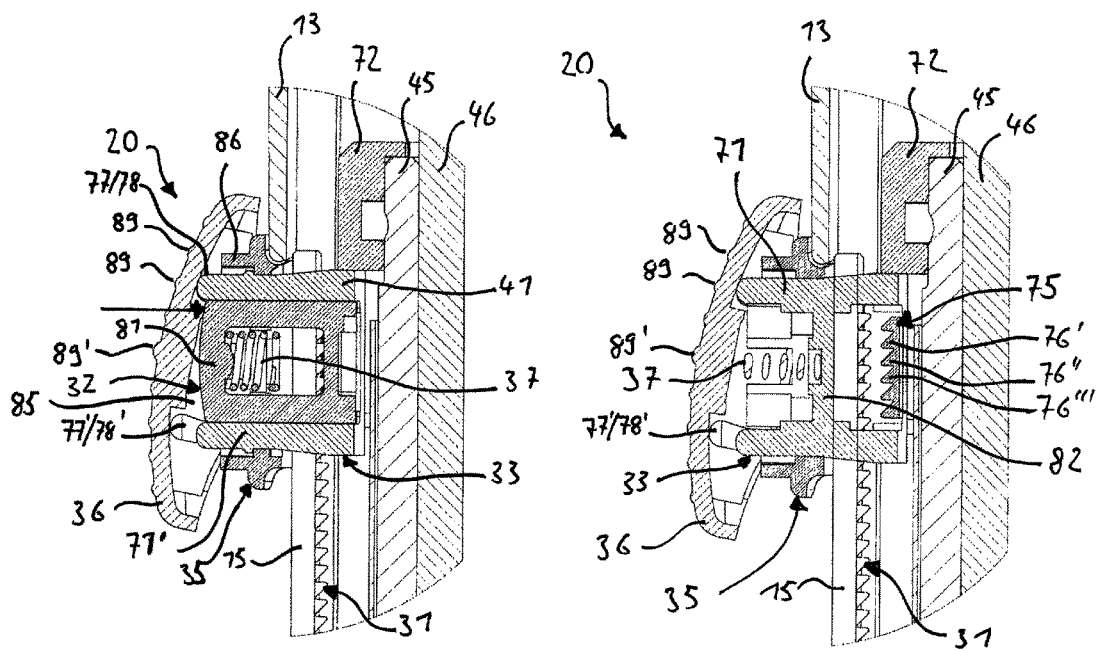
FIG. 8 is an enlarged view of a longitudinal and axial section through the swayable volume selector similar to FIG. 5, with the selector being in an upside swayed position, so that it can be axially moved for volume adjustment.
FIG. 9 is an enlarged view of a longitudinal and axial section through the swayable volume selector similar to FIG. 6, with the selector being in an upside swayed position, so that it can be axially moved for volume adjustment.

FIGS. 8 and 9 are longitudinal sections corresponding to FIGS. 5 and 6, which sections extend thus along axis A-A and B-B, respectively, shown in the cross-section of FIG. 7. In contrast to the situation shown in FIGS. 5 and 6, the button 36 is shown in a depressed position, which is obtained when a user pressures the button with his thumb, for example. More specifically, the button 36 is pressed down on its upper side. In this situation, the pins 73, 74 (not shown) are guided to the distal end of the grooves 77, 78, guiding the movement of the button 36 and allowing the latter to sway, meaning that it is depressed only on the upper side as shown in FIGS. 8 and 9. The pins 73', 74' (not shown) on the lower end of the selector abutment piece 33 did not move in the grooves 77'/78' at the lower end of the button 36, and hence the button skewed, shifted and/or swayed only on the upper side.

As can be seen in FIG. 8, when only the upper side of the button 36 is depressed by a user, the transducer 32 is pushed only on the upper side, as indicated with the arrow. At the lower end, a split 85 is formed, resulting from the asymmetric depression of the button. It is also noted that the transducer 32 is vertically blocked in the support piece 33, in particularly between said columns 71, 71'. In particular, the transducer piece 32 is radially and/or horizontally guided in said support piece 33. Therefore, when the button 36 is pressed either on the upper end or lower end, the transducer piece 33 is always displaced in the same direction, namely in a radial and proximal direction. This is the result of the "clearance profile" of the latch 32 and the button 36 at their respective contact surfaces. In the embodiment shown, the clearing profile is realised as a concave and corresponding convex surfaces. Depression of the button results in a sliding movement of the button 36 on the contact surface with connection 81 of latch 32, and at the same time pushing of the latch in opposition to the spring 37.

Button 36 is swayably connected with said support piece 33 in such a way that the button cannot only be depressed uniformly, but can be depressed on one end only, for example only on the top (FIGS. 8, 9) or only on the bottom, resulting in said swaying movement. The latter situation (depressed and swayed on the bottom end) is not shown in the figures, but equivalent inversed to the situation shown in FIGS. 8, 9, because the selector 20 comprises a horizontal axis of symmetry. The horizontal axis of symmetry only applies if one disregards teeth 76', 76', etc., which are not symmetric teeth, but which comprise or are formed by a horizontal bottom surface and a skewed top surface, as can be seen in FIGS. 6 and 9, so as to assist their arresting function. This reflects that the teethed rail is based on teeth with a horizontal (upper) side.

The button 36 can be depressed in the middle, which does not result in swaying, on the top or on the bottom, the latter two ways of depressing resulting in skewing and/or swaying. As can be deduced from FIGS. 1, 4 and 13, the button 36 of selector 20, when seen from the front, has an overall rectangular form, with the longer sides of the rectangle being the lateral sides and the shorter sides being top and bottom sides. The corners of the rectangle are rounded.

Furthermore, the button 36 has a convex outer contact surface for depressing the button. This facilitates the unilateral (top or bottom) depression of the button and the displacement of the selector 20 following such a unilateral depression as described elsewhere in this specification. The surface of button 36 comprises a plurality of horizontal ribs 89 (see FIG. 9) for preventing the finger of the user from slipping off the button when depressing the button and/or displacing the depressed button. In general, the design of the button 36 indicates or is adapted to its swaying characteristics. For example, the lateral wall 69, as seen in FIG. 4, has a curved profile, in particular oppositely curved to the convex outer surface of button 36, so that the swaying characteristics of the button 36 become apparent to a user contemplating the dispenser.

The central rib 89' of said horizontal ribs 89 is bigger than the remaining ribs, thereby forming an indication to the user that the button has preferably to be depressed specifically on its up- and/or downside, at the option of the user. According to an embodiment, the button 36 comprises a structural element, for example in the form of a rib, indicating the position of a swaying axis, which may be suitable to indicate a user the swaying nature of the button and thus the possibility of depression at the sides as indicated by the structural element.

The depression on button 36, whether in swaying manner or not, results in the displacement of transducer 32, so that the teeth 76, 76', etc. on the arresting structure 75 disengage from the teethed rail 31, and the slider can be displaced vertically. It is noted that when a user intends to move the selector downward, it is convenient to pressure the button 36 on the upper side, as shown on FIGS. 8 and 9. If the selector 20 were in a lower position and a user intended to raise the selector (to adjust a smaller volume), it is convenient to pressure the button 36 on its lower end. In this way, the use of a swayable button 36 and/or selector 20 renders the deblocking of the selector more convenient and furthermore allows anticipating the direction of the volume adjustment. In other words, the act of depressing the button 36 is ideally not notably distinguished from vertically displacing the selector 20. For example, a user may just push the button 36 downwards to displace it downwards. Using the swayable selector 20 of the invention, the downward movement results in disengagement, unlocking and/or deblocking of the button and displacement of the selector 20 at the same time, and thus facilitates the volume adjustment.

In this regard, it is noted that the "swaying" referred herein is preferably a swaying, swinging, pivoting, and/or shifting on one side or end, preferably swaying or pivoting around a horizontal axis that is perpendicular to the axis of the dispenser 1. The swaying movement of the swaying button preferably takes place in a vertical plane, thus the swaying arms or the swaying levers extend thus preferably in the vertical plane during said swaying movement.

According to an alternative embodiment, the volume selector comprises two or more separate buttons, one of said buttons provide at or close to the bottom end of the selector and one button provided at the top end of the selector, wherein the depression of any one of the two buttons unlocks the selector for displacement and volume adjustment.

As can be seen in FIGS. 2, 3, 5, 6, the teeth of the teethed rack 31 are oriented in a proximal direction, towards the centre of the piston-cylinder assembly. The teethed rack 31 is preferably provided on the inner or inside surface of the outer sleeve 13. Preferably, the teethed rack 31, when considered as a longitudinal band or surface with teeth, is not radially oriented with respect to the piston-cylinder assembly, but oriented like a tangent or passing line with respect to the piston-cylinder assembly. In this way, the teethed rack is not or hardly visible by the user contemplating the dispenser 1 from outside. The teeth may possibly be perceived through the longitudinal slot 15 (FIG. 1). This is advantageous with respect to situations where a teethed rack on exposed to the outside of the sleeve 13, such as in US 2011/0127298, EP0542241, or DE 23 43 687, just to mention a few. By providing the teethed rack inside the inner sleeve 31 according to this embodiment of the invention, the teeth are better protected from dirt accumulation and from mechanical abrasion or damage in general.

As can be understood from FIG. 4 (two engagement structures 75 and 75') and FIG. 7, there are two teethed rails 31, 31', provided in parallel, along both sides of the longitudinal slot 15. The use of two rails 31, 31' renders the positioning of the selector 30 more stable. The invention does not exclude and thus encompasses that there is only one teethed rail on one side of the slot 15.

FIGS. 10 to 14 show the top part and/or top assembly 25 of the dispenser 1, illustrating the connection between the piston 46 and the outer sleeve 13 as well as the calibration mechanism of the dispenser.

Figure 10:
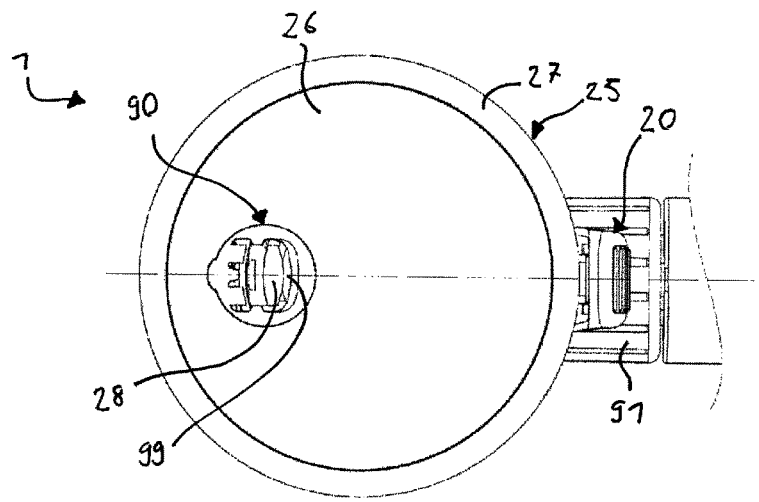
FIG. 10 is a top-down view to the dispenser shown in FIGS. 1 to 3, in which the liquid outlet is only partially shown.

The top-down view of FIG. 10 shows the lid 26 provided on the top of the dispenser, which covers the calibration mechanism or calibration assembly. Also the swayable selector 20 and the connecting nut 91 of the spout assembly 7 can be seen, the reminder of the spout assembly not being shown (s-formed line). The lid 26 is placed on a connector or support 27, which will also be referred to as connecting, support, calibration and/or top collar 27.

Figure 11:
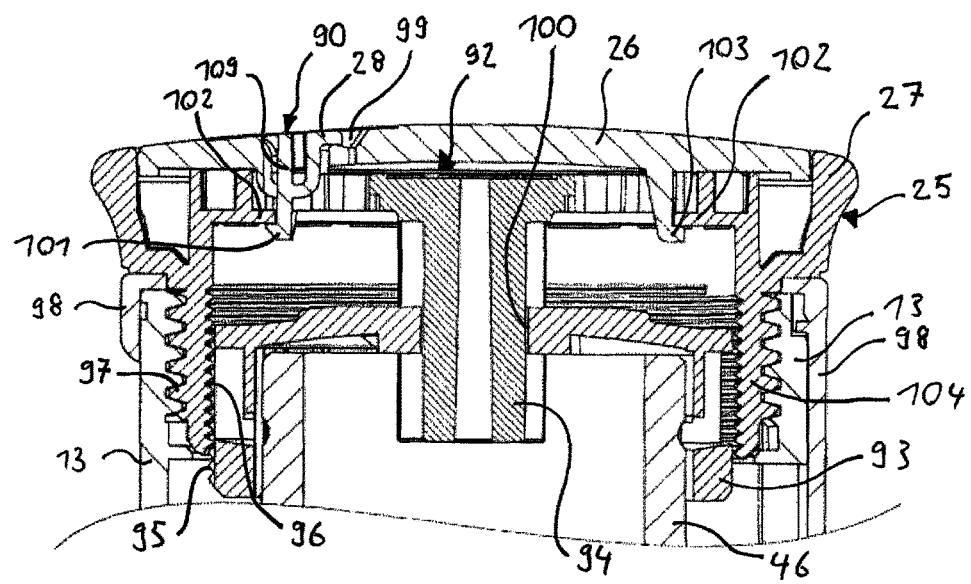
FIG. 11 is an enlarged longitudinal and axial section of the top of the dispenser shown in FIGS. 1 to 3, showing the details of the calibration mechanism.

From FIG. 10 in combination with FIG. 11, the functioning of the fastening assembly 90 of the lid 26 becomes more clearly apparent.

The lid comprises an opening and/or closure or fastening assembly 90. This opening assembly 90 comprises in particular a U-shaped opening actuator or U-clip 109, which is accessible or actionable on the lid, in particular through an opening 99 on the upper surface of the lid 26, as can be seen in FIG. 10. In the embodiment shown, one extremity of the opening U-actuator is provided in the form of an ear 28, which can be actuated through said opening by a fingernail, for example. The curved form of the ear 28, as can be seen in FIG. 10, corresponds to the grip formed by a fingernail. The other end of the U-shaped actuator 109 is connected to the lid. The U-clip is formed in one piece with the lid 26, and may be produced, for example, by injection moulding.

About at the position of the curvature of the U, the U-clip comprises a catch 101, which, in the closed position, is retained by a rim 102 provided in the top collar 27. In the embodiment shown, the rim 102 is an annular salient or neck. The calibration tool or key 92 rests on this rim 102.

The U-shaped actuator 109 forms a lever that acts on said catch 101. When a user displaces the ear 28, the lever connection results in a disconnection of the catch 101 from the rim 102, and the lid 26 can be removed.

The entire clip connection of the lid 26 comprises a second catch 103 on the opposed side of the lid, which also engages with the rim 102, but which cannot be directly actuated by the user. By releasing catch 101, and lifting the lid on the respective side, the catch 102 can be released simply by lifting the lid 26 out of the top collar 27.

Of course, one can envisage other types of releasable closures giving access to the calibration mechanism, such as the lid 26 on the top collar 27. One can envisage turnable closures in general, such as screw or threaded closures and bayonet closures, clip closures in general, snap closures, for example, just to mention a few. Preferably, the closure giving access to the calibration mechanism can be actuated by hand by a user, without the need of any tool, such as a specific tool or a general tool, such as a screwdriver, for example.

Figure 12:
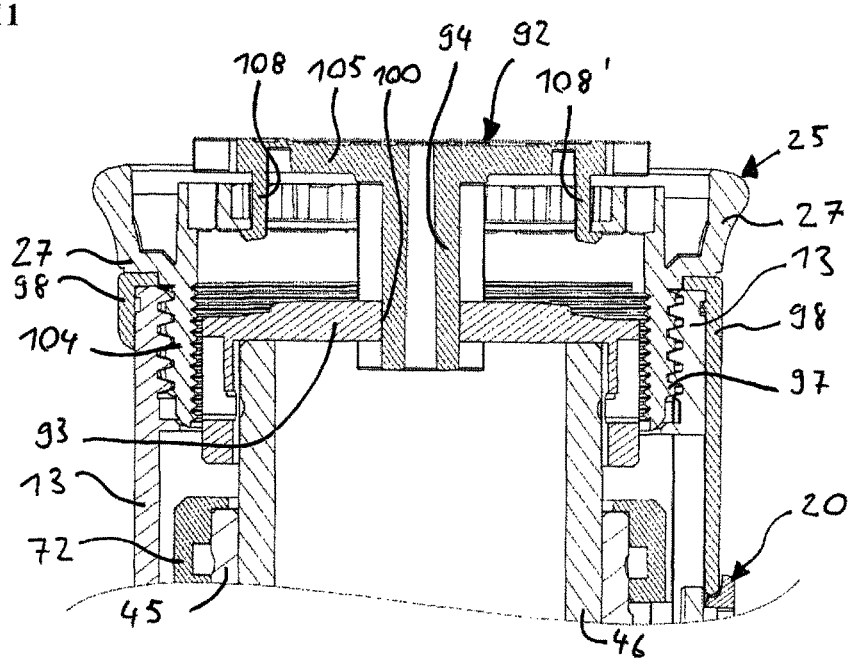
FIG. 12 is an enlarged longitudinal and axial section of the top of the dispenser similar to FIG. 11, with the difference that a top lid has been removed and a calibration key is lifted and rotated by 90° for better visibility. Rotation of the calibration key is used for calibration of the dispenser.
Figure 13:
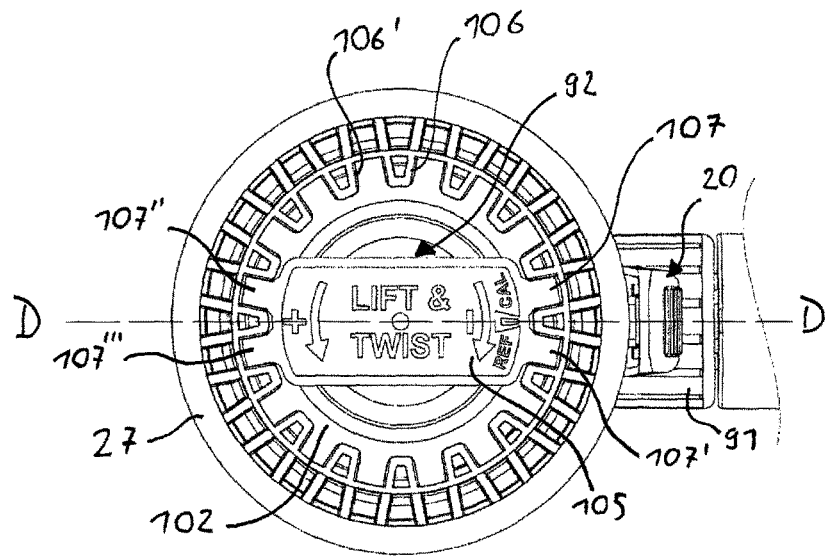
FIG. 13 is a top-down view to the dispenser similar to FIG. 10, in which the top lid has been removed.

FIGS. 11 and 12 are longitudinal sections of the top assembly 25 of the dispenser 1, drawn through line D-D in FIG. 13.

As can be seen on FIG. 11, the top collar 27 comprises on its lower end an external thread 97, matching an internal thread at the top end of outer sleeve 13. The sleeve 13 is rigidly but detachably connected to collar 27 by way of this threaded connection.

Also a top sleeve cover 98 can be seen in FIG. 11, which is also indicated in FIG. 1. The top sleeve cover can be considered as part of outer sleeve 13. In the embodiment shown, the outer sleeve 13 comprises two half cylindrical partial sleeves, which are kept together on the top of sleeve 13 by said top sleeve cover 98 and on the bottom by bottom sleeve cover 98' (FIG. 1).

Figure 15:
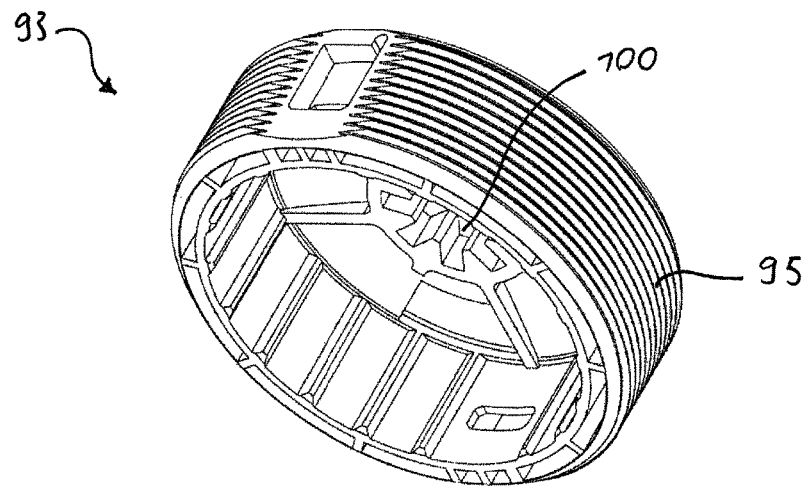
FIG. 15 is an enlarged perspective view of the calibration screw of the dispenser shown in FIGS. 1 to 3.

The collar 27 further comprises an inner thread 96. The outer thread 97 and said inner thread 96 are preferably provided on a hollow cylindrical or tubular downward extension 104 of said collar 27. In the embodiment shown, the inner thread of said top collar 25 has a smaller pitch than said external thread 97. A calibration screw or nut 93 is threadedly engaged in said inner thread 96 of said collar 27. The calibration screw thus has an external thread 95 matching the inner thread 96 of collar 27. In the embodiment shown, the calibration screw 93 is rigidly connected to piston 46, for example by gluing. In particular, piston 46 is engaged in a tubular or hollow cylindrical section of said calibration screw 93 and rigidly fixed therein. FIG. 15 shows a perspective view of the calibration screw 93.

As the skilled person will understand, the piston 46 is rigidly connected to the outer sleeve 13 by way of top collar 27, as both, the sleeve 13 and the piston 46 (via calibration screw 93) are fixed on said top collar 27, which is why collar 27 is also referred to as connector. In the embodiment shown, said connection between sleeve 13 and piston 46 is releasable and also adjustable, due to said threaded connections (95, 96, 97).

The top assembly 25 comprises a calibration tool or driver. Said calibration driver 92 comprises an axial extension 94, which comprises longitudinal ribs, which fit grooves comprised in a central opening 100 on the calibration screw 93 (FIG. 15). Said calibration driver 92 and said calibration screw 93 are rotationally locked by way of said ribs and grooves, which are arranged in a ring-like circular manner on said driver 92 (not shown) and screw 93 (FIG. 15).

As can better be seen in FIG. 12, said calibration driver 92 has a T-like shape. It comprises an upper horizontal plate 105 and a central, vertical and longitudinal extension 94, which are rigidly connected with each other, in particular formed as one piece.

In the rest state or state of normal use of the dispenser 1, the horizontal plate 105 lies on the top surface of said rim 102. In this position, the plate 105 is rotationally fixed or locked by way of ribs 106, which are provided in collar 27, as better visible in FIGS. 13 and 14. When the lid 26 is in place (FIGS. 10 and 11), the driver 92 cannot be unlocked or deblocked. This is because the lid prevents lifting of the driver 92.

In FIG. 12, the lid 26 has been removed, and the calibration driver 92 is lifted. Further, in order to show the T-shape of the calibration driver 92, the latter has been rotated by 90° with respect to the position shown in FIG. 11. In FIG. 11, the plate 105, which forms the horizontal top bar of the "T", is aligned to be perpendicular to the plane of the figure, so that the plate 105 cannot be fully distinguished in FIG. 11. This was required for the view of FIG. 11 to show the catches 101 and 103, which extend laterally on each side of said plate 105 into collar 27 to be clipped against the lower surface of the rim 102 (see also FIGS. 13 and 14).

As can be seen in FIG. 12, the calibration driver 92 is retained in the device by way of catches or hooks 108, 108', which abut against the lower surface of rim 102 (the same rim 102 is used to retain the lid 26). In other words, the calibration diver 92 cannot be removed from its placing inside the dispenser, but can only be moved in as far as necessary to conduct calibration as described further below. Calibration driver 92 is thus retained in the dispenser, during normal use as well as during calibration. The extension 94 of driver 92 remains rotationally locked to calibration screw 93 in this lifted position.

Figure 14:
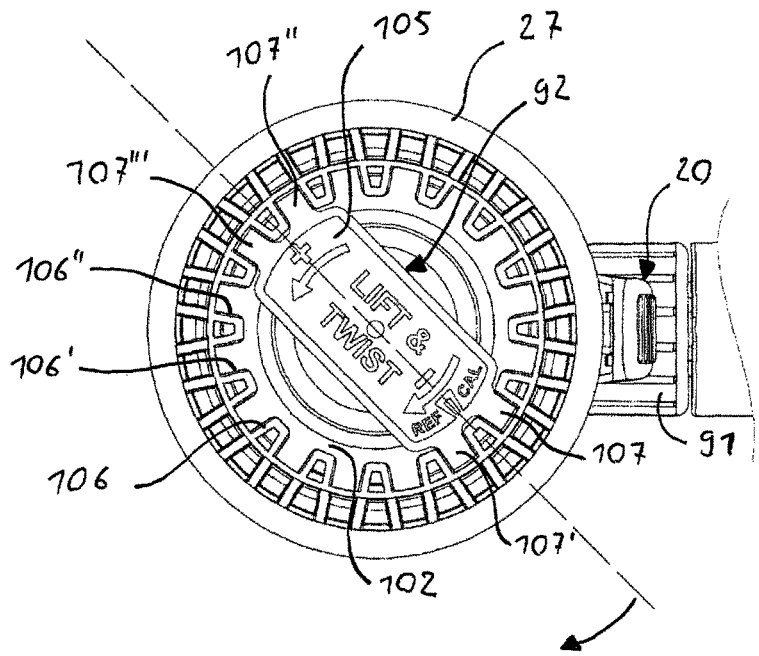
FIG. 14 is the same view as FIG. 13, but following calibration, wherein a calibration key has been partially rotated and replaced in a blocked position.

FIGS. 13 and 14 are top views onto the dispenser, similar as FIG. 10, but with the lid 26 being removed, so to clear the view to the calibration driver 92. In these figures, the driver 92 is not lifted, but rests on rim 102.

As can be seen, the calibration driver 92 is rotationally locked in the resting position (corresponding to the normal position of use of the dispenser). In particular extensions 107, 107', 107", 107''' provided distally and axially on said plate 105 of calibration driver 92 engage and fit in spaces or bottoms between radially proximally oriented ribs 106, 106', 106″, etc., which are radially distributed on said collar 27, forming an internal gear-like structure.

Of course, instead of said teeth or ribs matching in clearances between counter-teeth or counter-ribs said calibration driver could be locked by other means for perverting inadvertent change. For example, the calibration could be blocked by other locking types, by a further, separate or specific locking piece, by a clip, by friction, for example by pressure exerted on it by the lid, just to mention a few possibilities.

By lifting the calibration driver 92 as shown in FIG. 12, it can disengage from the internal gear formed by ribs (106, 106′, etc.) and can thus be rotated. Rotation of the driver 92 drives the rotation of calibration screw 93 (FIGS. 11 and 12) and thus results in translational relative displacement of the piston 46 with respect to casing or sleeve 13. More specifically, calibration screw 93 is screwed and thus lifted or lowered, by way of matching threads 95 and 96, respectively. One can also say that the rotation of the calibration driver results in a translational relative displacement of the outer sleeve 13 (comprising the volume display) with respect to the limit stop 72 provided on said cylinder 45. In other words, calibration results in a change of the piston travel, in as far as determined by the position of the sleeve 13 and/or the selector 20 with respect to the piston-cylinder assembly 40 (FIG. 2). In this way, calibration affects the volume that is dosed with respect to a volume adjusted by the selector 20.

In the embodiment shown, the upper, fixed limit stop for the travel of the piston is provided by upper limit stop 72 (2, 3, 5, 6, 8, 9). The lower fixed limit stop of the piston travel during dosing is defined by the bottom of the dosing chamber, in particular by abutment of the lower end of the piston on the plate 55 (FIG. 2). The course of the piston during dosing is adjusted by positioning the selector 20 or 30, as applicable, on the graduation and/or within longitudinal slot 15 (FIGS. 1-3). The selector is a "travel-limit stop", as the selector moves during dosing along with the outer sleeve or manipulation casing 13. In the embodiment shown, calibration affects the position of the outer sleeve 13 with respect to the piston and cylinder. As the graduation (volume display) and the selector is provided on the outer sleeve, calibration of the dispenser of the embodiment shown is an adjustment of the piston travel to the actually adjusted volume. Calibration preferably does not change the position of a fixed limit stop. Calibration in accordance with the invention preferably results in a change of the position of the travel limit stop, which is preferably determined by the position of the volume selector 20, 30 together with the outer sleeve 13. In the result, calibration preferably comprises or consists of adjusting the dispensed volume to the displayed, selected volume.

The change of the axial position between piston 46 and sleeve 13 changes the relative position of the volume display (graduation) 17 with respect to the (axial) position of the piston 46, and thus results in a change between displayed volume and real dispensed volume, allowing calibration of the dispenser.

On the top plate 105 of calibration driver 92, there is a text "Lift & Twist" indicating the user how to achieve calibration. Arrows with "+" and "−" signs indicate the effect in terms of volume of turning the driver 92 in the indicated direction. For example, in FIG. 14, the driver 92 has been turned to the right (see curved arrow), resulting in a reduction of the dosed volume. For passing from the position shown in FIG. 13 to that shown in FIG. 14, the calibration driver 92 has to be lifted as shown in FIG. 12 and turned two positions to the right, said positions being determined by the inside ribs (106, 106′, etc.) and the extensions (107, 107′, etc.) on the plate 105. As the skilled person will understand, the calibration can only be conducted in discrete steps, defined by the engagement of said ribs (106) and extensions (107). However, said discrete steps being very small (here: 1/16 turn of the calibration screw), and as the thread of the calibration screw has a small pitch, calibration can be effected by effecting very small positional changes of the casing 13 with respect to the piston-cylinder assembly 40.

It is noted that said calibration driver 92 could also be referred to as calibration key or calibration tool, as in general calibration is achieved using a tool, in particular when acting on a calibration screw. However, in accordance with an embodiment, the dispenser of the invention does not require any separate or special tool. Separate tools can easily be lost and it is thus more convenient to be able to achieve calibration without any such separate tool. One could also consider driver 92 as calibration tool that is integral part of the dispenser device. In this regard, driver 92 is a built-in actuator acting on calibration screw 93. As the driver 92 can be accessed and actuated without any tool, by hand, (the lid 26 can be removed by hand as described above), the dispenser can be calibrated by hand and/or without any separate and/or specially adapted tool.

It is further noted that calibration driver 92 when being blocked stays in contact with calibration screw and thus blocks calibration screw 93 in its position. As mentioned, driver 92 and screw 93 are rotationally locked, but could of course also be locked in another way. Driver 92 is only actuated for calibration, but during normal use or rest fulfils the function of preventing inadvertent positional changes of the calibration screw, and more generally inadvertent volume changes and/or changes of the display with respect to the piston-cylinder assembly affecting the accuracy of the dosed liquid.

FIG. 16 A shows the middle or liquid channelling part 3 and the lower or recipient fixing part 2 (FIGS. 1 and 2). The middle part comprises a support structure or assembly 6, which is also referred to as valve block assembly. A large structural element of the valve block assembly 6 is the support block or support base 66, which is the principal support and/or carrier structure of the middle part but also of the entire dispenser 1. The support base 66 contains the ducts 61, 63, 68 and houses the valves 62 and 64 for liquid distribution, as described with respect to FIG. 2.

The upper part 4 of the dispenser is attached to the middle part 3 by way of a connector assembly 14. The outer sleeve 13 is connected at its upper end to the upper end of the piston 46 as descried elsewhere in this specification. The cylinder 45 is, at its bottom end, attached to the support assembly 6 or 3, in particular by way of said connector assembly 14. In the embodiment shown, the connector assembly 14 comprises in particular a slotted ring 51, which is placed on a flange 49 provided on the bottom end of the cylinder 45. A cap nut or connecting nut 54 pressures the slotted ring 51 onto the support or channelling part 3, thereby tightly but releasably attaching the cylinder on said middle part 3 and more specifically onto the support structure 6.

According to an embodiment, the cylinder 45 of the dispenser 1 of the invention comprises a flange 49 at one of its end, in particular at its bottom. Preferably, the cylinder 45 and/or the flange 49 are made of glass. Preferably, the cylinder and the flange are made as one piece, in particular from one continuous piece, for example one single continuous glass piece, manufactured as one piece. Alternatively, the flange is not in one piece with the cylinder, but is a separate piece, for example an annular piece, into which the cylinder is inserted. The annular piece may be made from glass, ceramics or a plastic material, for example polytetrafluoroethylene. Preferably, said annular piece does not contain or form part of a valve housing and is thus separate from the valves or from the valve block. In some prior art devices, the lower end of the cylinder is forced into a support ring or plate, which plate may comprise indents which form part, in particular the upper part of one or several valve housings.

According to the knowledge of the inventors, a cylinder 45 comprising a flange 49 at its bottom end, for attaching the cylinder to the support block assembly 6, has not been disclosed previously. The flange 49 provides a flat, annular surface or rim 52, which can be used as a pressure-loaded area for connecting the cylinder 45 to the support assembly 6, on particular on the support block 66. In particular, the upper annular surface or rim 52 of the flange 49 can be used for exerting a top-down pressure on the flange and the lower surface or rim 53 of the flange 49 can be used for posing the cylinder 45 on the support assembly 6, in particular on the base plate or spacer sheet 55 of the support part, as described in more detail elsewhere in this specification.

In the embodiment shown, the cylinder 45 is indirectly placed on the valve block 117 and on the support block 66, as the spacer plate 55 is situated between the cylinder flange 49 and said valve block 117 and support block 66. In alternative embodiments, the cylinder 35 is directly placed on one or both selected from said valve block 117 and the support block 66.

According to an embodiment, the dispenser of the invention comprises a slotted ring or sleeve 51. The slotted ring 51 is preferably part of the connector assembly 14. The slotted ring 51 is shown in a top-down view in FIG. 17. A further part of the connector assembly 14, the cap nut or connecting nut 54 (not shown in FIG. 17) pressures the slotted ring 51 when being screwed onto the support or channelling part 3. As can be seen in FIG. 16A, the slotted ring does not have a circular cross-section, but has a quadrilateral section, meaning that the slotted ring defines even contact surfaces. This allows the slotted ring 51 to lie with a surface on said flange 49, and also enables the cap nut 54 to pressure on a annular, even and/or flat (truncated conical) surface 111 with a corresponding surface 112 provided on a flange or edge 113 inside the cap nut 54. The cap nut 54 contains an inner thread matching an outer thread on said support block 66. When tightening the nut 54 on the support block 66, the nut edge 113 pressures on the slotted ring 51, which in turn pressures on the flange 49 and the lower end of the cylinder 45, attaching the cylinder and thereby the entire piston-cylinder assembly 40 and/or the entire upper part 4 onto the support block 66. The slot 114 in the slotted ring 51 can best be seen in FIG. 17. The space left by said slot 114 enables the slotted ring 114 to be reduced in diameter when the cap nut 54 is tightened. The flange 49 on the cylinder is thus preferably a fixation and/or compression flange 49. Said slotted ring 51, assisting in the fixation of said cylinder 45, is in general a compression ring 51.

As can be seen in FIG. 16 A, the flat surfaces 111 and 112 of the slotted ring and the cap nut 54 are at an angle different from horizontal. In other words, said surfaces 111 and 112 correspond to the surface area of the frustum of a cone (the surface of a truncated cone). In the embodiment shown, the angle is about 45° (with respect to the horizontal or vertical). Tightening the cap nut 54 results in a pressure or force directed in a perpendicular direction with respect to said contact surfaces 111 and 112. The resulting force can be decomposed in a vertical, downwards force component and a radially inwards directed force component. The radial force component results in compression of the slot 114 of the slotted ring 51 as described above. The inventors believe that the fixation of the cylinder onto the valve block assembly 6 is optimized by also providing a radial (inward) force component. In particular, the flange 49 is protected from over-charge by reducing the (vertical, axial) pressure on the flange 49. In this way, the risk of damaging of the flange due to the fixing of the cylinder can be reduced. Accordingly, said slotted ring preferably comprises a skewed contact surface for applying pressure when fixing the cylinder to the valve block assembly 6.

At its lower end, the base block 66 comprises a circumferential projection 115. The cap nut 5 comprises a matching circumferential groove 116, in which said projection 115 is placed. The groove 116 is formed at the lower side in part by a rim 125, extending radially inwards from the cap nut 5. The support block 66 is in contact with said rim 125. In the embodiment shown, the support block 66 lies or is posed on said rim 125.

By way of said groove 116 and projection 115, the cap nut 5 is turnably mounted on said support assembly 6 and/or support block 66. The cap nut 5 comprises a circumferential rim 125, which on its upside forms the lower limitation of said groove, and on its lower side projects radially proximally above the inner thread 110. When the dispenser is fastened on a bottle, for example, cap nut 5 is turned until the opening of the bottle abuts on said rim 125 and is not in contact with support block 66, thereby leaving the middle and upper parts 3 and 4 to be able to rotate when the dispenser 1 is fixed on the bottle.

The aspiration line 61 projects downwardly as a tube or pipe, on which a flexible pipe is fixed when the dispenser is fixed on a recipient. The flexible pipe reaches down to the ground of the recipient.

It is noted that the prior art discloses numerous ways for arranging the aspiration, delivery and recirculation lines, as well as the aspiration and the delivery valves. In some described solutions, the valves cannot be exchanged but are integral to the base block 66, or the valve housings are partially constituted by tubes formed in one piece with the base block 66. When a valve is broken, the entire base block 66 has to be changed. In the embodiment of the present invention, the valve housings as a whole are formed by several pieces, separate from the base block 66, and the valves can thus be separated when the dispenser is dismounted. The valves and/or individual parts of the valves can thus be cleaned and in case of broken parts be replaced.

For a valve based comprising valve balls closing a valve, the "vale housing" is the lumen in which the valve ball is restrained. The structural elements that form the cage from in which the valve ball is retained form the "valve housing".

Furthermore, the structural parts forming the valves (the valve assembly 65) comprise a valve block 117, which forms the housing or contains the lumen of both valves, the aspiration valve 62 and the delivery valve 64. The housing or lumen of the aspiration valve 62 is indicated with reference numeral 80. Alternatively, two separate valve blocks could also be used (not shown), one for each valve. The housing 80 of the aspiration valve 62 in the valve block 117 is open towards the top (and/or in the up-stream direction), and/or comprises a large aperture 121 towards the top through which the valve ball can be removed for cleaning or placed back.

Figure 17:
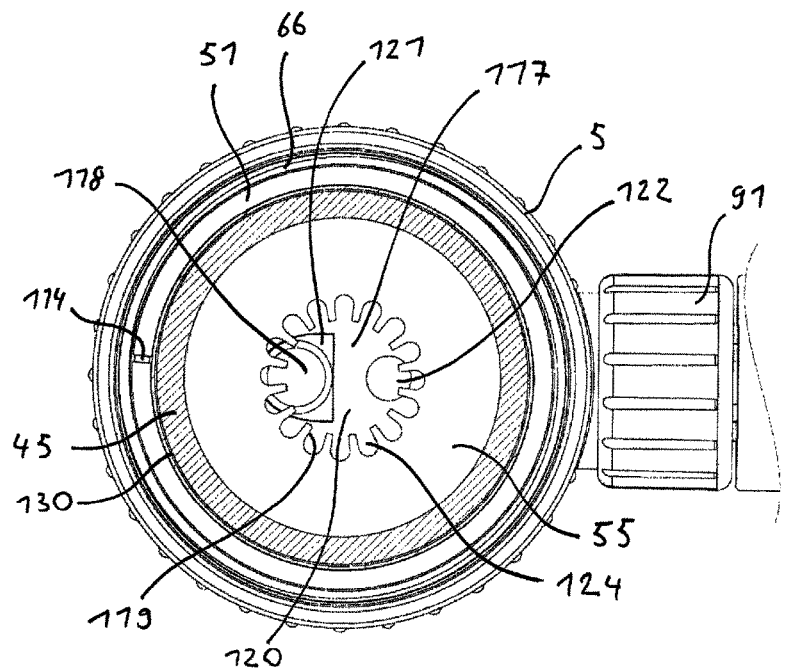
FIG. 17 is a partially sectioned top-down view onto the dispenser according to the embodiment shown in FIGS. 1 to 3, in which several elements have been removed so as to show an extendible and contractible slotted ring used as a contact surface for attaching a measuring and/or pumping upper part to the channelling, middle part of the dispenser.

The base plate and/or spacer sheet 55 may be considered as part of the valve assembly 65. When a user carefully or slowly raises the manipulation casing 13 (FIGS. 1-3) to suck in liquid into the dosing chamber of the dispenser, the valve ball stays close to its seat formed on a bottom opening of the valve 62 as is conventional. However, when liquid is rapidly aspirated, the valve ball 118 of the aspiration valve is retained (during aspiration) by the cover or base plate and/or spacer sheet 55, which comprises an opening 120 with a plurality of extensions or arms 119 as can be seen in FIG. 17. Said extensions thus form a safeguard for retaining said aspiration valve ball 118, while leaving a large opening 120 for liquid passing.

Preferably, said extensions or arms extend in a radial orientation, for example in a radially inwards direction.

The extensions 119 may or may not cross the opening 121 of the aspiration valve or the opening 120 of plate 55 completely, but preferably at least some of said extension only partially cross or cover one or both the openings 120 and 121, so as to increase the area that is free for liquid passage. The extensions 119 may have the form of arms, lobes, spikes, bars, tubes, and the like, for example.

Preferably, said base plate 55 comprises a central opening 120, coaxial with respect to the piston-cylinder assembly 40.

Instead of one opening 120, the invention also encompasses the use of two separate holes, with at least one opening comprising said extensions as defined herein. Accordingly, separate openings may be provided for the aspiration and pressure valves, respectively.

The separate valve block 117 may form at least part of the housing of one or, as shown, of two valves 62, 64. Preferably, the valve block 117 forms the integral part of said housing, if one disregards the top closure of the valves, formed by base plate 55. The valve block forms in particular the seats of the valve balls and the lateral, cylindrical walls of the valve housings.

Preferably, the valve housings are made of a material that is rigid, that can be compressed, and that exhibits high chemical resistance.

According to an embodiment, said valve block 117 comprises and/or is made of a ceramic. Ceramic is particularly advantageous as it can be obtained and/or processed to high precision dimensions.

In accordance with an embodiment, the middle part 3 comprises a valve block 117 forming at least part of the housing of at least one valve, preferably of two valves, wherein said valve block is comprises, consists essentially of or consists of one or more selected from the group consisting of injected ceramic, sintered ceramic, fluoropolymers, preferably polytetrafluoroethylene (such as Teflon®), plastic, in particular plastic exhibiting the chemical resistance, and combinations and/or mixtures of the aforementioned. Said plastic may be selected from injected plastic and/or other types of plastic and may comprise additives. The ceramic, fluoropolymers or plastic piece may or may not be further finished or worked, for example polished or ground. Preferably, said valve block 117 is provided in the form of a separate block or piece, which can be inserted and/or removed from the main base block 66 of the middle part 3 and/or valve block assembly 6.

According to an embodiment, the valve assembly 65 comprises a valve cover plate 55, which retains a valve ball 118 in an aspiration valve, said cover plate 55 comprising an opening 120 for liquid passage, wherein said opening comprises retaining arms or extensions 119. Preferably, said retaining arms 119 only partially cross a valve housing aperture 121. Preferably, said retaining arms are radially oriented with respect to the aperture 121, in particular radially inwardly. Preferably, said retaining arms 119 emanate from an annular valve cover plate 55. According to an embodiment, said retaining arms 119 on said valve cover plate 55 give the opening 120 a flower-like appearance. Preferably, when see from above (FIG. 17) said retaining arms 119 separate and/or form petal-, star-jag, or lobe-like recesses, concavities or gaps 124 for liquid passage.

Said plate 55 forms a cover of said aspiration valve 62 and at the same time serves as a surface or base on which the cylinder 45 is posed, in particular the flange 49 of cylinder 45.

According to an embodiment, said plate 55 on which the cylinder is posed and fixed comprises, consists essentially of or consists of a fluoropolymers and/or plastics, for example injected plastics, such as ETFE (ethylene tetrafluoroethylene) or polyolefins, such as PP. Preferably, the plate 55 comprises or consists essentially of polytetrafluoroethylene (PTFE), for example Teflon® commercialised by DuPont Company. PTFE is a synthetic fluoropolymer of tetrafluoroethylene.

Said plate 55 has preferably a flat, disk-like aspect, and/or is circular (FIG. 17). On one side, in particular the bottom side, said plate 55 comprises a circumferential, annular projection 126 with substantially cylindrical inner surface. The projection 126 encompasses valve block 117 at its upper end at least partially, thereby stabilizing the valve block 117 horizontally with respect to the plate 55. The valve block 117 has preferably itself cylindrical external or overall dimensions.

According to an alternative embodiment, the valve aperture 121 and the valve cover plate 55 are provided on the bottom or downside the valve block 117.

The pressure valve 64 comprises a valve ball 122, which is pushed up-stream and/or upwards, towards an up-stream opening by way of a spring, said spring being supported by an insert 123, which is inserted on a downstream, lower and/or outlet aperture of said pressure valve 64 and/or valve block 117.

The expressions "up-stream" and "downstream" are understood with respect to the direction of a liquid path from a recipient through an aspiration line and/or aspiration valve 62 into the dosing chamber 70 (FIG. 3) and from there through the delivery line and/or delivery valve into the spout assembly 7 and from there to the liquid outlet or orifice 132. Accordingly, to make an example, the delivery valve is "downstream" the aspiration valve.

It is not excluded, for the purpose of the present invention, that a single, main duct may form and/or function at least in part as an aspiration and as delivery line. In this case, branches are used, so that a separate delivery line branches from said main duct. In this case, the aspiration valve is generally provided upstream the branching of the delivery line and the delivery valve is provided in the branched-off delivery line, for example.

FIG. 16 B shows an extract of alternative embodiment of a fixing part 2 of the dispenser in accordance with the invention. FIG. 16B shows in particular an enlarged extract of the connection of the middle part 3 to the lower part 2 as shown in FIG. 1. As described with respect to FIG. 16A above, the support block 66 comprises a circumferential projection or flange 115, which is inserted in a groove 116 formed towards the upper end of cap nut 5. In this way, in principle, a turnable connection of the entire support assembly 6 to the fixing part 2 is enabled (see FIG. 1). In this embodiment, a circumferential ring or annular up-wards projection 138 is provided on the rim 125 on which the support block 66 lies. Furthermore, for increasing the seal between the fixing part 2 and the middle part 3, an o-ring 139 is provided in groove 116. When a user fixes the dispenser by screwing the inner thread 110 onto the bottle opening, the opening of the bottle can be screwed until said bottle opening (not shown) gets in contact with the underside of said rim 125. When still further screwing, the rim 125 (which is not totally rigid but exhibits certain elasticity) will be slightly bent upwards and pressure the projection or ring 138 into the bottom surface or end 250 of support block 66. In this way, a tight connection is formed between the cap nut 5 and support block 66. When a user forces said projection 138 into the bottom of block 66, a groove can be press-formed in said block, said groove forming a female fitting of said projection 138.

As the skilled person will understand, a forced, tight screwing of the cap nut 5 onto the bottle may result in a partial loss of the rotatability of the dispenser with respect to the recipient, which was in particular enabled by said groove 116-and-projection 115-interaction. On the other hand, the tight crewing allows an airproof connection of the dispenser on the bottle. This is desired by some users, in particular if the liquid to be dispensed is volatile and/or if the dispenser is kept fixed on the recipient. In this latter case, a user may prefer the possibility of an airtight connection to the possibly of turning the dispenser placed on the bottle.

It is noted that also the embodiment shown in FIG. 16A can allow a airtight fixing of the dispenser to the bottle, thanks to the rim 125, which is pressured on the lower surface of support block 66. Airtightness is obtained if the contact surfaces between said support block 66 and said rim 125 are precisely worked, in particular precisely flat. The ring-projection 138 increases or allows airtightness; in particular also if the upper surface of rim 125 and the lower surface of support block 66 are not precisely flat. The ring-projection 138 decreases the contact surface between rim 125 and the support block 66, which makes it easier to obtain airtightness by tight screwing of the cap nut onto the bottle.

In the embodiment shown in FIG. 16B, the o-ring 139 is shown together with the rim 125 and/or embossment 138. However, the o-ring is preferably used as an alternative to projection 138 for obtaining airtightness. O-rings are in principle less advantageous due to their generally incomplete chemical resistance.

Figure 18:
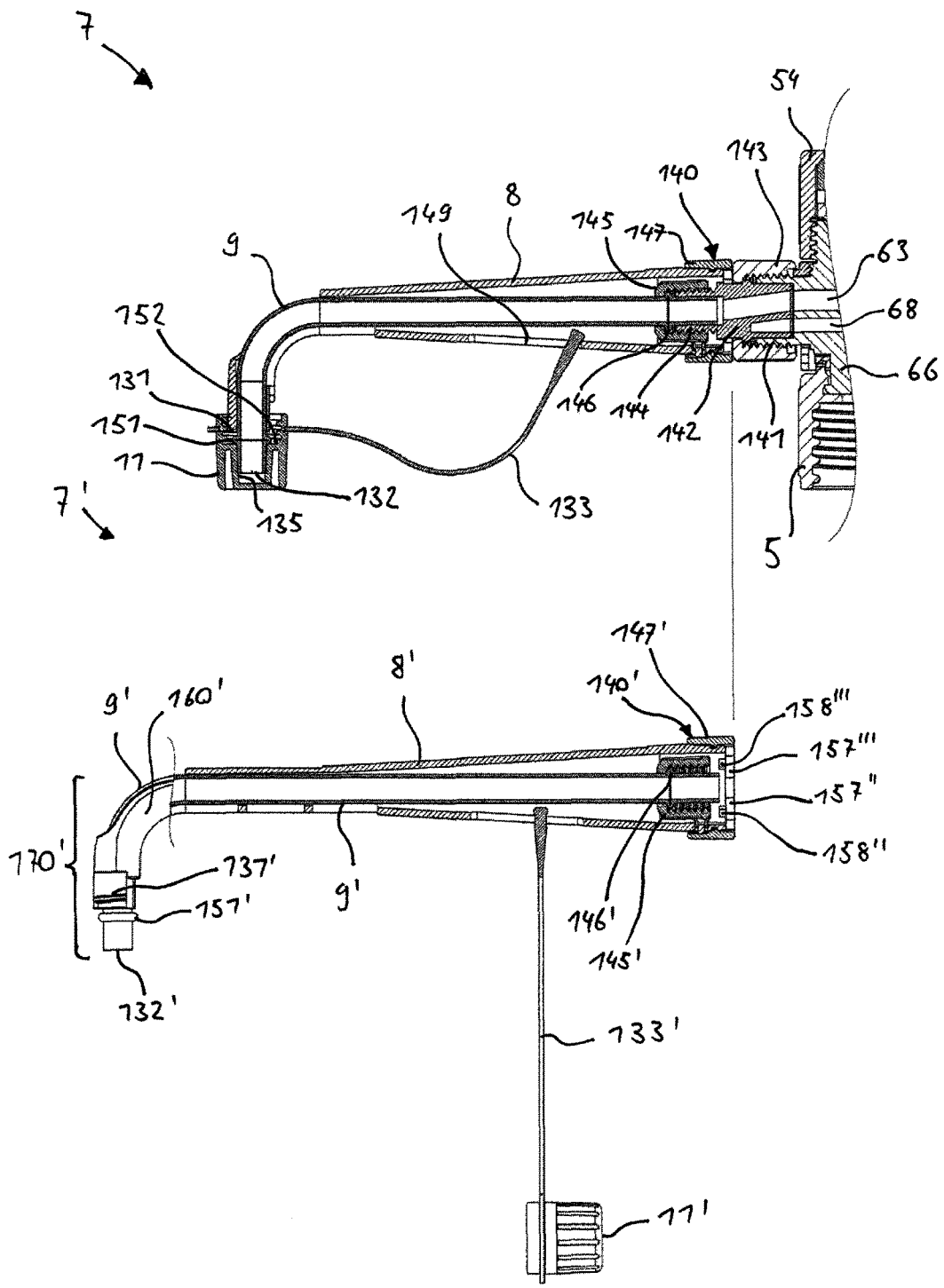
FIG. 18 shows longitudinal sections through differently sized liquid outlet or spout assemblies according to an embodiment of a dispenser of the present invention.

FIG. 18 illustrates the detachable spout assembly that is available in two sizes in accordance with an embodiment of the dispenser of the invention. In the upper part of FIG. 18, a spout assembly 7 fixed on an outlet 141 of the dispenser 1 is shown. This spout assembly 7 will be referred to as first spout assembly 7. In the lower part, a second or further spout assembly 7' is shown, which differs from the first one in that it is longer. More particularly, the second spout assembly 7' has a prolonged outlet pipe 9' compared to the outlet pipe 9. The second spout assembly 7' thus has a longer extension in the horizontal and/or radial direction, measured from the vertical axis of the piston-cylinder assembly of the dispenser. On the other hand, the second spout assembly 7' has the same connection assembly 140', 145', 146' as the first spout assembly. In FIG. 18, the prime sign (') is used for reference numerals of the second spout assembly, whereas corresponding structural elements of the first pout assembly are shown without prime sign.

At the choice of a user, the shorter or longer spout assembly 7 or 7' can be branched to the same dispenser 1, that is, a dispenser of a given nominal volume or of a given volume range. The only or main difference between sprout assemblies 7 and 7' is the length of the delivery pipe 9, 9' and, in accordance therewith, of the delivery pipe cover or frame 8, 8', which covers, supports and/or protects the pipe 9, 9'.

The spout assemblies 7, 7' will substantially be described herein below at the example of the first spout assembly 7 shown on the top of FIG. 18.

On the outlet 141 of the support assembly 6 (FIG. 15), in particular of support block 66, there is fixed an adaptor or spout connector 142, which is fixed on the support assembly by way of a cap nut 143. The spout assembly 7 can be releasably attached on said connector 142. Said connector 142 may also be referred to as outlet connector 142. In case a valve assembly 10 (FIG. 2) is used for switching between liquid delivery and recirculation, said valve assembly contains downstream a connection extension 150 (FIG. 2), which has the same structure and configuration as the downstream or distal end of said connector 142. In this way, the spout assembly 7 can be connected in the same manner to a dispenser comprising or not the user-actionable valve assembly 10. The valve assembly 10 can thus be fixed at the option or preference of a user to the dispenser and can in particular be used or not in combination with any one of the two spout assemblies 7, 7'. The valve assembly 10 and the spout assemblies 7, 7' are thus usable and detachably attachable in a modular, and/or plug-and-play-like manner.

As will be described below, said spout assembly 7 can be removed, attached and/or exchanged by a user without the need of any specific tool. In particular, said spout assembly can be connected by way of a hand-actionable connection or connection assembly 140, 145, 146.

In the embodiment shown, the connection of the spout assembly 7 to the outlet connector 142 comprises two separate connections. The delivery pipe 9 is preferably inserted into an outlet opening 144 of the connector 142, and fixed by a cap nut 145. The inner thread of the cap nut 145 matches an outer thread on the outlet 144 of the connector 142. On the delivery pipe 9 there is a circumferential projection 146 which is part of the pipe 9. The projection 146 may be a separate piece rigidly fixed onto the delivery pipe 9 by fit-pressing, welding or gluing, for example, or may be formed in a single piece with the pipe, as a thermally formed fold of the pipe, for example. Preferably, the fold 146 (and, independently, also fold 151, 151' described further below) are independently prepared by heat compression, forcing the pipe to form a bulge or outside fold of controlled size on the outside surface of said pipe 9, 9'.

The cap nut 145, when screwed onto said outlet opening 144, pressures on said projection 146 and thereby pressures the pipe 9 into the connector opening 144. In this way, a sealed connection of the delivery pipe 9 to the support body 66 and/or support assembly 6 is achieved. The cap nut 145, said projection 146, said upstream end of said delivery pipe 9, and said connector 142, in particular the outer thread 144 thereon, form the delivery pipe connection assembly. With respect to the spout assembly 7 as such, the structural elements making up the delivery pipe connection assembly are 145, 146, and possibly the upstream extremity of the delivery pipe 9.

In accordance with the invention, the connector 142 and cap nut 143 may or may not be considered to be part of the spout assembly. As the invention encompasses that the connector 142 can be rigidly and undetachably connected to support block 66, it is assumed, only for the following description and without limiting the scope of the invention, that the connector 142 is not part of the spout assembly 7 but part of the support assembly 6. The invention also encompasses embodiments in which the connector 142 and cap nut 143 are part of the spout assembly. It is also envisaged that the connector 142 comprises the pressure valve.

The outlet cover 8 is connected in a bayonet-like and/or lock-like manner to the connector 142. In particular, at the up-stream, proximal end, the cover 8 comprises a spout cover lock 147. In the embodiment shown, the spout cover lock 147 is provided as or comprises a lock bushing. The lock 147 has a substantially annular and/or cylindrical configuration and is turnably fitted on the upstream extremity of the spout cover 8. As will be described in more detail below, the spout cover lock 147 comprises an upstream neck with openings for inserting projections or pins 148, 148', etc., provided on said connector 142, wherein by turning said spout cover lock 147 over said pins 148, 148', said cover 8 is locked on or with said connector.

In accordance with the aforesaid, said cover 8 of the spout assembly 7 is separately connected in a releasable manner to said outlet 141/142 of the support block 66 and/or support assembly 6. In particular, said cover can be released by a user, preferably without any specific tool, in particular by way of a turning connection, such as a bayonet connection. As will be described below, the delivery pipe 9, which is guided in said cover 8, is attached separately in a sealed manner to the outlet 141/142 of the support block 66 and/or support assembly 6, so as to form a continuous, preferably tight and leakproof delivery channel with pressure line 63 provided inside the support block 66 and/or support assembly 6.

As can further be seen in FIG. 18, said spout assembly 7 comprises a cap or closure 11, for closing the orifice 132 of the delivery pipe 9 and/or spout assembly 7. The cap 11 is connected via a string or tether 133 to the cover 8, in order to avoid loss of the cap 11 when the delivery pipe is opened for liquid dosing. The tether 133 comprises or is made of a flexible plastic strap, which is retained in an oblong slot 149, and which can slide in this slot to facilitate handling of the cap 11 when opening and/or closing the delivery pipe 9. It is noted that the cap 11 is free to rotate in a ring formed at the end of said plastic strap 133.

For reliable closure of the delivery pipe, the cap 11 comprises in inner thread, which matches an outer thread 131 provided at the downstream and/or distal extremity of said cover 8. In the embodiment shown, said outer thread 131 is simple and economic: It is formed by a plurality of thread sections 131.1 and 131.2, in particular two thread sections, as can better be seen in FIGS. 19-22. In contrast to prior art dispensers, the delivery outlet cap 11 is not fixed on the outlet pipe 9, but on the cover 8 of said pipe for closing the orifice 132. Close to the outlet pipe orifice 132, 132' there is a fold or circumferential projection 151, 151' on said delivery pipe 9, 9', which may be realised, independently, as projection 146 described above. The projection 151, 151' abuts on a circular, horizontal rim or contact area 152 inside the cap 11, 11', when the cap is fixed on the orifice 132, 132'. The fold 151, 151' thus forms an abutment for the cap 11, in particular for the rim 152 provided inside cap 11, 11'. As shown, the fold 151, 151' also forms an abutment for the downstream end of cover 8. Screw-fixing the cap 11, 11' results in squeezing folds 151, 151' between the contact area 151 and the end of the cover 8.

The inside of said cap 11, 11' comprises a narrowing inner surface 135 corresponding to the surface of a top-down inversed truncated cone. When screwing cap 11, 11' onto the thread 131, 131', said narrowing surface forms a tight and thereby preferably leak proof connection with the delivery tube 9, 9' at the liquid outlet opening or orifice 132, 132', said tube 9, 9' being substantially tubular, cylindrical. Following repeated use of the cap 11, 11', the downstream end of pipe 9, 9' will itself assume a conical outer form, and will be further inserted into cap 11, 11'.

As becomes clear from the above, the orifice 132, 132' can preferably be hermetically and completely closed by turning the cap 11, 11' on said outer thread 131, 131', that is, by way of said screw cap 11, 11'.

Said fold 151, 151' is close to the orifice 132, 132', for example 1 mm or 2 mm to 1.5 cm from the orifice. The part of pipe 9, 9' that is downstream from the fold 151, 151' enters the inner lumen of the cap 11, 11' when being closed. The fold is on the outside of said delivery pipe 9, 9' and preferably made from the same material as said delivery pipe 9, 9' (see indications with respect to projection 146).

For removing the spout assembly 7 from the dispenser, for example for cleaning or for placing a differently sized spout assembly, for example the longer spout assembly 7' shown in FIG. 18, the two connections 147, 145 of the cover 8 and the delivery pipe 9, respectively, need to be separately detached.

Of course, a user could simply detach cap nut 143 and thereby remove the entire spout assembly 7, including connector 142 and cap nut 143 from the support assembly 6. However, in order to reduce the amount of material involved with the spout assembly, the connector 142 is preferably not part of the different spout assemblies 7, 7', amongst which a user can choose. As is shown in FIG. 1, the hand-actionable valve assembly 10 can, at the option of a user, be fixed on the connector 142.

Given that the spout cover 8 comprises at least one section in which pipe 9 is surrounded completely from all sides, in particular a tubular section or conical truncated section, a specific, novel mechanism for the detachment of the spout cover 8 and spout pipe 9 is provided, as described further below and elsewhere in this specification.

The detachment (and attachment) of the spout assembly 7 or 7' is preferably done in a stepwise manner, detaching first at least partially the spout cover 8, 8' and then the spout pipe 9, 9', one after the other, as will be discussed further below. Before that, FIGS. 19-24 will be described, which illustrate the structure and functioning of the spout cover 8 and the user-actionable spout cover lock 147 in accordance with the embodiment shown.

Figure 19:
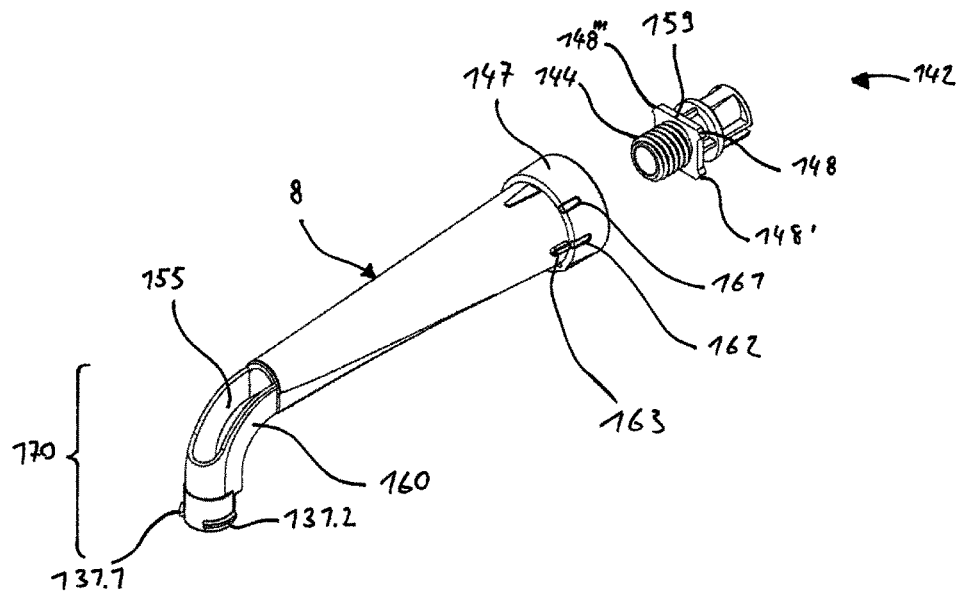
FIG. 19 is a front and top-down perspective view of the outlet cover and a connector of an outlet assembly of an outlet assembly of the dispenser shown in FIGS. 1 to 3, wherein the connector is shown in a disconnected state from the outlet cover.
Figure 20:
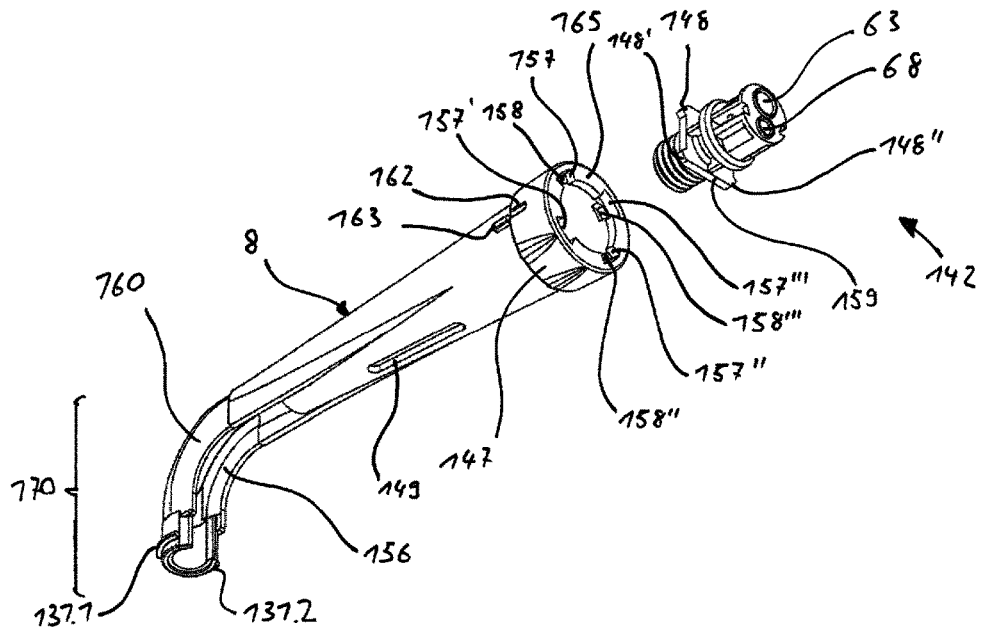
FIG. 20 is a rear and bottom-up perspective view of the outlet cover and a connector of an outlet assembly of the dispenser shown in FIGS. 1 to 3, wherein the connector is shown in a disconnected state from the outlet cover.

FIGS. 19 and 20 are different perspective views of the spout cover 8 and the connector 142 in the disconnected, isolated state, but positioned in an orientation and/or direction of insertion for connection. In order to facilitate the description, the connector 142 is shown in a disconnected manner from the support assembly 6 and/or support block 66. Of course, before connecting the cover 8 to said connector 142, the latter would have to be fixed to the outlet 141 on support block 66 by way of said cap nut 143, as described with respect to FIG. 18 above.

The cover 8 has an overall tubular or, more specifically, conical tubular form comprising a downwards bend 160 for liquid delivery, like a typical water tap. The distal delivery outlet is reduced in diameter compared to the part of the cover that is connected to the dispenser body. The "conical tube" forming the spout cover comprises at least two clearances, gaps, cut-outs, windows or openings 155, 156. A window 155 is provided on the up-side or dorsal at the level of the downward bend 160 of the pipe 9 or cover 8, close to the orifice 132 (FIG. 17). One (other) opening 156 is provided on the lower side of the cover 8, covering the entire bend 160 and reaching distally/in the downstream direction to the end of the cover 8 at the liquid outlet. This opening allows the delivery pipe 9 (FIG. 17) to be detached from the distal or downstream end of cover 8, which is required for detaching the spout assembly 7, 7', as will be described further below. In contrast to covers found in the prior art, the cover 8 in accordance with an embodiment of the invention thus comprises at least sections that are (preferably: conically) tubular.

Figure 22:
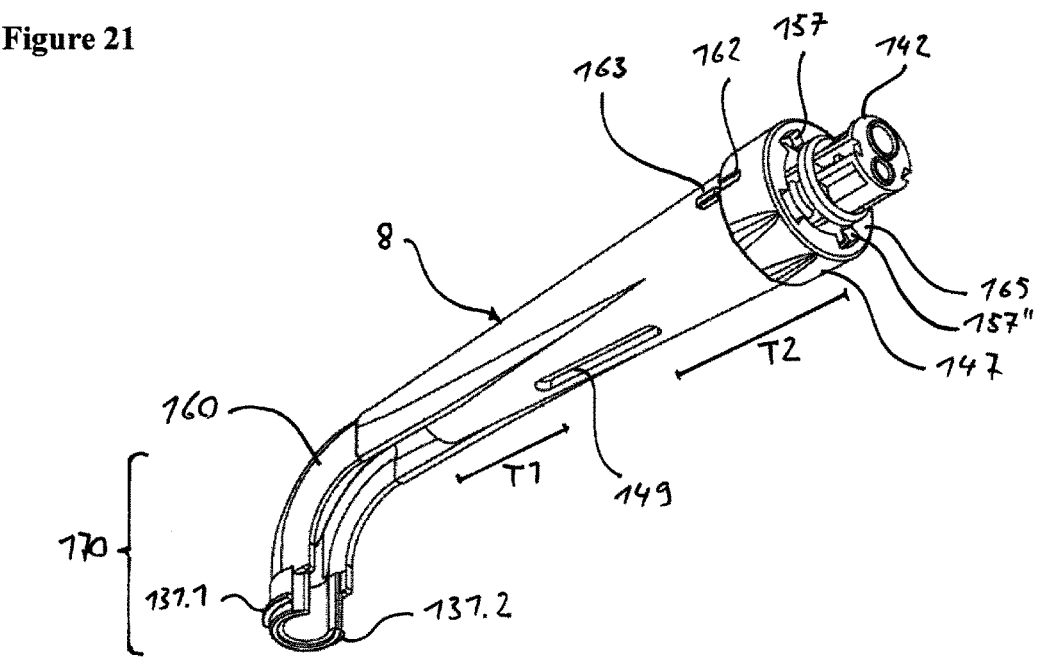
FIG. 22 is a rear and bottom-up perspective view of the outlet cover and a connector of an outlet assembly of the dispenser shown in FIGS. 1 to 3, wherein the downstream end of the connector is inserted into the upstream end of the outlet cover.

According to an embodiment, the cover 8 comprises at least one section, preferably two or more sections, in which the delivery pipe 9 is covered circumferentially. This applies to sections T1 and T2 of the cover as indicated in FIG. 22. In the embodiment shown, with the exceptions of the section at the level of said openings 155, 156 (and possibly with the exception of the slot 149), the cover 8 covers and thus protects the delivery pipe 9 from all sides, circumferentially and/or completely, when considering the respective section (for example a section T2 ranging from the up-stream end up to slot 149).

At the up-stream end of cover 8, a spout cover lock 147, which is in particular a lock ring or lock sleeve 147 is arranged. Said lock sleeve 147 is free to at least partially rotate on the said cover 8.

A can be seen on FIGS. 19 and 20, said connector 142 comprises a plurality of edges and/or projections 148, 148', 148", 148''', extending radially with respect to the liquid channels (63, 68 in FIG. 20) in said connector 142. In the embodiment shown, said projections 148, 148', etc. have the aspect or form of edges, in particular cut edges, preferably of a substantially rectangular vertical plate 159.

Figure 21:
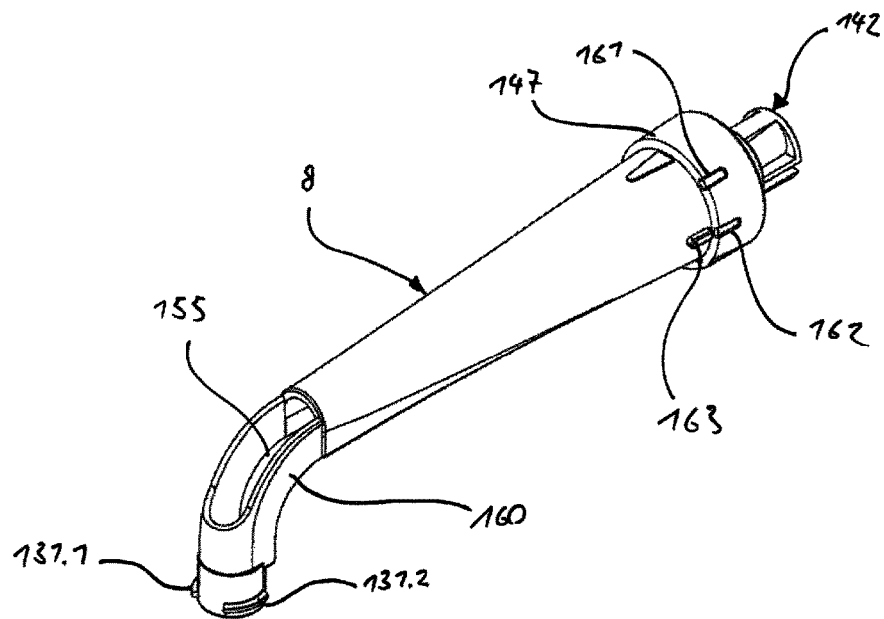
FIG. 21 is a front and top-down perspective view of the outlet cover and a connector of an outlet assembly of the dispenser shown in FIGS. 1 to 3, wherein the distal, downstream end of the connector is inserted into the proximal, upstream end of the outlet cover.

In FIG. 20, the up-stream end of said lock sleeve 147 can be seen, which forms a narrowing, ring 165 with a flat surface, which ring extends radially inwardly with respect to the longitudinal axis of the cover 8. The lock sleeve 147, in particular said narrowing ring 165, comprises one or a plurality of cut-outs and/or openings 157, 157', 157", 157'''. Furthermore, the up-stream end of the cover 8 comprises a corresponding number of cut-outs 158, 158', 158" and 158''', which can be seen in FIG. 20, as the openings 157-157''' in the lock sleeve 147 are aligned with the cut-outs in the 158-158''' in the cover tube 8. In such a position, the projections 148-148''' of said connector 142 can be inserted through said cut-outs 157-157''' in said sleeve 147 and placed in said cut-outs 158-158''' of said cover 8. By rotating the lock sleeve 147, which a user can do by hand, for example, the cover 8 can be locked to said connector 142 (FIGS. 23 and 24). FIGS. 21 and 22 show said connector 142 being inserted into cover 8, but not being locked, said projections 148-148''' of connector 142 being inserted into cut-outs 158-158''' of said cover 8, while said lock sleeve 147 being in the "unlock"-position, allowing separation the cover 8 from the connector 142 or vice versa.

The lock sleeve 147 comprises two marks 161, 162, one for the "lock" position and one for the "open" or "disconnect" position. In FIGS. 19 to 22, the "disconnect"-mark 162 is aligned with a reference mark 163 provided on the cover 8. This position corresponds to the alignment of said cut-outs 157-157''' in said ring 165 with said cut-outs 158-158''' in the cover 8, and allows removing cover 8 from the connector 142 or bringing them together for subsequent locking by turning lock sleeve 147.

In FIGS. 23 and 24, "lock"-marking 161 is aligned with reference marking 163, meaning that in the indicated position, sleeve 147 prevents disconnection of cover 8 from connector 142, if they are connected. In this position, the cut-outs 158-158''' of said cover 8 are no longer aligned with the cut-outs 157-157''' in the lock sleeve 147, due to rotation of the lock sleeve.

The connection assembly 140 for the cover 8 of the spout assembly 7 thus comprises said lock sleeve 147, cut-outs 157-157" in the lock sleeve and the cut-outs 158-158''' in said cover 8, which form seats for the projections 148-148''' of connector 142. The up-stream end of cover 8, on which the lock sleeve is rotably fitted on and where said cut-outs 157-157" are provided is also part of the connection assembly for cover 8. Said projections 148-148''' may also be considered as part of the spout cover connection assembly 140 of the dispenser as a whole. The complete connection assembly 140, 145, 146 of the spout assembly further comprises the spout pipe connection assembly, which comprises elements 145 and 146.

The operation of disconnection can best be understood with reference to the spout assembly 7 shown on the top of FIG. 18, the elements seen in FIGS. 19 to 24 and in particular FIGS. 25A and 25B. It is clear that in the correctly connected state shown on the top of FIG. 18, the user cannot access cap nut 145 for detaching the delivery pipe 9 from the connector 142.

The first step of disconnecting the spout assembly 7 is to unlock and disconnect the spout cover 8 from the connector 142. In order to do so, the outlet cap 11 needs first be opened, in case it is closed as shown on the top of FIG. 18. Then it is noted that the cover 8 cannot be withdrawn if the delivery pipe is guided in cover 8 as shown in FIG. 18. The opening 156 is provided to detach the downstream end of delivery pipe 9 from the cover 8. A user can simply push with his finger on the pipe 9 at the level the orifice 132 (or 132'), pushing it in the direction towards the dispenser, in a proximal direction. As the cover 8 has some elasticity, in particular at the level of the opening 156, the opening 156 can widen so as to let the end of pipe 9 disengage from the downstream end section 170 of cover 8 through said opening 156. It is noted that opening 156 is just slightly narrower than pipe 9 so that the pipe 9 only passes if a certain pressure is exerted by a user in the appropriate direction. Said cut-out tube or tube section that is formed by the cover 8 at the downstream end or section 170 due to opening 156 functions like a clip connection, from which the downstream end section 134 (FIG. 25 A) of the delivery pipe 9 can be detached by exerting a certain pressure. A user simply has to push the delivery pipe 9 at the bottom, downstream end, to force the downstream end of pipe 9 out of opening 156. Of course, the cap 11 needs to be unscrewed before detaching the downstream end section 134 of pipe 9, because when closed, the cap 11 keeps the pipe 9 and the cover 8 together.

The window 155 at the opposed side of the cover 8, in particular at the level of bend 160 is not strictly required for disconnecting the spout assembly. Window 155 has the purpose of providing a free view to the delivery pipe 9, so that the user can monitor liquid delivery during dosing. Together with the transparent cylinder and cylinder protection, this gives a user the possibility to examine the liquid to be dosed when entering the dosing chamber 70 (FIG. 3) and when being delivered through said spout pipe 9.

As can be understood from the above, the downstream end section 170, 170' (FIGS. 17-19) of the cover 8, 8' thus functions as a clip holder 170, 170' for the downstream end or section of the delivery pipe 9.

Figure 25:
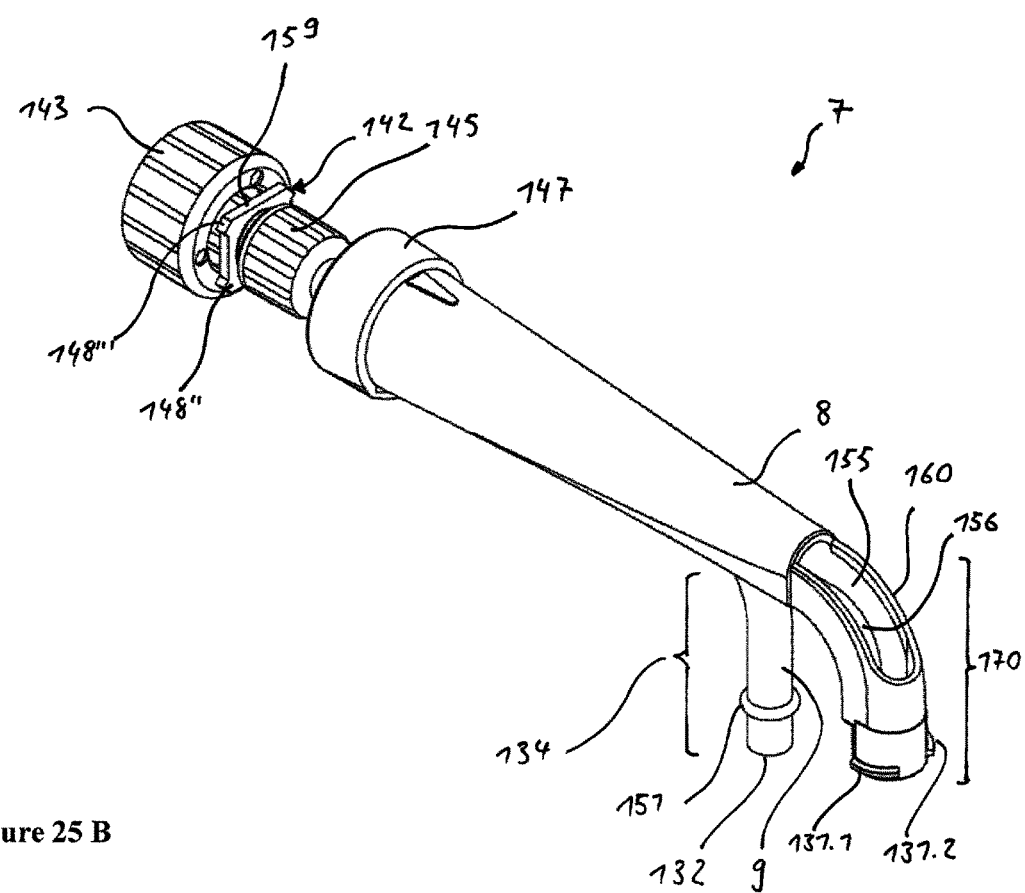
FIGS. 25 A and B show a longitudinal section and a perspective view, respectively, of the spout assembly in accordance with an embodiment of the invention. The outlet cover of the dispenser is in a displaced and/or shifted position with respect to the liquid delivery pipe, so that a pipe connecting nut has been uncovered and can be accessed by a user.

Once the downstream end 134 of delivery pipe 9 being detached from downstream end 170 of cover 8, the cover 8 can be disconnected from the connector 142 by turning the lock sleeve 147 to the "disconnect"- or "unlock" position, and drawing the cover in a radially distal direction with respect to the support assembly 6 of the dispenser. This is illustrated in FIGS. 25 A and 25 B. Although the delivery pipe 9 is still connected to connector 142 by way of cap nut 145, the cover 8 is no longer rigidly locked with neither the delivery pipe 9 nor the support assembly 6, and the gap 156 is sufficiently large to allow the cover 8 being partially withdrawn with the delivery pipe 9 still being connected. It is not envisaged to withdraw the cover 8 completely at this stage. The delivery pipe 9, in particular the downward bend 134 of the delivery pipe 9 that is guided in bend 160 of the cover during use of the dispenser, is too rigid for being forced through the tube of the cover 8 formed at the more upstream end of the cover. This is why pipe 9 and cover 8 actually stay loosely associated. This also applies when the entire spout assembly 7 is completely removed from the middle part 3 of the dispenser.

Preferably, when disconnected from the dispenser 1, said spout cover 8 and said delivery pipe 9 remain connected, preferably in a loosely manner.

According to an embodiment, said spout cover 8 and said delivery pipe 9 form a spare part assembly that is not intended for separation and/or that is provided as a single spare part unit or assembly. According to an alternative embodiment, said spout cover 8 and delivery pipe 9 are intended for separation by a user and/or are separate spare parts.

As the skilled person will understand, the partial withdrawal of cover 8 will expose and thereby give access to cap nut 145 as can be seen in FIGS. 25A and 25B. In this position, the cap screw 145 can now be unscrewed by the user so as to detach the delivery pipe 9 from the connection with the support assembly 6.

Fixing the spout assembly 7 or, at the preference of a user, another spout assembly 7' as shown in FIG. 17, to the dispenser 1 can be achieved by conducting the above steps in the inverse sense. In other words, for connecting the spout assembly 7, the downstream end 132 of the delivery pipe 9 should be detached from the downstream end 170 of cover 8, so that the up-stream end of delivery pipe 9 and the cap nut 145 can be drawn to exit through the upstream opening of cover 8. In this position, the cap nut 145 can be guided towards the outer thread 144 on connector 142 and fixed on the connector by screwing, resulting in the situation shown in FIGS. 25A and 25B. Then the downstream end 134 of delivery pipe 9 is clipped into the downstream end 170 of the cover 8 through gap 156, and the lock sleeve 147 is guided in the "open" or "disconnect" position (FIGS. 19 and 21) onto the connector. The cover 8 is then locked onto the support assembly 6 by turning the lock sleeve 147 to the "locked" position.

As the skilled person will understand, when displacing the cover 8, it is irrelevant whether a user first releases the downstream end 132 of pipe 9 or first turns the cover lock 147 to bring it into the "disconnect" position. However, both of these previous steps need to be performed before the partial withdrawal of the spout cover 8 as shown in FIGS. 25A and B.

In the embodiment shown, the connector 142 is a separate piece that is detachable from the support assembly 6 and/or support block 66. As can be seen in the upper part of FIG. 18, the connector can itself be locked by way of a cap nut 143 to the support block. Of course, the invention also encompasses that the connector is rigidly and/or non-detachably connected to the support assembly and/or support block 66 (for example being formed as one moulded piece with block 66), or can only be detached by using a specific tool.

While the embodiment shown in the figures disclose a bayonet-type lock for connecting the spout cover 8 to the support block 6, support assembly 66 and/or middle part 4 of the dispenser of the invention, different and or other types of preferably hand-actionable connections are also encompassed, in particular clip connections, other types of rotary or swivel connections, in particular thread and screw-based connections, tight-fitted connections, clamp-fixed connections, tag-fixed connections, for example.

Figure 26:
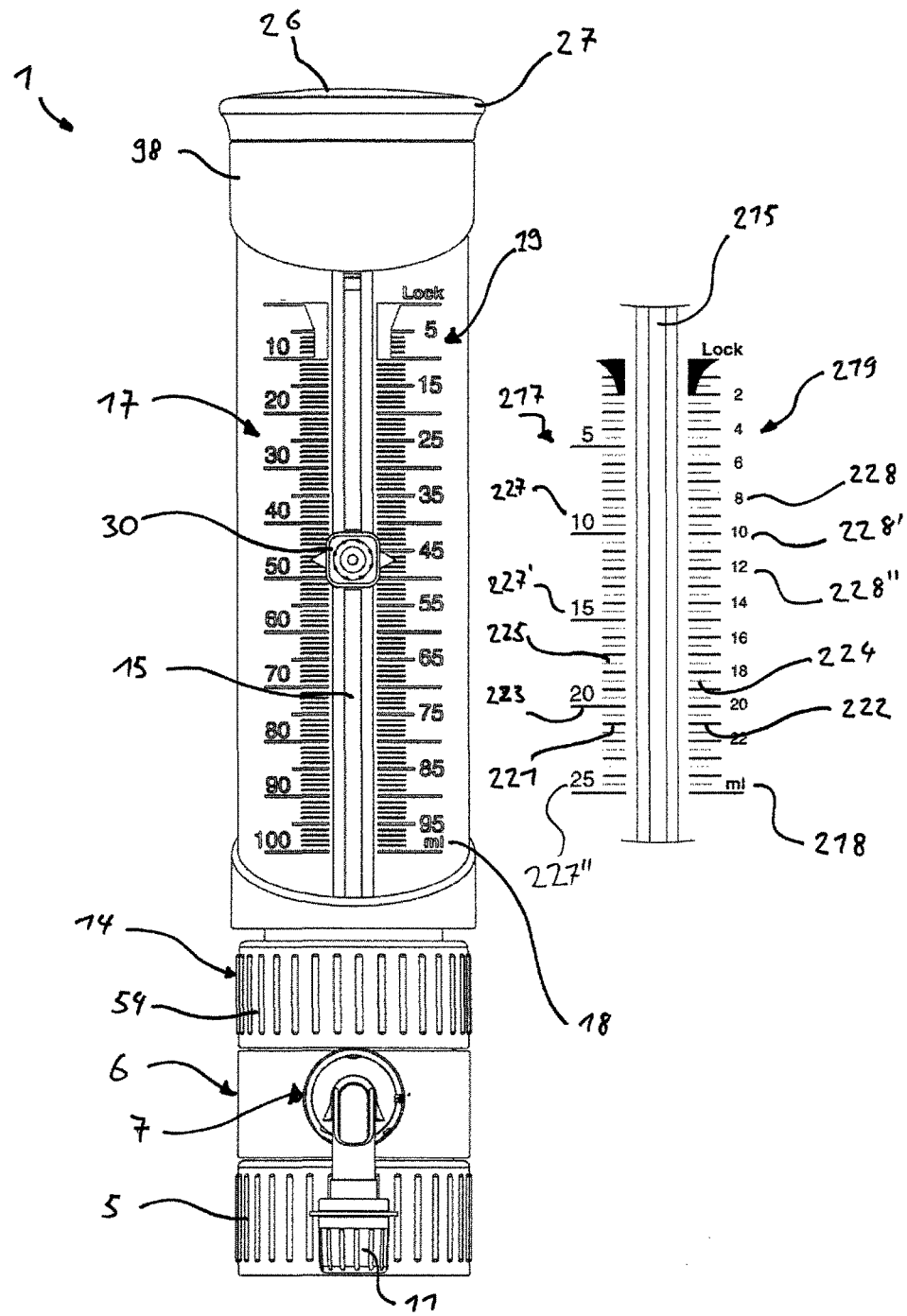
FIG. 26 is a front view of the dispenser shown in FIGS. 1 to 3, showing markings at regular intervals for volume adjustment, on the left and right side of a central, longitudinal slot in accordance with an embodiment of the invention. Next to the dispenser is shown an alternative way of markings for measuring volume.

In the front view of the dispenser 1, shown on the left side in FIG. 26, the graduations 17 and 19 with marking lines and volume number indications can be seen. The unit of the volume is also indicated with reference numeral 18 on the sleeve 13 of the dispenser 1. On the right side of FIG. 26, another pair of graduations 217 and 219 is shown for illustration.

On the left side of FIG. 26, the two graduations 17 and 19 contain the same horizontal marking lines, but the two graduations differ in that the volume amount numbers are not the same. On the left side (in the perspective of a user contemplating the dispenser), numbers are shown as regular multiples of 10 starting from 0 or 10 (10, 20, 30, . . . ). On the graduation 19 on the right side, volume amount numbers are also indicated as multiples of 10, but starting from 5, resulting in the numbers 15, 25, 35, etc. The volume amount numbers are thus shifted by an amount of 5 ml one with respect to the other. The volume amount numbers of the two graduations are used with respect to different volumes.

The two graduations 17 and 19, provided preferably on the left and right sides, respectively, of a slot 15 of a single dispenser, may be considered a first graduation 17 and a second graduation 19. The use of two different graduations, said two graduations showing different, for example shifted and/or offset volume amount numbers facilitates the volume adjustment by a user. For example, a user wishing to adjust a volume of 35 ml or close to 35 ml will immediately identify the volume of 35 ml on the second graduation 19 on the right side. If the user wishes to adjust 70 ml or close to 70 ml, the first graduation on the left side is more convenient. It is noted that the horizontal marking lines in the left and right graduation 17, 19, respectively, are the same, thus mirror symmetrical with respect to slot 15. The need of two different graduations also comes from the fact that by using conveniently visible, large volume amount numbers, it would not be possible to use a graduation with multiples of 5 (5, 10, 15, 20, etc.) on one side of the slot 15 only, due to lack of space. The information in terms of volume amount numbers would be too densely packed. Therefore, the present inventors, by providing two different graduations 17 and 19 showing or using different, in particular shifted and/or alternating volume amount numbers, provide the advantage of an increased number of volume amount numbers while maintaining a good overview. This assists and thus facilitates volume adjustment by the user.

The first and second graduations 217 and 219, respectively, shown on the right side of FIG. 26 illustrate another embodiment of different graduations on the left and right side of the longitudinal slot 215 for volume adjustment in a dispenser. The two graduations 217 and 219 differ in that the volume amount numbers are indicated as different multiples. Graduation 217 shows volume amount numbers 227, 227', 227", etc., as multiples of 5, starting, for example from 0 or 5 (5, 10, 15, etc). Graduation 219 shows volume amount numbers 228, 228', 228", etc. as multiples of 2 (2, 4, 6, etc.).

Furthermore, the marking lines 221, 223, 225 of the first graduation 217 are different from the marking lines 222 and 224 used on the second graduation 219. In particular, in the first graduation 217, three different types of marking lines are used, for example, those for indicating the multiples of five (5) and two different, alternating types of marking lines, 221, 225, each recurring at a multiple of two (2), for indicating the individual units (here: ml). In the second graduation 219, two types of marking lines are used: a first type of marking line 222 for the multiples of two (pair amount numbers), starting from 0 or 2, for example, which are completed by a corresponding volume amount number (228, 228', etc.), and a second, different type of marking lines 224 for the volumes between the marking lines of the first type, also occurring as multiples of 2 (unpaired amount numbers), but without the volume amount number being indicated on the graduation.

It is noted that the volume amount numbers 228, 228' etc. on the second graduation 219 are smaller than those on the first graduation 217, this is in particular because there are more volume amount numbers on the former, as they are indicated at smaller intervals (multiples of 2 compared to multiples of 5).

Of course, regardless of the graduation used and of the difference between the first and the second graduations, any given position of a selector (for example selector 20 or 30) on the slot 15, 215, that is, any specific vertical position along the first and second graduation 17 and 19 or 217 and 219, respectively, corresponds to and thus indicates the same specific or given volume. Preferably, both graduations indicate the same volume unit (for example ml, cl).

According to another embodiment, the dispenser comprises two different graduations, each graduation showing a different unit of volume, in particular of a different volume measuring system. For example one graduation may indicate volumes in terms of the metric volume system (ml, cl, etc), while the second graduation may indicate volume as fluid ounce (fl. oz.). According to an embodiment, the two graduations may indicate fluid ounces according to the British and the American system, respectively.

Figure 27:
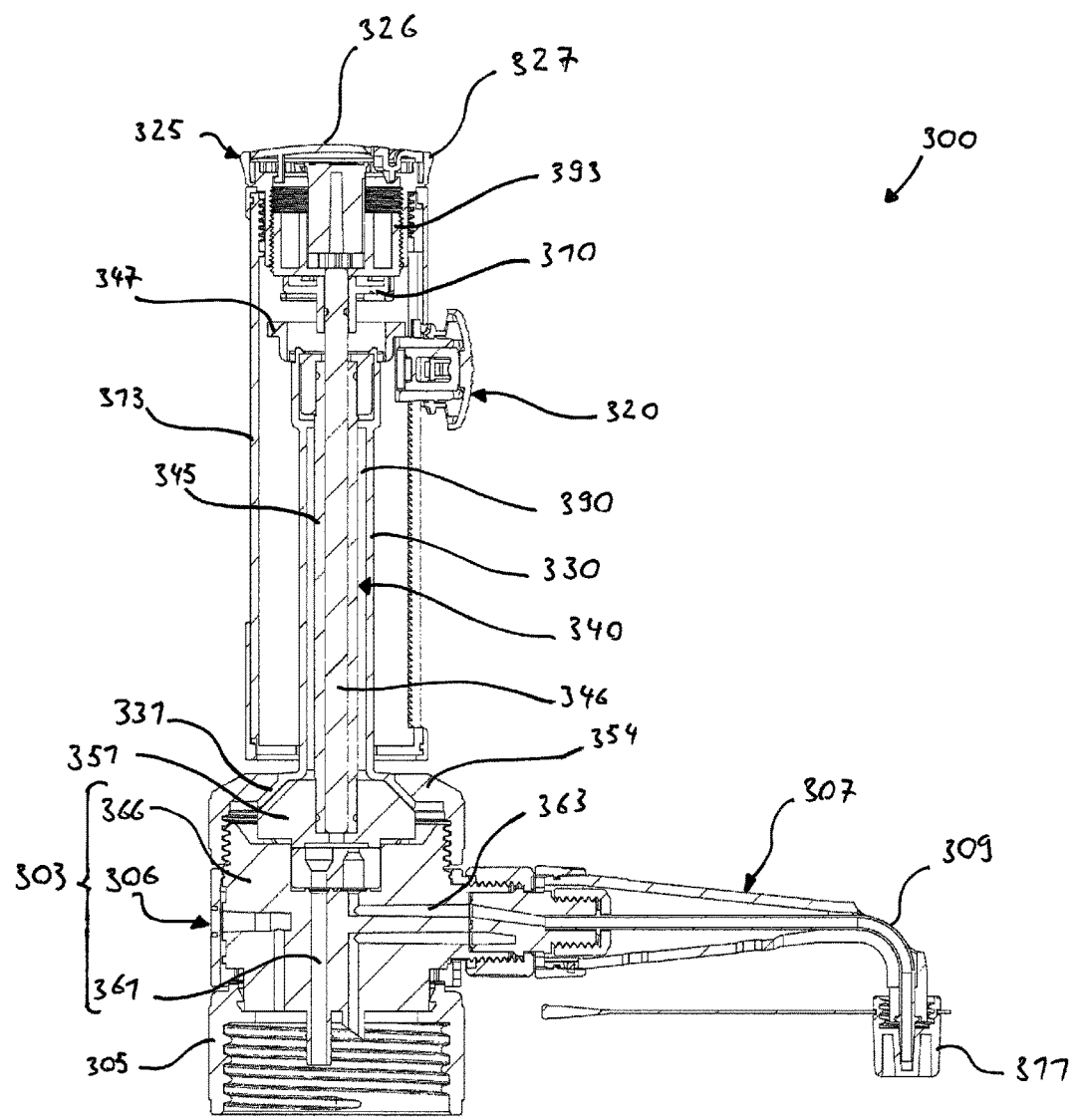
FIG. 27 is a longitudinal section through a bottle top dispenser according to another embodiment of the invention.

FIG. 27 shows a dispenser 300 according to another embodiment of the present invention. This dispenser is generally adapted to cover a comparatively small volume range, such as 1 to 10 ml or 0.1 to 1 ml, 0.1 to 2 ml, for example, or up to 3 ml nominal volume. In dispensers of such a small volume, the piston is accordingly thin, and there is a risk that the piston can break. A typical example is the formation of crystals in the dosing chamber, which may hamper the free rotation of the piston within the cylinder. When a user forces the rotation or movement of the piston via the outer sleeve or piston manipulation casing, the piston could break. This problem is generally associated with small nominal volume dispensers, but the invention also encompasses the solution to this problem being used with larger volume range dispensers, such as the one shown in FIGS. 1 to 3.

The dispenser shown in FIG. 27 comprises a piston-cylinder assembly 340 comprising a piston 346 that is guided in a cylinder 345 as described above with respect to the dispenser shown in FIGS. 1 to 3. One difference is that the diameter of the piston is much smaller than the piston in FIGS. 2 and 4, which is why the piston shown in FIG. 27 is more delicate and is more easily broken due to handling errors. A transparent protective sleeve 330 encases or surrounds the cylinder 345, in particular those parts of cylinder 345 that are visible to a user during liquid dosing.

The cylinder 345 is connected, towards it top end, to a limit stop sleeve 347, limiting the axial movement of the outer sleeve or manipulation casing 313 during liquid aspiration from the bottle (not shown). In this regard, a volume selector 320 is provided. In FIG. 27, the selector 320 is shown at the position corresponding to the "Lock" or "Stop" position and/or to a volume of zero (0), in which the outer sleeve 313 cannot be lifted for aspiration. The selector 320 is the same as selector 20 described elsewhere in this specification. The limit stop sleeve 347 is shown separately in more detail in FIGS. 29A to C. In the embodiment shown, this piece also serves as fixation of the protective sleeve 330 to the cylinder 345 at the top end of the latter.

At the upper end, the piston 346 is rigidly connected, for example by gluing, to a rotatable (or "first") piece 310, which is shown in more detail in FIGS. 28 and 31A-C. The rotatable piece 310 in turn is rotatably seated in a seating 312 provided in the calibration screw 393, which can better be seen in FIGS. 28 and 30A to C.

On the top of the dispenser 300, there is a lid 326, which can be removed for calibration, as described above with respect to the dispenser shown in FIGS. 1 to 3.

The base or middle part 303 of the dispenser 300 comprises a base or support block 366, which forms the structural support of the support assembly 306. In the dispenser shown in FIG. 27, the cylinder 345 is rigidly fitted on and fixed to a cylinder base 351, the cap nut 354 pressures on a flange 331 of the protective sleeve, which flange lies on the upper surface of said cylinder base 351. The inner thread of cap nut 354 matches an outer thread on the base block 366. The cap nut 354 thus fixes the protective sleeve 330 as well as the cylinder (by pressuring on cylinder base 351) to the base block 366 and/or middle part 303. The connector 305 for fixing the dispenser to a recipient, in particular the opening of a bottle is like connector 5 described with respect to the dispenser of FIGS. 1-3.

The dispenser 300 comprises a piston uncoupling mechanism (346, 310, 335, 312, 333), which is in particular a piston rotation uncoupling mechanism. This mechanism allows for a decoupling of the piston manipulation casing 313 or outer sleeve from the piston 346. The decoupling in particular concerns the possibility of the outer sleeve 313 and/or the top assembly 325 of the dispenser to rotate with respect to the piston. In other words, the piston is rotatably arranged with respect to any one or more selected from the top assembly 325, top collar 327, the outer sleeve or manipulation casing 313, and the calibration screw 393. In this way, a forced rotation of the manipulation casing cannot result in breaking the piston, even if the latter is blocked in the cylinder.

Figure 28:
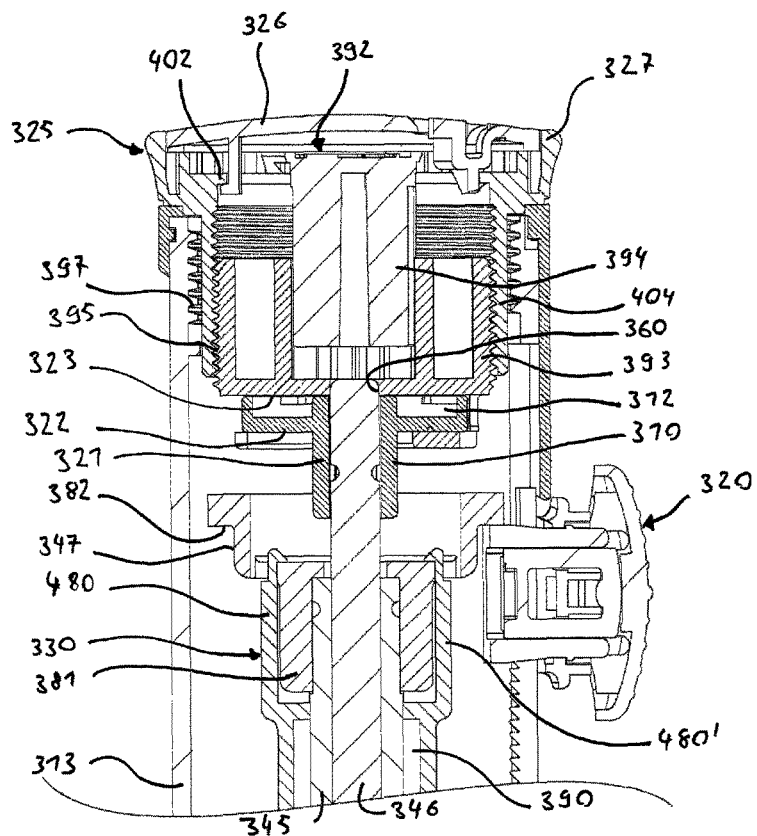
FIG. 28 is an enlarged longitudinal and axial section of the top of the dispenser shown in FIG. 27, showing the details of an uncoupling or piston-breaking prevention mechanism of this embodiment.
Figure 30:
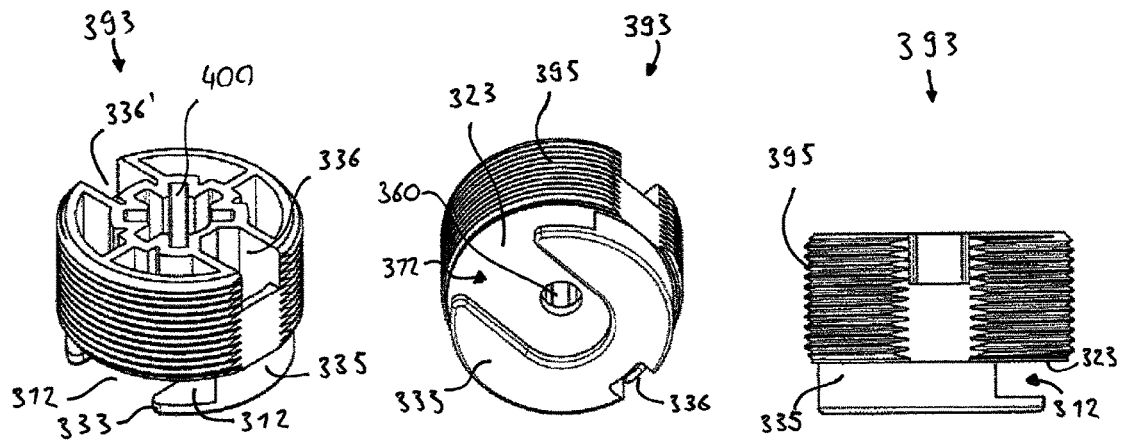
FIGS. 30 A, 30 B and 30 C show a top perspective, bottom-up perspective and front view, respectively, of a rotation uncoupling piece and/or calibration screw of the dispenser shown in FIG. 27.

The piston uncoupling mechanism will be described hereunder in more detail with reference to FIG. 28 and FIGS. 30 to 31. As can be seen in FIG. 28, the piston 346 is connected, at its upper end, to a first piece 310. The first piece 310 is also referred to as piston extension or piston rotation piece 310. This piece, which is shown in greater detail in FIGS. 31 A to C, comprises a tubular section 321, in which the upper end of the piston 346 is fixed, and in a disk-like section 322, which is coaxial with said tubular section. The disk-like section 322 of the first piece 310 is lodged or borne in a bearing 312 formed by a second piece 393, which is shown separately in FIGS. 30A to 30C. The bearing 312 for the first piece 310 is formed by a U-shaped plate 333 (FIG. 30B), a sectional cylindrical wall 335 and a flat top surface 323.

In the embodiment shown, the second piece is actually the calibration screw 393, wherein said flat top surface 323 is actually a lower surface of said calibration screw 393, which forms together with further structural parts 335, 333 said bearing 312. As the uncoupling mechanism does not need to be linked to the calibration mechanism of the dispenser, it is not required that the bearing of the first piece 310 is formed by the calibration screw. According to an alternative embodiment, said second piece 393 and/or said bearing 312 is not formed by the calibration screw. The dispenser of the invention may have a completely different calibration mechanism and principle from the one shown in this specification. This also applies to the dispenser shown in FIGS. 1 to 3. The bearing 312 may thus be formed by a separate or different piece or structure, which may be referred to as bearing piece 393. For example, the bearing may be contained in and/or formed in one piece with collar 327. It is, however, preferred that the outer sleeve 313 is rigidly (but possibly adjustably and/or detachably) connected to said bearing 312 or second piece 393 in general.

In a similar manner to the dispenser disclosed in FIGS. 1 to 3, the calibration screw 393 of dispenser 300 comprises an outer thread 395, which matches an inner thread provided on a cylindrical, downwards extension 404 of the collar 327, whereas the outer sleeve 313 is fixed, in particular by matching threads, to said collar. In this way, calibration screw 393 (or the second piece 393) is rigidly and/or in a rotatably and translationally fixed manner connected to the outer sleeve 313.

The calibration assembly and working principle of the dispenser of FIG. 27 is substantially the same as the one described with respect to the dispenser of FIGS. 1 to 3 (FIGS. 10-15). The calibration screw 393 comprises a central opening 400, in which a, preferably axial, extension 394 of a calibration driver 392 reaches, and which driver being rotatably locked with respect to the calibration screw 393 by way of longitudinal ribs and grooves provided in the opening 400 (FIG. 30A). The calibration driver 392 rests on a rim 402 formed in the collar 327. It is noted that the top assembly 325 is longitudinally shorter, denser or contracted compared to the top assembly 25 of dispenser 1. For longitudinally leaving space for the catches or hooks (not visible, but corresponding to catches 108, 108' in FIG. 12), the calibration screw 393 comprises two lateral openings or cut-outs 336 and 336'.

The second piece 393 comprises a friction element 336, which in the embodiment shown is formed by a lateral strap or finger 336 (FIG. 30B), which finger extends from the lateral border of circular surface 323 and is arranged to exert a pressure on the first piece 310. More specifically, said finger 336 is arranged to exert pressure and thus friction on the annular and/or cylindrical border 370 of the disk section 322 of the rotatable piece 310.

In the embodiment shown, the top end of piston 346 is axially and rotatably blocked by an opening or bore 360 provided in said second piece 393.

Figure 32:
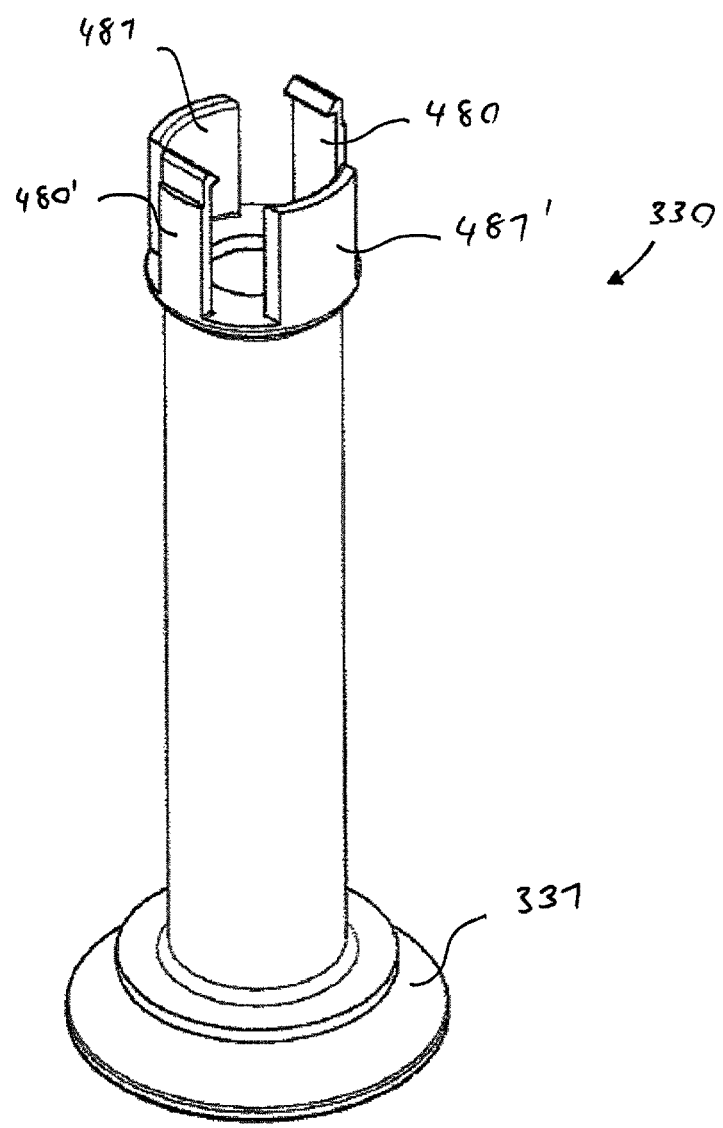
FIG. 32 shows a perspective view of a transparent protective sleeve of the dispenser shown in FIG. 17.

FIG. 28 further shows the upper end of the protective sleeve 330 and the way it is connected to the upper end of cylinder 345 by way of piece 347, as is described in more detail with respect to FIG. 32 below, which shows the isolated protective sleeve 330 in detail. Also a rider 320 corresponding to the one described with respect to FIGS. 4-9 can be seen in FIG. 28, which can also be used with the smaller volume dispenser of FIG. 27.

Figure 31:
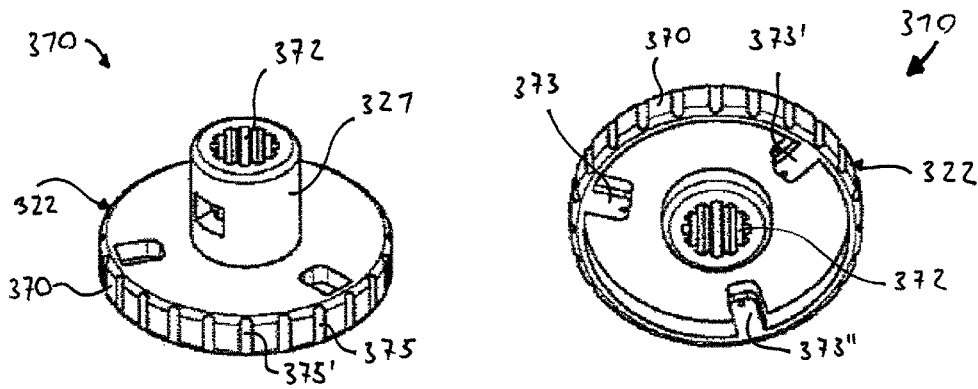
FIGS. 31 A, 31 B and 31 C show two perspective views and a front view of a piston-extension piece of the dispenser shown in FIG. 27.
Figure 31:
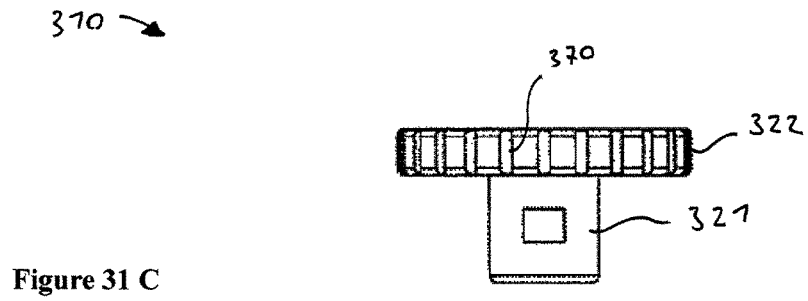

As can better be seen in FIGS. 31 A to C, the border 370 of said first piece 310 comprises a plurality of grooves or notches 375, 375'. In the assembled dispenser, the finger 336 (FIG. 30B) may pressure on the notches 375, 375' and thus impose a friction on the rotatable piece 310, so as to prevent rotation up to a certain limit amount of rotational pressure exerted by the user.

A controlled amount of friction may also be created by way of a detent or ratchet instead of a finger, for example.

A further possibility of providing friction between said first piece 310 and said second piece 393 in order to resist rotation of the two pieces, while avoiding and/or counteracting a longitudinal play of the piston with respect to the casing 313, is illustrated in FIG. 31 B. The straps 373, 373' and 373" are provided on the disk-like section 322 of the first piece. In the assembled dispenser (FIGS. 27 and 28), these straps are in contact with the circular surface 323 of the bearing piece 393 and thus exert a determined amount of friction.

Instead of straps the skilled person disposes of other ways of producing friction between the first and second pieces 310 and 393, respectively, for example by providing an o-ring or other type of joint as a contact between said first and second pieces, using a wave washer, a spring washer, any resilient structure, such as a metallic spring, and so forth.

The friction between said first piece 310 and said second piece 393 is preferred in order to hinder free rotation of the outer sleeve 313 with respect to the piston 346, in particular in case there is no need for such a rotation. The rotation should only or principally be enabled in situations where the piston 346 is blocked with respect to the cylinder 345, so that torsion applied by a user on the outer sleeve 313 does not result in damaging the piston.

Said first and second pieces 310, 393 thus function as an effective de- or uncoupling mechanism, uncoupling the piston 346 rotation-wise from the outer sleeve 313, in particular to prevent damage of the piston.

The tubular part 321 of the first piece 310 is for rigidly and preferably definitely fixing said first piece, preferably in a rotationally symmetrical way, to the piston, as the top end of the piston is inserted through opening 372. In FIG. 31 A, said first piece 310 is shown up-side down with respect to the situation in the assembled dispenser shown in FIGS. 27 and 28, for better showing said tubular section 321.

Figure 29:
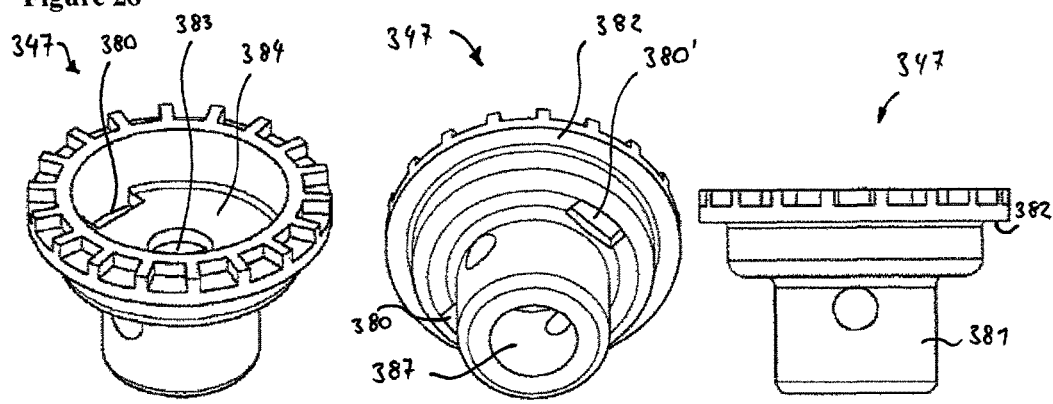
FIGS. 29 A, 29 B and 29 C top-down, bottom-up perspective views and a front view, respectively, of a limit stop piece of the dispenser shown in FIG. 27.

FIGS. 29 A to C show a tubular, annular and/or collar like piece 347 which, in the assembled dispenser 300, is fixed towards the top end of the cylinder 345 and which comprises a horizontal, annular surface 382, which forms the limit stop for selector 320, as can be seen in FIGS. 27 and 28. The piece comprises a lower tube 381. In the opening 387 (FIG. 29 B) the cylinder is inserted, preferably in a longitudinally fixed, immutable manner, for example by gluing or fit-pressing. In the inserted dispenser, the piston extends through hole 383 (FIG. 29A) above the piece 347. In the embodiment shown, the outer surface of the tubular section 381 is used to fit on the protective sleeve 330. Piece 347 is preferably rigidly (but possibly detachably) fixed on the cylinder 345, because the limit stop surface 382 should not displace even after repeated dosing use of the dispenser. In particular, repeated abutment of the selector 320 onto the limit stop 382 when raising the outer sleeve 313 rapidly could result in displacement of the surface 382, which is to be prevented.

According to an alternative embodiment, the limit stop 382 is formed by a rim provided on the protective sleeve, and thus in particular formed in one piece with the protective sleeve.

The piece 347 comprises openings 380, 380', in which extensions 480 and 480' provided on the protective sleeve 330 (FIG. 32) can fit, forming a click-in connection (see also FIG. 28). Further extensions 481 and 481' on the protective sleeve 330 fit on the tubular section 381 of the limit stop piece 347. By way of this connection, skipping of the piece 347 is prevented. The limit stop piece 347 can also be regarded as connector 347 for connecting rigidly (but here detachably) the protective sleeve 330 to the cylinder 345 at their respective upper ends.

As the skilled person will understand, the protective sleeve 330, through is connection to the top end of the cylinder 345, effectively clamps the cylinder 345 into cylinder base 351, and thus to the middle part 303 ("clamping function" of the protective sleeve 330). The clamping at the bottom end of the protective sleeve and the cylinder is done by the cap nut 354, which pressures the protective sleeve via the lower flange 331 (FIG. 27). Said protective sleeve 330 thus increases the stability of the cylinder 345, and thereby of the entire upper part, by preventing any vertical, upwards movement of the cylinder (see also FIGS. 27 and 28). The protective sleeve in particular acts against and/or prevents and detachment and/or loosening of the lower end of the cylinder 345 from the cylinder base 351 in which the cylinder is press-fitted, for example. This function is in addition to the general function of protecting the cylinder against shocks and the like.

As can be seen in FIGS. 27 and 28, there is a gap 390 between the surface of the inner cylindrical wall of said protective sleeve 330 and the outer surface of the cylinder 345. In this case, there is no tight, intimate contact between the protective sleeve and the cylinder as described above with respect to the dispenser shown in FIGS. 1-3. For example, once the piston-cylinder assembly is removed from the middle part 3 by unscrewing cap nut 354, for example, said protective sleeve may be rotatably with respect to the cylinder, which is not the case with a heat shrunk sleeve as described above. The protective sleeve 330 is in particular not obtained by coating of the polymer on the outer surface followed by heating and/or sintering or other disadvantageous procedures and protective sleeves, as set out elsewhere in this specification. The protective sleeve 330 is further preferably resistant to alterations following exposures to chemicals.

In alternative embodiments, the skilled person may use separate pieces for the two functions of connecting the protective sleeve to the cylinder towards the top and of limit stop. Alternatively, there is no separate piece for connecting the protective sleeve to the cylinder (see for example the dispenser shown in FIGS. 1-3), as the sleeve is itself connected or in contact with the cylinder, for example and preferably towards or at the top end of the latter. In this case, there is only one piece needed as a limit stop. In addition, as indicated above, the limit stop piece could be formed by the protective sleeve or according to a still further possibility by an extension or flange of the top end of the cylinder. In both cases, no separate piece 347 is needed. The clamping function of the protective sleeve could be achieved by a structure provided on the top end of the protective sleeve (for example, an inward flange) gripping on the top end or surface of the cylinder. By fixing the cap nut 354 acting on the lower flange 331 of the protective sleeve 330, the latter exerts a top-down clamping or holding pressure on the cylinder 345.

The protective sleeve 330 is fully or substantially transparent. It may be made from polypropylene or any other transparent plastic polymer, which is resistant to autoclaving, for example. The cylinder 345 is preferably transparent. Preferably, visible parts of the cylinder 345 comprise and/or are made from transparent glass, more preferably non-rectified glass (non-sanded or non-ground glass), as rectification of the glass, as frequently made in the art, results in opaque glass, preventing free view to the content of the dosing chamber of the dispenser.

Figure 33:
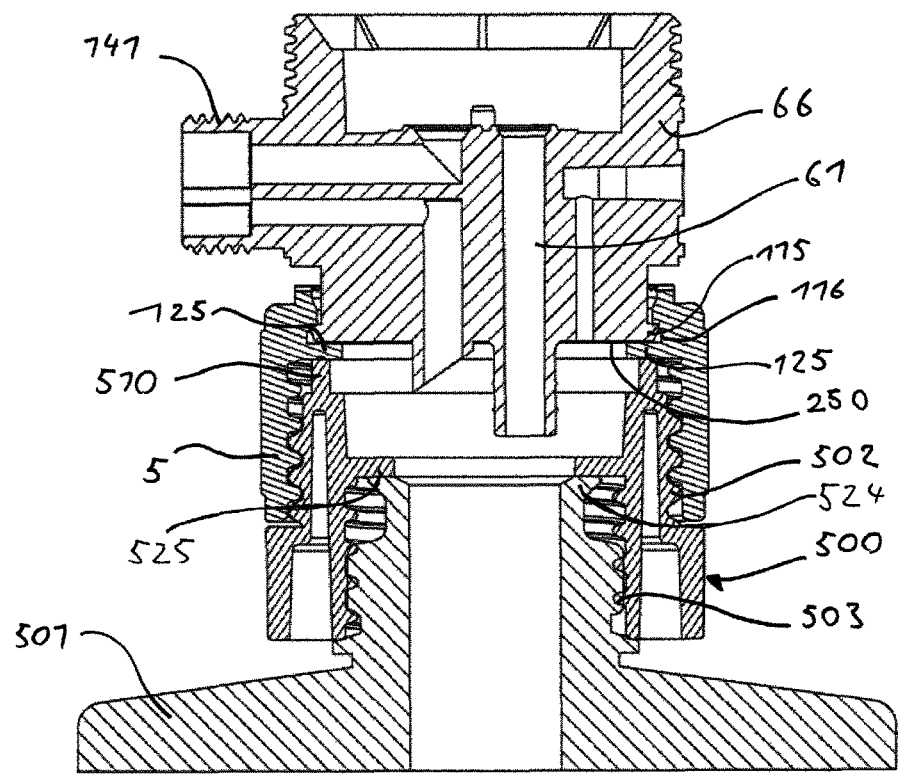
FIG. 33 shows an longitudinal axial section through a recipient, to which the dispenser is connected via an adaptor piece. Of the dispenser, only the base block of the middle part and the cap not of the lower part is shown.

In FIG. 33, an adaptor piece 500 is shown, and its use with the dispenser of the invention. For simplicity, only the base block 66 and the cap nut 5 of the dispenser are shown. The adaptor 500 is connected to a bottle recipient 501. The external thread 502 of the adaptor 500 matches the internal thread of cap nut 5, and the internal thread 503 of the adaptor 500 matches the external thread on the bottle opening. Generally, several adaptors with varying internal threads 503 are available at the option of a user, so as to enable connection of the dispenser with the most common bottles comprising an external thread at their opening.

As has been detailed with respect to FIGS. 16A and 16B above, the cap nut 5 comprises an inner rim 125, which is adapted to be pressured against the bottom structure or surface 250 of the base block 66. The adaptor 5000 comprises a rim 525, similar to the rim 125 in cap nut 5, but adapted to the size of the bottle and/or adaptor. When screwed onto the bottle 501, the top end 524 of the bottle opening or of the bottle neck abuts against said rim 525. Said adaptor rim 525 thus takes the position of cap-nut rim 125 with respect to the bottle-rim contact when an adaptor is used. On the other hand, the adaptor 500 comprises, at its top end, a tubular part or extension 510, which abuts against rim 125 of the cap nut 5. By tightly screwing the adaptor into cap nut 5 and the bottle opening 524 into the adaptor 500, an airtight connection is obtained.

The adaptor 500 has a substantially hollow cylindrical or tubular configuration. In particular, the adaptor 500 comprises essentially two tubular, coaxial parts, one of these two parts, preferably the upper part, comprising an external thread and the other part, preferably the lower part, comprising an internal thread. According to an embodiment, the invention provides an adaptor for use with a bottle dispenser, the adaptor comprising an inner rim 525, extending radially inward from the lower tube or part, in particular from the upper end of the lower tube. According to an embodiment, the adaptor comprises a tubular extension or part 510, adapted to be brought in contact with a rim 125 provided on the cap nut 5 of the dispenser. The adaptor may be used with any one of the dispensers described herein and/or with any one of the embodiments, for example with those described with respect to FIGS. 16A and/or 16B. The invention provides a dispenser that is adapted to be used with an adaptor as disclosed herein.

The present invention is not limited to the above-described embodiments, and various alterations, modifications, and/or alternative applications of the invention may be possible, if desired, without departing from the attendant scope and spirit of the invention, which can be read from the claims and the entire specification. All these possible alterations, modifications, and/or alternative applications are also intended to be within the technical scope of the present invention.

The invention claimed is:

1. A bottle dispenser for taking in and discharging liquid from a recipient, comprising:
   an upper part comprising a piston-cylinder assembly;
   a middle part comprising ducts and valves for liquid channeling; and,
   a lower part comprising a connector for connecting the dispenser to the recipient,
   wherein said upper part further comprises:
   a volume adjustment assembly for allowing the adjustment of a desired volume of liquid, said volume adjustment assembly comprising:
   a sleeve connected to the piston of said piston-cylnder assembly and arranged for allowing said piston to be actuated by a user, and
   a volume selector assembly comprising a support piece and a button comprising a top end and a bottom end,
   wherein said button is swayably connected with respect to said support piece in such a manner that said button is susceptible of being depressed on said top end and said bottom end so as to sway down at the, respective, top or bottom end, wherein depressing the button at any end results in deblocking the selector assembly so as to allow for adjustment of a desired volume by displacing the volume selector assembly with respect to said sleeve.

2. The dispenser of claim 1, comprising a calibration assembly and a removable cap or lid, wherein said calibration assembly can be in either i) a blocked position wherein calibration of the dispenser is blocked or ii) a deblocked position wherein calibration of the dispenser is permitted, wherein said removable cap or lid can close or block said calibration assembly, wherein said removable cap or lid is fixed by a U-clip that is actionable by a user for removing said removable cap or lid, and wherein removal of said removable cap or lid gives access to said calibration assembly.

3. The dispenser of claim 1, comprising:

a calibration assembly comprising a hand-actionable calibration driver, and a cap or lid, wherein said cap or lid locks said calibration driver in said calibration assembly.

4. The dispenser of claim 1, wherein said piston-cylinder assembly comprises a glass cylinder, said cylinder comprising a bottom flange, wherein said flange is made in one continuous piece with said cylinder.

5. The dispenser of claim 4, wherein said flange extends radially outward at the bottom end of said cylinder, thereby forming a rim comprising an upper surface, wherein said upper surface of the rim of said cylinder can be used as a pressure-loaded area for pressuring and connecting said cylinder onto one or more selected from the group consisting of: said middle part, a support assembly, a base block, a valve block, and a base surface or plate of said dispenser.

6. The dispenser of claim 1, wherein said middle part of the dispenser comprises one or more selected from the group consisting of: a support block, a support assembly, and a valve assembly with a knob, wherein each of said support block, support assembly, and valve assembly with a knob comprises an outlet and an outlet connector provided at said outlet, wherein said dispenser further comprises a detachable spout assembly comprising a spout cover connection assembly, and wherein said spout cover connection assembly comprises a user-actionable, turnable spout cover connector or lock for connecting the spout cover to said outlet connector.

7. The dispenser of claim 1, comprising a spout assembly, wherein said spout assembly comprises a spout cover, a delivery pipe, and a cap for closing an orifice of said delivery pipe, wherein said cap comprises an inner thread, and wherein said spout cover comprises a downstream end and comprises at or close to said downstream end an outer thread or outer thread seaments.

8. The dispenser of claim 1, wherein said dispenser is adapted to be connected to any one of at least two different spout assemblies.

9. The dispenser of claim 8, wherein said at least two different spout assemblies differ in length.

10. The dispenser of claim 1, wherein said sleeve of said volume adjustment assembly comprises a longitudinal slot in which said volume selector assembly is provided for volume adjustment, wherein said sleeve comprises a first and a second graduation provided on the left and right side, respectively, of said longitudinal slot, and wherein said first and second graduations are different.

11. The dispenser of claim 1, wherein said volume selector assembly is adapted to be used with a first volume selector or a second volume selector, wherein said first selector allows for digital volume adjustment such that volume can be adjusted in predetermined volume intervals, and wherein said second selector allows for continuous, analogous volume adjustment.

12. The dispenser of claim 1, wherein said valves comprise an aspiration valve assembly, wherein said aspiration valve assembly comprises a valve housing, and a cover, wherein said valve housing contains within a valve ball, wherein said valve housing comprises an opening for liquid passage, wherein said cover comprises one or more selected from the group consisting of extensions, arms and bars, wherein liquid can pass through said opening, and wherein said valve ball is retained by said one or more extensions, bars, or arms.

13. The dispenser of claim 1, wherein the cylinder of said iston-cylinder assembly comprises a transparent tubular part, wherein said dispenser further comprises a protective sleeve provided on the outer surface of said cylinder, wherein said protective sleeve comprises a transparent tubular part, wherein said transparent tubular part of said cylinder is housed inside and coaxially with respect to said transparent tubular part of said protective sleeve, and wherein said protective sleeve comprises a heat-shrunk polymer.

14. The dispenser of claim 1, comprising a piston uncoupling mechanism, allowing a rotation of the sleeve with respect to the piston.

15. The dispenser of claim 1, wherein said dispenser is adapted to form an airtight contact with the opening or orifice of a recipient.

16. The dispenser of claim 1, wherein said lower part comprises a cap nut, said cap-nut comprising a radially-inwardly projecting rim, wherein said rim is adapted to be brought in contact with an opening of said recipient by screwing the cap nut onto the opening, and wherein said rim is adapted to form a sealed or airtight contact with a support assembly of the dispenser.

17. The dispenser of claim 1, wherein said lower part comprises a cap nut comprising a radially-inwardly projecting, circumferential rim, wherein said middle part comprises a support assembly, wherein said radially-inwardly projecting rim is adapted to be brought in contact with an opening of said recipient by screwing the cap nut onto the opening, and wherein a circumferential projection is provided on said radially-inwardly projecting rim, said circumferential projection being oriented in an upward direction such that said circumferential projection is pressured towards said support assembly when said connector is screwed on said recipient.

18. The dispenser of claim 1, wherein said middle part comprises a support block and a valve block, said valve block forming at least part of the housing of one valve, wherein said valve block comprises one or more selected from the group consisting of injected ceramics, injected plastics, machined plastics, finished plastics, and fluoropolymers.

19. The dispenser of claim 1,
wherein said dispenser comprises a protective sleeve that is arranged coaxially with the cylinder of said piston-cylinder assembly,
wherein said protective sleeve is connected to the cylinder, and
wherein said protective sleeve is further connected at its lower end to the middle part of the dispenser so as to block an axial up-wards movement of said cylinder.

20. The dispenser of claim 1,
wherein said connector comprises a cap nut comprising a radially-inwardly projecting, circumferential rim, and
wherein said middle part comprises a support assembly comprising a lower surface on which a circumferential projection is provided, said circumferential projection being oriented in a downward direction, such that said circumferential projection is pressured towards say d radially-inwardly projecting rim when said connector part is screwed on said recipent.

21. A bottle dispenser for taking in and discharging liquid from a recipient, comprising:
an upper part comprising a piston-cylinder assembly;
a middle part comprising ducts and valves for liquid channeling; and,
a lower part comprising a connector for connecting the dispenser to the recipient, wherein said upper part further comprises:
a volume adjustment assembly for allowing the adjustment of a desired volume of liquid, said volume adjustment assembly comprising:
a manipulation sleeve connected to the piston of said piston-cylinder assembly and arranged for allowing said piston to be actuated by a user, wherein said manipulation sleeve comprises an outer surface and an inner surface, wherein said outer surface is opposed to said inner surface, and wherein a graduation is provided on said outer surface;
a longitudinal slot provided in said manipulation sleeve;
a volume selector assembly, which is displaceable along said longitudinal slot for adjusting a volume to be dispensed by the dispenser;
first and second teethed rails comprising a plurality of teeth, wherein said first and second teethed rails are provided in parallel on said inner surface of said manipulation sleeve extending along left and right sides of said slot, respectively, wherein the teeth of said first and second teethed rails are oriented so as to point in a radially inward direction, towards a center of the piston-cylinder assembly;
a button; and,
an arresting structure comprising a plurality of counter-teeth designed to engage with said teeth on said first and second teethed rails of said manipulation sleeve, and
wherein said button is arranged so that pressing said button in radial proximal direction towards said piston-cylinder assembly results in disengagement of said arresting structure from said first and second teethed rails, allowing the volume selector assembly to be displaced longitudinally along said slot for adjusting the volume.

22. The dispenser of claim 21, wherein said volume selector assembly comprises:
a pusher or transducer arranged so as to transduce pressure applied by a user on said button to said arresting structure,
a support piece, and,
a spring,
wherein said support piece comprises a surface on which said spring rests, said spring acting on said pusher or transducer so as to engage said counterteeth with said teeth of said teethed rail.

23. The dispenser of claim 21,
wherein said arresting structure is a first arresting structure,
wherein said volume selector assembly comprises a second arresting structure, and
wherein said first and second arresting structures are arranged, respectively, on lateral sides of said pusher or transducer and designed to engage with said first and second teethed rails.

24. The dispenser of claim 21,
wherein said teeth of said first and second teethed rails and said counterteeth of said arresting structure comprise substantially horizontal surfaces and skewed surfaces, wherein, with said arresting structure being engaged with said first and second teethed rails, said horizontal surfaces assist the arresting function of said arresting structure.

25. The dispenser of claim 21,
wherein said teeth of said first and second teethed rails comprise an upper and a lower surface,
wherein said counterteeth of said arresting structure comprise an upper and lower surface,
wherein, with said arresting structure being engaged with said first and second teethed rails, said upper surface of said counterteeth is in contact with said lower surface of said teeth and said lower surface of said counterteeth is in contact with said upper surface of said counterteeth,
wherein said lower surface of said teeth is substantially horizontal and said upper surface of said teeth is skewed, and
wherein said lower teeth of said counterteeth is substantially horizontal and said upper surface of said counterteetb is skewed.

* * * * *